(12) United States Patent
Nagae et al.

(10) Patent No.: US 11,807,768 B2
(45) Date of Patent: Nov. 7, 2023

(54) INKJET INK, HIDING LAYER COATING AGENT, RECORDING SHEET AND METHOD FOR MANUFACTURING THE SAME, RECORDED PRODUCT AND METHOD FOR MANUFACTURING THE SAME, AND IMAGE RECORDING INK

(71) Applicant: General Co., Ltd., Osaka (JP)

(72) Inventors: Kengo Nagae, Osaka (JP); Hideyuki Uemura, Osaka (JP)

(73) Assignee: GENERAL CO., LTD., Osaka (JP)

( * ) Notice: Subject to any disclaimer, the term of this patent is extended or adjusted under 35 U.S.C. 154(b) by 449 days.

(21) Appl. No.: 17/081,456

(22) Filed: Oct. 27, 2020

(65) Prior Publication Data
US 2021/0130637 A1    May 6, 2021

(30) Foreign Application Priority Data

| Oct. 31, 2019 | (JP) | 2019-199021 |
| Dec. 26, 2019 | (JP) | 2019-236039 |
| Jan. 27, 2020 | (JP) | 2020-011003 |

(51) Int. Cl.
| C09D 11/54 | (2014.01) |
| B41M 5/00 | (2006.01) |
| B41M 5/50 | (2006.01) |
| C09D 11/037 | (2014.01) |
| C09D 11/101 | (2014.01) |
| C09D 11/102 | (2014.01) |
| C09D 11/103 | (2014.01) |
| C09D 11/106 | (2014.01) |
| C09D 11/107 | (2014.01) |
| C09D 11/322 | (2014.01) |
| C09D 11/38 | (2014.01) |

(52) U.S. Cl.
CPC ........... *C09D 11/54* (2013.01); *B41M 5/0023* (2013.01); *B41M 5/502* (2013.01); *C09D 11/037* (2013.01); *C09D 11/101* (2013.01); *C09D 11/102* (2013.01); *C09D 11/103* (2013.01); *C09D 11/106* (2013.01); *C09D 11/107* (2013.01); *C09D 11/322* (2013.01); *C09D 11/38* (2013.01)

(58) Field of Classification Search
CPC ............. B41M 5/0011; B41M 5/0017; B41M 5/0023; B41M 5/0047; B41M 7/00; B41M 7/0072; B41M 5/52; B41M 5/5218; B41M 5/5227; B41J 2/04588; B41J 2/04595; B41J 2/04586; B41J 2/14274; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| 6,447,877 | B1 | 9/2002 | Hegi et al. | |
| 7,078,464 | B2 | 7/2006 | Schmidhauser et al. | |
| 2006/0058445 | A1* | 3/2006 | Leuninger | C09D 151/003 |
| | | | | 524/500 |
| 2012/0206534 | A1 | 8/2012 | Fassam et al. | |
| 2014/0313267 | A1* | 10/2014 | Fassam | C09D 11/40 |
| | | | | 522/170 |
| 2016/0326387 | A1* | 11/2016 | Arita | C08F 220/68 |

FOREIGN PATENT DOCUMENTS

| JP | 2000-313163 A | 11/2000 |
| JP | 2004148301 A | 5/2004 |
| JP | 2004149768 A | 5/2004 |
| JP | 2005298757 A | 10/2005 |
| JP | 2008-290378 A | 12/2008 |
| JP | 2010513589 A | 4/2010 |
| JP | 2012-219203 A | 11/2012 |
| JP | 2013-227369 A | 11/2013 |

(Continued)

*Primary Examiner* — Manish S Shah
(74) *Attorney, Agent, or Firm* — Rabin & Berdo, P.C.

(57) ABSTRACT

The present invention provides an inkjet ink and a hiding layer coating agent that contain radical polymerizable components including a polyfunctional monomer that includes a high Tg polyfunctional monomer with a glass transition temperature Tg of not less than 40° C. at a ratio of not less than 30 mass % and a monofunctional monomer, a volatile solvent, and a photo-radical polymerization initiator, with a ratio of the monofunctional monomer being 5 to 70 mass % in the radical polymerizable components and a ratio of the volatile solvent being 50 to 400 mass % with respect to the radical polymerizable components and are excellent in dispersion stability due to not containing (excluding) a white pigment such as titanium oxide, etc., and enable printing of a white or colored character having a high hiding property equivalent to that in a case where the white pigment is contained.

25 Claims, No Drawings

(56) References Cited

FOREIGN PATENT DOCUMENTS

| | | | |
|---|---|---|---|
| JP | 2017061637 | A | 3/2017 |
| JP | 2017186520 | A | 10/2017 |
| JP | 2018-053161 | A | 4/2018 |
| JP | 2019-094406 | A | 6/2019 |
| WO | 97/44363 | A1 | 11/1997 |
| WO | 2008071994 | A1 | 6/2008 |
| WO | 2014041346 | A1 | 3/2014 |

* cited by examiner

INKJET INK, HIDING LAYER COATING AGENT, RECORDING SHEET AND METHOD FOR MANUFACTURING THE SAME, RECORDED PRODUCT AND METHOD FOR MANUFACTURING THE SAME, AND IMAGE RECORDING INK

BACKGROUND OF THE INVENTION

1. Field of the Invention

The present invention relates to an inkjet ink, a hiding layer coating agent, a recording sheet including a hiding layer constituted of the hiding layer coating agent and a method for manufacturing the same, a recorded product with an image recorded on the recording sheet and a method for manufacturing the same, and an image recording ink used to record the image.

2. Description of the Related Art

An inkjet ink having a hiding property is used in some cases to print vivid characters (including codes such as a barcode, etc.; the same applies hereinafter) having a white color or an arbitrary color tone and moreover with visibility on a surface of a printing object of low brightness such as that of black color, etc., or a surface of a printing object constituted of a transparent material, etc., by an inkjet printing method.

To impart an inkjet ink with a hiding property, titanium oxide, etc., that is a white pigment having a high hiding power and coloring power is generally blended as a colorant.

For example, with an inkjet ink of white color, the titanium oxide or other white pigment is used as the colorant, and with an inkjet ink of an arbitrary color tone besides white color (except for white color), the white pigment and a dye or pigment of the arbitrary color tone are used in combination.

However, titanium oxide and other white pigments of high hiding power are all large in specific gravity and settle easily in a short period of time and dispersion stability of an inkjet ink thus becomes insufficient in some cases.

Also, in some cases, a recording sheet having a hiding layer formed on a base sheet is used to record an image by an inkjet printing method.

A conventional hiding layer generally contains an inorganic filler or other white pigment and is put in a state of high hiding property to enhance color development and clarity of the image recorded by an inkjet ink.

However, with an image recorded on the conventional recording sheet that includes the hiding layer, only a flat, planar expression is possible.

A recording sheet that enables another novel expression by the inkjet printing method is thus being demanded recently.

An object of the present invention is to provide an inkjet ink that is excellent in dispersion stability due to not containing (excluding) an easily settling white pigment such as titanium oxide, etc., and yet enables printing of characters having a high hiding property equivalent to that in a case where the white pigment is contained.

Also, an object of the present invention is to provide a hiding layer coating agent for manufacturing a recording sheet that enables a novel expression that was impossible to realize with a conventional recording sheet, a recording sheet that includes a hiding layer constituted of the hiding layer coating agent, and a method for manufacturing the same.

Further, an object of the present invention is to provide a recorded product with which an image is recorded on the recording sheet and a method for manufacturing the same and an image recording ink used to record the image.

SUMMARY OF THE INVENTION

A preferred embodiment of the present invention provides an inkjet ink that contains radical polymerizable components including a difunctional or higher polyfunctional monomer and a monofunctional monomer, a volatile solvent, and a photo-radical polymerization initiator and with which the polyfunctional monomer includes a high Tg polyfunctional monomer with a glass transition temperature Tg of not less than 40° C. at a ratio of not less than 30 mass % in a total amount of the polyfunctional monomer, a ratio of the monofunctional monomer is not less than 5 mass % and not more than 70 mass % in a total amount of the radical polymerizable components, and a ratio of the volatile solvent is not less than 50 mass % and not more than 400 mass % with respect to the total amount of the radical polymerizable components.

According to this arrangement, when, after printing a character using the inkjet ink, exposure with ultraviolet rays, etc., is performed, the radical polymerizable components undergo a radical polymerization reaction due to a function of the photo-radical polymerization initiator and a three-dimensional network structure is formed mainly by a function of the polyfunctional monomer.

That is, the radical polymerizable components undergo a curing reaction to produce a cured product that forms the character.

Also, before and after the curing reaction, the volatile solvent volatilizes to porosify the cured product and therefore, diffuse reflection of light occurs inside the cured product to enable the character to be imparted with a hiding property.

Moreover, by selectively using the high Tg polyfunctional monomer with the glass transition temperature Tg of not less than 40° C. as the polyfunctional monomer, a degree of the hiding property, that is, a contrast ratio of the character due to porosifying the cured product can be enhanced.

The hiding property of the character can thus be enhanced, without using titanium oxide or other white pigment, to be approximately equivalent to that in a case of containing the white pigment.

In the preferred embodiment of the present invention, the high Tg polyfunctional monomer is a trifunctional or higher high Tg polyfunctional monomer.

Also, in the preferred embodiment of the present invention, the high Tg polyfunctional monomer is a trifunctional or higher high Tg polyfunctional monomer with a glass transition temperature Tg of not less than 90° C.

According to these arrangements, the aforementioned effects can be improved further to further enhance the hiding property of a character.

In the preferred embodiment of the present invention, the monofunctional monomer includes at least an N-vinyl lactam monomer.

According to this arrangement, the N-vinyl lactam monomer is excellent in an effect of enhancing a fixing property with respect to a surface of a printing object and an abrasion resistance associated therewith of the cured product that forms a character.

Therefore, a character that is printed on a surface of a flexible printing object such as paper or film, etc., can be improved further in followability with respect to bending of the printing object and peeling, etc., of the character when the printing object is bent, etc., can be suppressed even more satisfactorily.

Also, the N-vinyl lactam monomer has an effect of enhancing a rate of the curing reaction by improving photosensitivity of the inkjet ink as a sensitizer of the photo-radical polymerization initiator as well.

In the preferred embodiment of the present invention, the inkjet ink further contains at least one type of binder resin selected from a group consisting of polyamide resin, acrylic resin, and phenol resin.

According to this arrangement, by containing the binder resin, the fixing property with respect to a surface of a printing object and the abrasion resistance associated therewith of a character can be enhanced.

Therefore, a character printed on a surface of a flexible printing object such as paper or film, etc., can be improved further in the followability with respect to bending of the printing object and peeling, etc., of the character when the printing object is bent, etc., can be suppressed even more satisfactorily.

In the preferred embodiment of the present invention, an inkjet ink for white color printing is provided with which the high Tg polyfunctional monomer is a high Tg polyfunctional monomer with a glass transition temperature Tg of not less than 60° C., the ratio of the high Tg polyfunctional monomer is not less than 50 mass % in the total amount of the polyfunctional monomer, and the ratio of the monofunctional monomer is not less than 15 mass % and not more than 70 mass % in the total amount of the radical polymerizable components.

According to this arrangement, a degree of whitening, that is, a whiteness of a character due to porosification of the cured product by the mechanism described above can be enhanced even more.

The whiteness and the hiding property of a character of white color can thus be enhanced, without using titanium oxide or other white pigment, to be approximately equivalent to that in the case of containing the white pigment.

As a result, for example, in solid printing, color unevenness can be made inconspicuous, and in bar code printing, it is possible to prevent the bar code from appearing to be blurred or chipped.

In the preferred embodiment of the present invention, a colorant is excluded.

Although an inkjet ink for white color printing may be blended with a colorant to finely adjust the color tone of the white color, according to this arrangement, the colorant can be excluded to enable simplification of composition of the inkjet ink for white color printing.

In the preferred embodiment of the present invention, an L value that represents whiteness is not less than 40.

According to this arrangement, the whiteness and the hiding property of a white character can be further enhanced, and for example, in solid printing, color unevenness can be made even less noticeable, and in barcode printing, it is possible to more effectively suppress the appearance of blurred or missing barcodes.

In the preferred embodiment of the present invention, an inkjet ink for color printing that contains a colorant is provided.

According to this arrangement, the hiding property of a character colored to an arbitrary color tone besides white color can be enhanced, without using titanium oxide or other white pigment, to be approximately equivalent to that in the case of containing the white pigment.

In the preferred embodiment of the present invention, a contrast ratio is not less than 45%.

According to this arrangement, the hiding property of a character that is colored can be further enhanced, and for example, in solid printing, color unevenness can be made even less noticeable, and in barcode printing, it is possible to more effectively suppress the appearance of blurred or missing barcodes.

A preferred embodiment of the present invention provides a hiding layer coating agent that contains radical polymerizable components including a difunctional or higher polyfunctional monomer and a monofunctional monomer, a volatile solvent, and a photo-radical polymerization initiator and with which the polyfunctional monomer includes a high Tg polyfunctional monomer with a glass transition temperature Tg of not less than 40° C. at a ratio of not less than 30 mass % in a total amount of the polyfunctional monomer, a ratio of the monofunctional monomer is not less than 5 mass % and not more than 70 mass % in a total amount of the radical polymerizable components, and a ratio of the volatile solvent is not less than 50 mass % and not more than 400 mass % with respect to the total amount of the radical polymerizable components.

Also, a preferred embodiment of the present invention provides a recording sheet including a base sheet and a hiding layer that is constituted of a cured product of the hiding layer coating agent provided on a surface of the base sheet.

According to these arrangements, when, after coating the hiding layer coating agent on the surface of the base sheet, exposure with ultraviolet rays, etc., is performed, the radical polymerizable components undergo a radical polymerization reaction due to a function of the photo-radical polymerization initiator and a three-dimensional network structure is formed mainly by a function of the polyfunctional monomer.

That is, the radical polymerizable components undergo a curing reaction to produce a cured product that forms the hiding layer on the surface of the base sheet.

Also, before and after the curing reaction, the volatile solvent volatilizes to make the cured product be a porous structure and therefore, diffuse reflection of light occurs inside the cured product to enable the hiding layer to be imparted with a hiding property.

Moreover, by selectively using the high Tg polyfunctional monomer with the glass transition temperature Tg of not less than 40° C. as the polyfunctional monomer, the hiding property of the hiding layer due to making the cured product be a porous structure can be enhanced further.

The hiding property of the hiding layer of the recording sheet can thus be improved, without using a white pigment, to be approximately equivalent to that in a case of containing the white pigment.

When an image is recorded using an image recording ink that is colorless or colored and is transparent or semitransparent on the hiding layer of the recording sheet that includes the hiding layer, a region of the hiding layer in which the image is recorded is selectively decreased in hiding property and put in a transparent or semitransparent state.

That is, the image recording ink permeates into the porous structure of the cured product that forms the hiding layer and fills interiors of pores of the porous structure to suppress the diffuse reflection of light mentioned above and consequently, the hiding property of the region in which the image is recorded is selectively decreased.

The region in which the image is recorded is thus put in a transparent or semitransparent state due to the decrease in hiding property and, together with a region besides it being maintained in a semitransparent or nontransparent state of high hiding property, a novel expression that was impossible to realize with a conventional recording sheet is made possible.

Specifically, for example, an image of one type or a combination of two or more types among various expression modes such as the following can be recorded.

(i) Using a transparent or semitransparent sheet as the base sheet, a region in which an image is recorded is put in a transparent or semitransparent state together with the base sheet while maintaining a region in which the image is not recorded in a semitransparent or nontransparent state.

(ii) A sheet colored to an arbitrary color tone or having a pattern printed thereon in advance is used as the base sheet and the color tone or the pattern of the base sheet is made visible selectively in a region in which an image is recorded. In this case, the base sheet may be in any of the transparent, semitransparent, and nontransparent states.

(iii) The hiding layer is colored to an arbitrary color tone to produce a difference with respect to a color tone of a recorded image or a difference with respect to a color tone of the base sheet that is transmitted through in a region in which the image is recorded.

(iv) As the image recording ink in (i) to (iii) above, for example, an ink that is colorless and transparent or semitransparent may be used or an ink with color that is colored to an arbitrary color tone and is transparent or semitransparent may be used. In the latter case, a region in which an image is recorded can be put in a transparent or semitransparent state with the color tone added thereto. Also, especially by using a plurality of types of inks colored, for example, in cyan, magenta, yellow, etc., as image recording inks, an image that is in full color and is transparent or semitransparent can be recorded as well.

In the preferred embodiment of the present invention, the high Tg polyfunctional monomer is a trifunctional or higher high Tg polyfunctional monomer.

Also, in the preferred embodiment of the present invention, the high Tg polyfunctional monomer is a trifunctional or higher high Tg polyfunctional monomer with a glass transition temperature Tg of not less than 90° C.

According to these arrangements, the aforementioned effects can be improved further to further enhance the hiding property of the hiding layer.

In the preferred embodiment of the present invention, the monofunctional monomer includes at least an N-vinyl lactam monomer.

According to this arrangement, the N-vinyl lactam monomer is excellent in an effect of enhancing a fixing property with respect to the surface of the base sheet of the cured product that forms the hiding layer and an abrasion resistance associated therewith of the hiding layer.

Therefore, the hiding layer that is formed, for example, on the surface of the base sheet that is bendable can be improved further in the followability with respect to bending of the base sheet and peeling, etc., of the hiding layer when the base sheet is bent can be suppressed even more satisfactorily.

Also, the N-vinyl lactam monomer has an effect of enhancing a rate of the curing reaction by improving photosensitivity of the inkjet ink as a sensitizer of the photoradical polymerization initiator as well.

In the preferred embodiment of the present invention, the hiding layer coating agent further contains at least one type of binder resin selected from a group consisting of polyamide resins, acrylic resins, and phenol resins.

According to this arrangement, by containing the binder resin, the fixing property with respect to the surface of the base sheet and the abrasion resistance associated therewith of a character can be enhanced.

Therefore, the hiding layer that is formed, for example, on the surface of the base sheet that is bendable can be improved further in the followability with respect to bending of the base sheet and peeling, etc., of the hiding layer when the base sheet is bent can be suppressed even more satisfactorily.

In the preferred embodiment of the present invention, a colorant is further contained.

According to this arrangement, it is made possible, as mentioned above, to color the hiding layer to an arbitrary color tone besides white and produce a difference with respect to a color tone of a recorded image, a difference with respect to a color tone of the base sheet that is transmitted through in a region in which the image is recorded, etc.

In the preferred embodiment of the present invention, the base sheet is a transparent or semitransparent sheet.

According to this arrangement, as mentioned above, a region in which an image is recorded can be put in a transparent or semitransparent state together with the base sheet while maintaining a region in which the image is not recorded in a semitransparent or nontransparent state.

A preferred embodiment of the present invention provides a method for manufacturing the recording sheet described above and includes a step of forming the hiding layer by coating the hiding layer coating agent on the surface of the base sheet and thereafter a step of causing a curing reaction by exposure to ultraviolet rays.

According to this arrangement, the recording sheet described above can be manufactured efficiently.

In the preferred embodiment of the present invention, the step of forming the hiding layer includes a step of printing the hiding layer coating agent on the surface of the base sheet by an inkjet printing method.

According to this arrangement, the hiding layer that is uniform in thickness and thin can be formed.

Also, the hiding layer can be formed not just solidly across an entirety of the surface of the base sheet but can also be formed, for example, to an arbitrary planar shape.

A preferred embodiment of the present invention provides a recorded product with which a transparent or semitransparent image is recorded on the hiding layer of the recording sheet.

Also, a preferred embodiment of the present invention provides a method for manufacturing the recorded product described above and includes a step of recording the image on the hiding layer by an inkjet printing method using an image recording ink that is colorless or colored and is transparent or semitransparent.

According to these arrangements, novel expressions such as those of (i) to (iv) described above, etc., that were impossible to realize with a conventional recording sheet are made possible.

In the preferred embodiment of the present invention, the step of recording the image includes a step of using an ink having a photocuring property as the image recording ink and making the ink undergo a curing reaction by exposure to ultraviolet rays after recording.

According to this arrangement, by using the ink having the photocuring property as the image recording ink, toughness and abrasion resistance of the hiding layer after the image recording can be improved.

Also, for example, even if the recorded product becomes wet, etc., with water or a solvent, etc., the record does not become blotted or blurred and therefore, fastness of the record can also be enhanced.

A preferred embodiment of the present invention provides an image recording ink used in the method for manufacturing the recorded product described above, is colorless or colored, and is transparent or semitransparent.

According to this arrangement, by combining with the recording sheet described above, novel expressions such as those of (i) to (iv) described above, etc., that were impossible to realize with a conventional recording sheet are made possible.

In the preferred embodiment of the present invention, the image recording ink has a photocuring property.

According to this arrangement, the toughness and the abrasion resistance of the hiding layer after the image recording can be improved.

Also, for example, even if the recorded product becomes wet, etc., with water or a solvent, etc., the record does not become blotted or blurred and therefore, fastness of the record can also be enhanced.

DETAILED DESCRIPTION OF THE PREFERRED EMBODIMENTS

<<Inkjet Ink>>

An inkjet ink according to a preferred embodiment of the present invention is characterized in containing radical polymerizable components including a difunctional or higher polyfunctional monomer and a monofunctional monomer, a volatile solvent, and a photo-radical polymerization initiator and in that the polyfunctional monomer includes a high Tg polyfunctional monomer with a glass transition temperature Tg of not less than 40° C. at a ratio of not less than 30 mass % in a total amount of the polyfunctional monomer, a ratio of the monofunctional monomer is not less than 5 mass % and not more than 70 mass % in a total amount of the radical polymerizable components, and a ratio of the volatile solvent is not less than 50 mass % and not more than 400 mass % with respect to the total amount of the radical polymerizable components.

Thereby, a hiding property of a character can be enhanced by the mechanism described above and without using titanium oxide or other white pigment to be approximately equivalent to that in a case of containing the white pigment.

Also, by using the monofunctional monomer in combination with the polyfunctional monomer, a cured product that forms the character can be imparted with a suitable flexibility.

Therefore, for example, a character that is printed on a surface of a flexible printing object such as paper or film, etc., can be enhanced in followability with respect to bending of the printing object and peeling, etc., of the character when the printing object is bent, etc., can also be suppressed.

Also, the monofunctional monomer is generally higher in rate of curing reaction in comparison to the polyfunctional monomer and therefore, by using the monofunctional monomer in combination, the radical polymerizable components as a whole can be enhanced in the rate of the curing reaction and the volatile solvent can also be volatilized after the curing reaction has substantially ended as described above.

Consequently, the cured product can be porosified more reliably and the hiding property of the character can be enhanced further.

In addition, the monofunctional monomer is generally low in viscosity in comparison to the polyfunctional monomer and therefore, by using it in combination with the volatile solvent that likewise contributes to a decrease in viscosity, an overall viscosity can also be suppressed to be within a range suitable for discharge from a nozzle of an inkjet printer.

Here, the ratio of the high Tg polyfunctional monomer in the total amount of the polyfunctional monomer is restricted to not less than 30 mass % as stated above by the following reason.

That is, if the ratio of the high Tg polyfunctional monomer is less than this range, the effect, due to selectively using the high Tg polyfunctional monomer, of enhancing the hiding property of a character cannot be obtained in some cases.

In contrast, by setting the ratio of the high Tg polyfunctional monomer within the range mentioned above, it becomes possible to enhance the hiding property of a character and print a character that is excellent in hiding property.

Also, the ratio of the monofunctional monomer in the total amount of the radical polymerizable components is restricted to be not less than 5 mass % and not more than 70 mass % by the following reasons.

That is, if the ratio of the monofunctional monomer is less than this range, the effects, due to using the monofunctional monomer in combination, of imparting a suitable flexibility to the cured product, enhancing the rate of the curing reaction, and suppressing the overall viscosity of the inkjet ink from increasing cannot be obtained in some cases.

On the other hand, if the ratio of the monofunctional monomer exceeds the range mentioned above, the high Tg polyfunctional monomer in particular becomes deficient relatively and the effect, due to selectively using the high Tg polyfunctional monomer, of enhancing the hiding property of a character cannot be obtained in some cases.

Also, the polyfunctional monomer that becomes a base of a three-dimensional network structure becomes deficient, the three-dimensional network structure that is formed becomes coarse, and a toughness of the cured product and an abrasion resistance of the character become insufficient in some cases.

In contrast, by setting the ratio of the monofunctional monomer within the range mentioned above, it becomes possible to further enhance the hiding property of a character while maintaining the effects due to using the monofunctional monomer in combination and yet suppressing insufficiencies of the toughness of the cured product and the abrasion resistance of the character.

Further, the ratio of the volatile solvent with respect to the total amount of the radical polymerizable components is restricted to not less than 50 mass % and not more than 400 mass % by the following reasons.

That is, if the ratio of the volatile solvent that becomes a base of porosifying the cured product is less than this range, the effect of porosifying the cured product to enhance the hiding property of a character cannot be obtained in some cases.

This also amounts to the ratio of the volatile solvent that contributes to the decrease in viscosity as mentioned above becoming insufficient such that the overall viscosity exceeds the range suitable for an inkjet ink and a defect of not enabling satisfactory discharge from a nozzle of an inkjet printer is caused in some cases.

On the other hand, if the ratio of the volatile solvent exceeds the range mentioned above, a solids concentration in the inkjet ink becomes insufficient and consequently, a character having sufficient thickness and being excellent in abrasion resistance cannot be formed on a surface of a printing object in some cases.

In contrast, if the ratio of the volatile solvent is set within the range mentioned above, a character having sufficient thickness, being excellent in abrasion resistance, and being high in hiding property can be printed while suppressing the overall viscosity of the inkjet ink to be within the range suitable for discharge to suppress the occurrence of a discharge defect.

Here, the glass transition temperatures Tg (° C.) of the polyfunctional monomer including the high Tg polyfunctional monomer and the monofunctional monomer shall be represented by values determined from results of measurements by the following method.

That is, first, a monomer for which the glass transition temperature Tg (° C.) is to be determined is polymerized alone to prepare a sample for measurement constituted of a homopolymer of the monomer.

Specifically, the monomer is polymerized by using a medium pressure mercury arc lamp of 300 W/inch to irradiate ultraviolet rays at conditions of UV processing speed: 25 ft/min and integrated exposure: 1.5 J/cm2 to prepare the sample.

In this process, the integrated exposure is measured using an IL390B radiometer made by International Light Technologies Inc.

Next, using the prepared sample, the glass transition temperature Tg (° C.) is determined from a measurement result obtained by differential scanning calorimetry (DSC) or, depending on the type of monomer, dynamic mechanical analysis (DMA).

The measurement method described above is in conformance to a measurement method described in a catalog of ARKEMA Inc., which is a manufacturer of polyfunctional monomers and monofunctional monomers.

The inkjet ink can largely be classified as a white color printing inkjet ink for printing a character in white color (hereinafter abbreviated at times as "white ink") or an inkjet ink for printing a character of an arbitrary color tone besides white color (herein after abbreviated at times as"color ink").

{White Ink}

With the white ink for white color printing, the high Tg polyfunctional monomer is a high Tg polyfunctional monomer (I) with a glass transition temperature of not less than 60° C., the ratio of the high Tg polyfunctional monomer (I) is not less than 50 mass % in the total amount of the polyfunctional monomer, the ratio of the monofunctional monomer is not less than 15 mass % and not more than 70 mass % in the total amount of the radical polymerizable components, and the ratio of the volatile solvent is not less than 50 mass % and not more than 400 mass % with respect to the radical polymerizable components.

According to this arrangement, a degree of whitening, that is, a whiteness of a character due to porosification of the cured product by the mechanism described above can be enhanced even more.

The whiteness and the hiding property of a character of white color can thus be enhanced, without using titanium oxide or other white pigment, to be approximately equivalent to that in the case of containing the white pigment.

<Whiteness>

An L value that represents the whiteness of a character that is printed using the white ink is preferably not less than 40.

If the L value is less than this range, the whiteness of the character is insufficient and a color tone or a pattern, etc., of a surface of a base becomes more likely to show up and, for example, in some cases, unevenness of color is conspicuous when solid printing is performed or a barcode appears to be blurred or chipped when it is printed.

In contrast, by making the L value be within the range mentioned above, the whiteness of the character can be enhanced and it is possible, for example, to suppress unevenness of color from being conspicuous when solid printing is performed or a barcode from appearing blurred or chipped when it is printed.

Here, inconsideration of improving the effect even more, the L value is preferably not less than 50, more preferably not less than 60, and especially preferably not less than 70 even within the range mentioned above.

To measure the L value, first, using the white ink in an inkjet printer, solid printing is performed on a surface of polyethylene terephthalate (PET) film as a printing object under an environment of ordinary temperature (5 to 35° C.).

Next, within 0.15 seconds from printing, the white ink is made to undergo the curing reaction by exposure using an LED curing lamp to form a sample of 0.5×0.5 inches. A resolution of printing is set to 600×600 dpi.

The L value of the formed sample is then measured using a handheld colorimeter 〈X-rite (registered trademark) eXact manufactured by Videojet X-Rite K. K.〉.

To porosify the cured product more reliably and further enhance the whiteness and the hiding property of a character, the volatile solvent is preferably volatilized with a delay with respect to progress of the curing reaction and especially preferably, the volatile solvent is volatilized after the curing reaction is substantially ended.

For this purpose, for example, types and combination of the radical polymerizable components and type and combination of the volatile solvent should be selected as appropriate.

Further, even if the L value is low with one time of printing, it is possible to improve the L value by printing repeatedly two times or three times.

Here, the ratio of the high Tg polyfunctional monomer (I) in the total amount of the polyfunctional monomer in the white ink (hereinafter provided at times with the symbol "$Rmh_1$") is restricted to not less than 50 mass % as stated above by the following reason.

That is, if the ratio $Rmh_1$ of the high Tg polyfunctional monomer (I) is less than this range, the effect, due to selectively using the high Tg polyfunctional monomer (I), of enhancing the whiteness and the hiding property of a character cannot be obtained in some cases.

In contrast, by setting the ratio $Rmh_1$ of the high Tg polyfunctional monomer (I) within the range mentioned above, it becomes possible to enhance the whiteness of a character and print the character of white color that is excellent in hiding property.

Also, the ratio of the monofunctional monomer in the total amount of the radical polymerizable components in the white ink (hereinafter provided at times with the symbol "$RS_1$") is restricted to not less than 15 mass % and not more than 70 mass % by the following reasons.

That is, if the ratio $RS_1$ of the monofunctional monomer is less than this range, the effects, due to using the monofunctional monomer in combination, of imparting a suitable flexibility to the cured product, enhancing the rate of the curing reaction, and suppressing an overall viscosity of the white ink from increasing cannot be obtained in some cases.

On the other hand, if the ratio $RS_1$ of the monofunctional monomer exceeds the range mentioned above, the high Tg polyfunctional monomer (I) in particular becomes deficient relatively and the effect, due to selectively using the high Tg polyfunctional monomer (I), of enhancing the whiteness and the hiding property of a character cannot be obtained in some cases.

Also, the polyfunctional monomer that becomes the base of the three-dimensional network structure becomes deficient, the three-dimensional network structure that is formed becomes coarse, and the toughness of the cured product and the abrasion resistance of the character become insufficient in some cases.

In contrast, by setting the ratio $RS_1$ of the monofunctional monomer within the range mentioned above, it becomes possible to further enhance the whiteness and the hiding property of a character while maintaining the effects due to using the monofunctional monomer in combination and yet suppressing insufficiencies of the toughness of the cured product and the abrasion resistance of the character.

Further, the reasons for restricting the ratio of the volatile solvent with respect to the total amount of the radical polymerizable components in the white ink (hereinafter provided at times with the symbol "$RV_1$") to not less than 50 mass % and not more than 400 mass % are as have been described above.

That is, if the ratio $RV_1$ of the volatile solvent that becomes the base of porosifying the cured product is less than this range, the effect of porosifying the cured product to enhance the whiteness and the hiding property of a character cannot be obtained in some cases.

This also amounts to the ratio of the volatile solvent that contributes to the decrease in viscosity as mentioned above becoming insufficient such that the overall viscosity of the white ink exceeds the range suitable for an inkjet ink and a defect of not enabling satisfactory discharge from a nozzle of an inkjet printer is caused in some cases.

On the other hand, if the ratio $RV_1$ of the volatile solvent exceeds the range mentioned above, a solids concentration in the white ink becomes insufficient and consequently, a character having sufficient thickness and being excellent in abrasion resistance cannot be formed on a surface of a printing object in some cases.

In contrast, if the ratio $RV_1$ of the volatile solvent is set within the range mentioned above, a character of white color having sufficient thickness, being excellent in abrasion resistance, and being high in whiteness and hiding property can be printed while suppressing the overall viscosity of the white ink to be within the range suitable for discharge to suppress the occurrence of a discharge defect.

These are also clear from results of examples and comparative examples described below.

⟨ Radical Polymerizable Components ⟩
<High Tg Polyfunctional Monomer (I)>

As the high Tg polyfunctional monomer (I), various monomers having two or more radical polymerizable groups within a single molecule, in other words, being difunctional or higher and having a glass transition temperature Tg of not less than 60° C. can be used.

Although not restricted thereto, for example, the following various compounds, etc., can be cited as specific examples of the high Tg polyfunctional monomer (I). One type or two or more types of these high Tg polyfunctional monomers (I) can be used.

(Difunctional Acrylates)

SR212 ⟨1,3-butylene glycol diacrylate; glass transition temperature Tg: 101° C.⟩, SR230⟨ diethylene glycol diacrylate; glass transition temperature Tg: 100° C.⟩, SR247 ⟨neopentyl glycol diacrylate; glass transition temperature Tg: 107° C.⟩, SR306H ⟨tripropylene glycol diacrylate; glass transition temperature Tg: 62° C.⟩, SR306NS ⟨tripropylene glycol diacrylate; glass transition temperature Tg: 62° C.⟩, SR349 ⟨ethoxylated (3) bisphenol A diacrylate; glass transition temperature Tg: 67° C.⟩, SR349NS ⟨ethoxylated (3) bisphenol A diacrylate; glass transition temperature Tg: 67° C.⟩, SR508 ⟨dipropylene glycol diacrylate; glass transition temperature Tg: 104° C.⟩, SR508NS ⟨dipropylene glycol diacrylate; glass transition temperature Tg: 104° C.⟩, CD595⟨dodecane diacrylate; glass transition temperature Tg: 91° C.⟩, SR601⟨ethoxylated (4) bisphenol A diacrylate; glass transition temperature Tg: 60° C.⟩, SR601NS ⟨ethoxylated (4) bisphenol A diacrylate; glass transition temperature Tg: 60° C.⟩, SR833⟨tricyclodecane dimethanoldiacrylate; glass transition temperature Tg: 186° C.⟩, and SR833NS ⟨tricyclodecane dimethanol diacrylate; glass transition temperature Tg: 186° C.⟩ of the SARTOMER (registered trademark) series manufactured by ARKEMA Inc.

NPGDA ⟨neopentyl glycol diacrylate; glass transition temperature Tg: 107° C.⟩ of the KAYARAD (registered trademark) series manufactured by Nippon Kayaku Co., Ltd.

NP-A ⟨neopentyl glycol diacrylate; glass transition temperature Tg: 107° C.⟩ of the LIGHT ACRYLATE (registered trademark) series manufactured by Kyoeisha Chemical Co., Ltd.

(Difunctional Methacrylates) SR101 ⟨ethoxylated bisphenol A dimethacrylate; glass transition temperature Tg: 122° C.⟩, SR231 ⟨diethylene glycol dimethacrylate; glass transition temperature Tg: 66° C.⟩, SR231NS (diethylene glycol dimethacrylate; glass transition temperature Tg: 66° C.), SR297 ⟨1,3-butylene diol dimethacrylate; glass transition temperature Tg: 85° C.⟩, CD540 ⟨ethoxylated bisphenol A dimethacrylate; glass transition temperature Tg: 108° C.⟩, and SR540 ⟨ethoxylated (4) bisphenol A dimethacrylate; glass transition temperature Tg: 108° C.⟩ of the SARTOMER series manufactured by ARKEMA Inc.

(Trifunctional Acrylates)

SR368 ⟨tris(2-hydroxyethyl)isocyanate triacrylate; glass transition temperature Tg: 272° C.⟩, SR368NS ⟨tris(2-hydroxyethyl)isocyanate triacrylate; glass transition temperature Tg: 272° C.⟩, SR444 ⟨pentaerythritol triacrylate; glass transition temperature Tg: 103° C.⟩, SR444NS ⟨pentaerythritol triacrylate; glass transition temperature Tg: 103° C.⟩, SR351 ⟨trimethylol propane triacrylate; glass transition temperature Tg: 62° C.⟩, SR351S ⟨trimethylol propane triacrylate; glass transition temperature Tg: 62° C.⟩, and SR351NS (trimethylol propane triacrylate; glass transition temperature Tg: 62° C.) of the SARTOMER series manufactured by ARKEMA Inc.

TMPTA⟨trimethylolpropane triacrylate; glass transition temperature Tg: 62° C.⟩ of the KAYARAD series manufactured by Nippon Kayaku Co., Ltd.

TMP-A⟨trimethylol propane triacrylate; glass transition temperature Tg: 62° C.⟩ and PE-3A⟨pentaerythritol triacrylate; glass transition temperature Tg: 103° C.⟩ of the LIGHT ACRYLATE series manufactured by Kyoeisha Chemical Co., Ltd.

A-TMPT ⟨ trimethylol propane triacrylate; glass transition temperature Tg: 62° C.⟩ manufactured by Shin-Nakamura Chemical Co., Ltd.

(Tetrafunctional Acrylates)

SR295 ⟨pentaerythritol tetraacrylate; glass transition temperature Tg: 103° C.⟩, SR295NS ⟨ pentaerythritol tetraacrylate; glass transition temperature Tg: 103° C.⟩, SR355 ⟨ditrimethylol propane tetraacrylate; glass transition temperature Tg: 98° C.⟩, and SR355NS ⟨ditrimethylol propane tetraacrylate; glass transition temperature Tg: 98° C.⟩ of the SARTOMER series manufactured by ARKEMA Inc.

PE-4A ⟨pentaerythritol tetraacrylate; glass transition temperature Tg: 103° C.⟩ of the LIGHT ACRYLATE series manufactured by Kyoeisha Chemical Co., Ltd.

A-TMMT ⟨pentaerythritol tetraacrylate; glass transition temperature Tg: 103° C.⟩ and AD-TMP ⟨ditrimethylol propane tetraacrylate; glass transition temperature Tg: 98° C.⟩ manufactured by Shin-Nakamura Chemical Co., Ltd.

(Pentafunctional Acrylates)

SR399 ⟨dipentaerythritol pentaacrylate; glass transition temperature Tg: 90°⟩, SR399NS ⟨dipentaerythritol pentaacrylate; glass transition temperature Tg: 90° C.⟩, SR9041 ⟨pentaacrylate ester; glass transition temperature Tg: 102° C.⟩ of the SARTOMER series manufactured by ARKEMA Inc.

Here, in consideration of further improving the effects described above, preferably a trifunctional or higher compound and more preferably a trifunctional or higher compound with a glass transition temperature Tg of not less than 90° C. is selectively used as the high Tg polyfunctional monomer (I).

In particular, it is even more preferable to selectively use a trifunctional or higher compound with a glass transition temperature Tg of not less than 200° C. and not more than 300° C. or a tetrafunctional or higher compound with a glass transition temperature Tg of not less than 100° C. but less than 200° C., etc.

<Monofunctional Monomer>

As the monofunctional monomer, various monomers that are copolymerizable with the high Tg polyfunctional monomer (I) described above and has just one radical polymerizable group in a single molecule can be used.

Although not restricted thereto, for example, the following various compounds, etc., can be cited as specific examples of the monofunctional monomer. One type or two or more types of these monofunctional monomers can be used.

(N-Vinyl Lactam Monomers)
N-vinyl lactam monomers represented by:

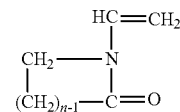

⟨ In the formula, n represents 1 to 7.⟩

As specific examples of N-vinyl lactam monomers, for example, N-vinyl-2-pyrrolidone represented by formula (1-1) with which n in formula (1) is 3:

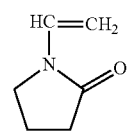

and N-vinyl-ε-caprolactam represented by formula (1-2) with which n in formula (1) is 5 (hereinafter abbreviated at times as "VCAP"):

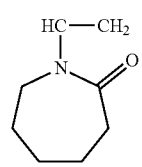

and so forth can be cited.

One type or two or more types of these N-vinyl lactam monomers can be used.

The N-vinyl lactam monomer is excellent in an effect of enhancing a fixing property with respect to a surface of a printing object and the abrasion resistance associated therewith of the cured product that forms a character.

Therefore, a character that is printed on a surface of a flexible printing object such as paper or film, etc., can be further improved in the followability with respect to bending of the printing object and peeling, etc., of the character when the printing object is bent, etc., can also be suppressed even more satisfactorily.

Also, the N-vinyl lactam monomer has an effect of enhancing the rate of the curing reaction by improving photosensitivity of the white ink as a sensitizer of the photo-radical polymerization initiator as well.

In particular, the VCAP of formula (1-2) is excellent in these effects and can be used favorably as the monofunctional monomer.

(Other Monofunctional Monomers)

As the monofunctional monomer, another monofunctional monomer can be used together with the N-vinyl lactam monomer or in place of the N-vinyl lactam monomer.

As examples of the other monofunctional monomer, acrylic acid, methacrylic acid, itaconic acid, crotonic acid, isocrotonic acid, maleic acid, and other unsaturated carboxylic acids and salts or esters thereof, anhydrides having an ethylenically unsaturated group, acrylonitrile, styrene and derivatives thereof, unsaturated polyesters, unsaturated polyethers, unsaturated polyamides, unsaturated polyurethanes, allyl glycidyl ether and other allyl compounds, monofunctional (meth)acrylate compounds, monofunctional vinyl ether compounds, monofunctional (meth)acrylamide compounds, etc., can be cited.

One type or two or more types of these monofunctional monomers may be used.

Also, although not restricted thereto, for example, the following various compounds, etc., can be cited as specific examples of the monofunctional acrylate among the above. One type or two or more types of these monofunctional acrylates can be used.

SR217NS 〈4-tert-butyl cyclohexanolacrylate; glass transition temperature Tg: none〉, SR256 〈2-(2-ethoxyethoxy) ethyl acrylate; glass transition temperature Tg: −54° C.〉, SR257〈stearyl acrylate; glass transition temperature Tg: 35° C.〉, SR285〈tetrahydrofurfuryl acrylate; glass transition temperature Tg: −15° C.〉, SR335 〈lauryl acrylate; glass transition temperature Tg: −30° C.〉, SR339A 〈2-phenoxyethyl acrylate; glass transition temperature Tg: 5° C.〉, SR339NS 〈2-phenoxyethyl acrylate; glass transition temperature Tg: 5° C.〉, SR395〈isodecyl acrylate; glass transition temperature Tg: −60° C.〉, SR395NS 〈isodecyl acrylate; glass transition temperature Tg: −60° C.〉, SR420NS 〈3,3,5-trimethylcyclohexanol acrylate; glass transition temperature Tg: 29° C.〉, SR440〈isooctyl acrylate; glass transition temperature Tg: −54°, SR484〈octyl/decyl acrylate; glass transition temperature Tg: −57° C.〉, SR489 〈tridecyl acrylate; glass transition temperature Tg: −55° C.〉, SR489D 〈tridecyl acrylate; glass transition temperature Tg: −55° C.〉, SR495〈caprolactone acrylate; glass transition temperature Tg: −53° C.〉, SR495NS 〈caprolactone acrylate; glass transition temperature Tg: −53° C.〉, SR504〈ethoxylated nonylphenyl acrylate; glass transition temperature Tg: none〉, SR504NS 〈ethoxylated 〈4〉 nonylphenyl acrylate; glass transition temperature Tg: −27° C.〉, SR506〈isobornyl acrylate; glass transition temperature Tg: 88° C.〉, SR506NS 〈isobornyl acrylate; glass transition temperature Tg: 88° C.〉, SR531〈cyclic trimethylolpropane formal acrylate; glass transition temperature Tg: 32° C.〉, SR551〈methoxypolyethylene glycol 〈350〉 monoacrylate; glass transition temperature Tg: −57° C.〉, SR611 〈alkoxylated tetrahydrofurfuryl acrylate; glass transition temperature Tg: −51° C.〉, CD614〈alkoxylated nonylphenyl acrylate; glass transition temperature Tg: none〉, CD9075 〈alkoxylated laurylacrylate; glass transition temperature Tg: −45° C.〉, SR9087〈alkoxylated phenol acrylate; glass transition temperature Tg: −24° C.〉, and CD9087〈alkoxylated 2-phenoxyethyl acrylate; glass transition temperature Tg: −23.5° C.〉 of the SARTOMER series manufactured by ARKEMA Inc.

Although not restricted thereto, for example, the following various compounds, etc., can be cited as specific examples of the monofunctional methacrylate. One type or two or more types of these monofunctional methacrylates can be used.

SR203 〈tetrahydrofurfuryl methacrylate; glass transition temperature Tg: 23° C.〉, SR242 〈isodecyl methacrylate; glass transition temperature Tg: none〉, SR313 〈laurylmethacrylate; glass transition temperature Tg: −65° C.〉, SR313NS〈laurylmethacrylate; glass transition temperature Tg: −28° C.〉, SR324 〈stearyl methacrylate; glass transition temperature Tg: 38° C.〉, SR324NS 〈stearyl methacrylate; glass transition temperature Tg: 38° C.〉, SR340 〈2-phenoxyethyl methacrylate; glass transition temperature Tg: 54° C.〉, CD421 〈3,3,5-trimethylcyclohexyl methacrylate; glass transition temperature Tg: 145° C.〉, SR423 〈isobornyl methacrylate; glass transition temperature Tg: 110° C.〉, SR423NS 〈isobornyl methacrylate; glass transition temperature Tg: 110° C.〉, SR493 〈tridecyl methacrylate; glass transition temperature Tg: −32° C.〉, SR493D 〈tridecyl methacrylate; glass transition temperature Tg: −40° C.〉, CD535 〈dicyclopentadienyl methacrylate; glass transition temperature Tg: 91° C.〉, CD545 〈diethylene glycol methyl ether methacrylate; glass transition temperature Tg: 57° C.〉, SR550〈methoxypolyethylene glycol (350) monomethacrylate; glass transition temperature Tg: −62° C.〉, CD550 〈methoxypolyethylene glycol (350) monomethacrylate; glass transition temperature Tg: −62° C.〉, CD552 〈methoxypolyethylene glycol (550) monomethacrylate; glass transition temperature Tg: −65° C.〉, SR604 〈 polypropylene glycol monomethacrylate; glass transition temperature Tg: none〉, and CD730 〈 triethylene glycol ethyl ether methacrylate; glass transition temperature Tg: −7° C.〉 of the SARTOMER series manufactured by ARKEMA Inc.

Further, although not restricted thereto, for example, the following various compounds, etc., can be cited as other specific examples of the monofunctional (meth)acrylate. One type or two or more types of these monofunctional (meth)acrylates can be used.

Acrylate compounds such as 2-hydroxyethylacrylate, butoxyethylacrylate, carbitolacrylate, cyclohexylacrylate, benzyl acrylate, epoxy acrylate, dicyclopentenyl acrylate, dicyclopentenyloxyethyl acrylate, dicyclopentanyl acrylate, 2-hydroxy-3-phenoxypropyl acrylate, 2-acryloyloxy ethyl phthalate, methoxypolyethylene glycol acrylate, 2-acryloyloxyethyl 2-hydroxyethyl phthalate, cyclic trimethylolpropane formal acrylate, 2-(2-ethoxyethoxy)ethyl acrylate, 2-methoxyethyl acrylate, 3-methoxybutyl acrylate, ethoxylated phenyl acrylate, 2-acryloyloxy ethyl succinate, nonylphenol EQ adduct acrylate, phenoxypolyethylene glycol acrylate, 2-acryloyloxy ethyl hexahydrophthalate, lactone modified acrylate, isoamyl acrylate, isomyristyl acrylate, isostearyl acrylate, etc.; and methacrylate compounds such as methylmethacrylate, n-butylmethacrylate, allyl methacrylate, glycidyl methacrylate, benzyl methacrylate, dimethylaminomethyl methacrylate, etc.

Although not restricted thereto, for example, the following various compounds, etc., can be cited as specific examples of the monofunctional vinyl ether. One type or two or more types of these monofunctional vinyl ethers can be used.

Methyl vinyl ether, ethyl vinyl ether, n-propyl vinyl ether, isopropyl vinyl ether, n-butyl vinyl ether, isobutyl vinyl ether, tert-butyl vinyl ether, n-octadecyl vinyl ether, 2-ethylhexyl vinyl ether, n-nonyl vinyl ether, dodecyl vinyl ether, cyclohexyl vinyl ether, cyclohexyl methyl vinyl ether, 4-methylcyclohexylmethyl vinyl ether, benzyl vinyl ether, dicyclopentenyl vinyl ether, 2-dicyclopentenoxyethylvinylether, methoxyethylvinylether, ethoxyethyl vinyl ether, butoxyethyl vinyl ether, methoxyethoxyethylvinylether, ethoxyethoxyethylvinylether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, cyclohexanedimethanol monovinyl ether, and isopropenyl ether-O-propylene carbonate.

Further, although not restricted thereto, for example, the following various compounds, etc., can be cited as specific examples of the monofunctional (meth)acrylamide. One type or two or more types of these monofunctional (meth) acrylamides can be used.

(Meth)acrylamide, N-methyl(meth)acrylamide, N-ethyl (meth)acrylamide, N-propyl (meth)acrylamide, N-isopropyl (meth)acrylamide, N-butyl(meth)acrylamide, N-sec-butyl (meth)acrylamide, N-tert-butyl(meth)acrylamide, N-cyclohexyl(meth)acrylamide, N-phenyl(meth)acrylamide, N,N-dimethyl(meth)acrylamide, 1-(meth)acryloylpyrrolidine, N-methylol(meth)acrylamide, N-(methoxyethyl) (meth)acrylamide, N-(2-hydroxyethyl)(meth)acrylamide, N-[3-(dimethylamino)propyl](meth)acrylamide, N-(1,1-dimethyl-3-oxobutyl)(meth)acrylamide, 4-(meth)acryloylmorpholine, and diacetone acrylamide.

<Other Radical Polymerizable Components>

As other radical polymerizable components that may be used in combination with the high Tg polyfunctional monomer (I) and the monofunctional monomer, for example, polyfunctional monomers being difunctional or higher and having two or more radical polymerizable groups within a single molecule and having a glass transition temperature Tg of less than 60° C. and oligomers, etc., can be cited.

Although not restricted thereto, for example, the following various compounds, etc., can be cited as specific examples of the other polyfunctional monomer among the above that are difunctional or higher and have the glass transition temperature Tg of less than 60° C. One type or two or more types of these other polyfunctional monomers can be used.

(Difunctional Acrylates) SR213 〈1,4-butanediol diacrylate; glass transition temperature Tg: 45° C.〉, SR238F 〈1,6-hexanediol diacrylate; glass transition temperature Tg: 43° C.〉, SR238NS 〈1,6-hexanediol diacrylate; glass transition temperature Tg: 43° C.〉, SR259 〈polyethylene glycol (200) diacrylate; glass transition temperature Tg: 13° C.〉, SR268 〈tetraethylene glycol diacrylate; glass transition temperature Tg: 23° C.〉, SR272 〈triethylene glycol diacrylate; glass transition temperature Tg: 48° C.〉, SR344 〈polyethylene glycol (400) diacrylate; glass transition temperature Tg: 3° C.〉, SR344NS 〈polyethylene glycol (400) diacrylate; glass transition temperature Tg: −25° C.〉, CD406 〈cyclohexanedimethanol diacrylate; glass transition temperature Tg: 21° C.〉, CD560 〈alkoxylated hexanediol diacrylate; glass transition temperature Tg: 1.5° C.〉, CD561 〈alkoxylated hexanediol diacrylate; glass transition temperature Tg: −38° C.〉, SR562 〈alkoxylated hexanediol diacrylate; glass transition temperature Tg: 37° C.〉, CD563 〈alkoxylated hexanediol diacrylate; glass transition temperature Tg: 14° C.〉, CD564 〈alkoxylated hexanediol diacrylate; glass transition temperature Tg: 14° C.〉, SR602 〈ethoxylated (10) bisphenol A diacrylate; glass transition temperature Tg: 2° C.〉, SR602NS 〉 ethoxylated (10) bisphenol A diacrylate; glass transition temperature Tg: 2° C.〉, SR610 〈polyethylene glycol (600) diacrylate; glass transition temperature Tg: −42° C.〉, SR610NS 〈polyethylene glycol (600) diacrylate; glass transition temperature Tg: −42° C.〉, SR833S 〈tricyclodecane dimethanol diacrylate; glass transition temperature Tg: none〉, SR9003 〈propoxylated (2) neopentyl glycol diacrylate; glass transition temperature Tg: 32° C.〉, SR9003NS 〈propoxylated (2) neopentyl glycol diacrylate; glass transition temperature Tg: 32° C.〉, SR9038 〈ethoxylated (30) bisphenol A diacrylate; glass transition temperature Tg: −42° C.〉, CD9043〈alkoxylated neopentylglycol diacrylate; glass transition temperature Tg: −35° C.〉, SR9045 〈alkoxylated neopentyl glycol diacrylate; glass transition temperature Tg: none〉, and SR9209 〈alkoxylated aliphatic diacrylate; glass transition temperature Tg: 48° C. 〉 of the SARTOMER series manufactured by ARKEMA Inc.

PEG400DA 〈polyethylene glycol (400) diacrylate〉, FM-400 〈neopentyl glycol hydroxypivalate diacrylate〉, R-167, HX-220, HX-620, R-551, R-712, R-604, and R-684 of the KAYARAD series manufactured by Nippon Kayaku Co., Ltd.

3EG-A 〈triethylene glycol diacrylate〉, 4EG-A 〈PEG #200 diacrylate〉, 9EG-A 〈PEG #400 diacrylate〉, 14-EG-A 〈PEG #600 diacrylate〉, PTMGA-250 〈polytetramethylene glycol diacrylate〉, MPD-A 〈3-methyl-1,5-pentanediol diacrylate〉, 1.6HX-A 〈1,6-hexanediol diacrylate〉, 1.9ND-A 〈1,9-nonanediol diacrylate〉, DCP-A 〈dimethylol tricyclodecane diacrylate〉, BP-4EAL 〈EOadduct diacrylate of bisphenol A〉, BP-4PA 〈PO adduct diacrylate of bisphenol A〉, and HPP-A 〈hydroxypyvalpivate diacrylate〉 of the LIGHT ACRYLATE series manufactured by Kyoeisha Chemical Co., Ltd.

(Difunctional Methacrylates)

SR150 〈ethoxylated bisphenol A dimethacrylate; glass transition temperature Tg: none〉, SR205 〈triethylene glycol dimethacrylate; glass transition temperature Tg: none〉, SR205NS 〈triethylene glycol dimethacrylate; glass transition temperature Tg: −8° C.〉, SR206〈ethylene glycol dimethacrylate; glass transition temperature Tg: none〉, SR206NS 〈ethylene glycoldimethacrylate; glass transition temperature Tg: 58° C.〉, SR209 〈tetraethylene glycol dimethacrylate; glass transition temperature Tg: −8° C.〉, SR210 〈polyethylene glycol dimethacrylate; glass transition temperature Tg: none〉, SR210NS〈polyethylene glycol dimethacrylate; glass transition temperature Tg: none〉, SR214 〈1,4-butanediol dimethacrylate; glass transition temperature Tg: none⟩, SR214NS ⟨4,4-butanediol dimethacrylate; glass transition temperature Tg: 55° C.⟩, SR239NS ⟨1,6-hexanediol dimethacrylate; glass transition temperature Tg: 30° C.⟩, SR248 ⟨neopentyl glycol dimethacrylate; glass transition temperature Tg: none⟩, SR252 ⟨polyethylene glycol (600) dimethacrylate; glass transition temperature Tg: none⟩, SR252NS ⟨polyethylene glycol (600) dimethacrylate; glass transition temperature Tg: −39° C.⟩, SR262 ⟨1,12-dodecanediol dimethacrylate; glass transition temperature Tg: −37° C.⟩, SR348 ⟨ethoxylated (2) bisphenol A dimethacrylate; glass transition temperature Tg: none⟩, SR348NS ⟨ethoxylated (2) bisphenol A dimethacrylate; glass transition temperature Tg: 6° C.⟩, SR480 ⟨ethoxylated (10) bisphenol A dimethacrylate; glass transition temperature Tg: −1° C.⟩, SR480NS ⟨ethoxylated (10) bisphenol A dimethacrylate; glass transition temperature Tg: −1° C.⟩, CD541 ⟨ethoxylated bisphenol A dimethacrylate; glass transition temperature Tg: 54° C.⟩, SR541⟨ethoxylated (6) bisphenolAdimethacrylate; glass transition temperature Tg: 54° C.⟩, CD542⟨ethoxylated bisphenol A dimethacrylate; glass transition temperature Tg: none⟩, SR603 ⟨polyethylene glycol (400) dimethacrylate; glass transition temperature Tg: −21° C.⟩, SR644⟨polypropylene glycol ⟨400⟩ dimethacrylate; glass transition temperature Tg: −5° C.⟩, SR740 ⟨polyethylene glycol (1000) dimethacrylate; glass transition temperature Tg: −118° C.⟩, and SR9036 ⟨ethoxylated (30) bisphenol A dimethacrylate; glass transition temperature Tg: −43° C.⟩ of the SARTOMER series manufactured by ARKEMA Inc.

(Acrylate/Methacrylate (Difunctional))

Light ester G-201⟨-hydroxy-3-acryloyloxypropyl methacrylate; glass transition temperature Tg: −118° C.⟩ and SR9036 ⟨ethoxylated (30) bisphenol A dimethacrylate; glass transition temperature Tg: none⟨ manufactured by Kyoeisha Chemical Co., Ltd.

(Trifunctional Acrylates)

SR415⟨ethoxylated (20) trimethylolpropane triacrylate; glass transition temperature Tg: 38° C.⟩, SR454 ⟨ethoxylated (3) trimethylolpropane triacrylate; glass transition temperature Tg: −40° C.⟩, SR454NS ⟨ethoxylated (3) trimethylolpropane triacrylate; glass transition temperature Tg: −40° C.⟩, SR492 ⟨propoxylated (3) trimethylolpropane triacrylate; glass transition temperature Tg: −15° C.⟩, SR492TFN ⟨propoxylated (3) trimethylolpropane triacrylate; glass transition temperature Tg: −15° C.⟩, SR499 ⟨ethoxylated (6) trimethylolpropane triacrylate; glass transition temperature Tg: −8° C.⟩, SR499NS ⟨ethoxylated (6) trimethylolpropane triacrylate; glass transition temperature Tg: −8° C.⟩, CD501 ⟨propoxylated (6) trimethylolpropane triacrylate; glass transition temperature Tg: −2° C.⟩, SR502 ⟨ethoxylated (9) trimethylolpropane triacrylate; glass transition temperature Tg: −19° C.⟩, SR502NS ⟨ethoxylated (9) trimethylolpropane triacrylate; glass transition temperature Tg: −19° C.⟩, SR9020 ⟨propoxylated (3) glyceryl triacrylate; glass transition temperature Tg: 18° C.⟩, SR9020NS ⟨propoxylated (3) glyceryl triacrylate; glass transition temperature Tg: 18° C.⟩, CD9021 ⟨highly propoxylated (5.5) glyceryl triacrylate; glass transition temperature Tg: −11° C.⟩, and SR9035 ⟨ethoxylated (15) trimethylolpropane triacrylate; glass transition temperature Tg: −32° C.⟩ of the SARTOMER series manufactured by ARKEMA Inc.

GPO-303 and PET-30 of the KAYARAD series manufactured by Nippon Kayaku Co., Ltd.

(Trifunctional Methacrylates)

SR350 ⟨trimethylolpropane trimethacrylate; glass transition temperature Tg: 27° C.⟩ and SR350NS ⟨trimethylolpropane trimethacrylate; glass transition temperature Tg: 27° C.⟩ of the SARTOMER series manufactured by ARKEMA Inc.

(Tetrafunctional and Higher Acrylates)

SR494 ⟨ethoxylated (4) pentaerythritol tetraacrylate, tetrafunctional; glass transition temperature Tg: 2° C.⟩, SR494NS ⟨alkoxylated pentaerythritol tetraacrylate, tetrafunctional; glass transition temperature Tg: 2° C.⟩, and DPHA NS ⟨dipentaerythritol hexaacrylate, hexafunctional; glass transition temperature Tg: none⟩ of the SARTOMER series manufactured by ARKEMA Inc.

T-1420(T) ⟨dipentaerythritol tetraacrylate, tetrafunctional⟩, RP-1040 ⟨ethoxylated pentaerythritol tetraacrylate, tetrafunctional⟩, DPHA ⟨mixture of tetrafunctional and hexafunctional⟩, DPEA-12 ⟨hexafunctional⟩, D-310 ⟨pentafunctional⟩, DPCA-20 ⟨hexafunctional⟩, DPCA-30 ⟨hexafunctional⟩, DPCA-60 ⟨hexafunctional⟩, DPCA-120 ⟨hexafunctional⟩ of the KAYARAD series manufactured by Nippon Kayaku Co., Ltd.

DPE-6A ⟨dipentaerythritol hexaacrylate, hexafunctional⟩ of the LIGHT ACRYLATE series manufactured by Kyoeisha Chemical Co., Ltd.

A-DHP ⟨dipentaerythritol hexaacrylate, hexafunctional⟩ manufactured by Shin-Nakamura Chemical Co., Ltd.

<Ratios of Radical Polymerizable Components>

As mentioned above, the ratio $Rmh_1$ of the high Tg polyfunctional monomer (I) is restricted to not less than 50 mass % in the total amount of the polyfunctional monomer.

The reason is as has been mentioned above.

That is, by setting the ratio $Rmh_1$ of the high Tg polyfunctional monomer (I) within the range mentioned above, it becomes possible to enhance the whiteness of a character due to the porosification of the cured product and print the character of white color that is high in hiding property.

Here, in consideration of improving the effects even more, the ratio $Rmh_1$ of the high Tg polyfunctional monomer (I) is preferably not less than 60 mass % and especially preferably not less than 65 mass % in the total amount of the polyfunctional monomer even within the range mentioned above.

Also, an upper limit of the ratio $Rmh_1$ of the high Tg polyfunctional monomer (I) is not restricted in particular and an entire amount of the polyfunctional monomer may be the high Tg polyfunctional monomer (I).

That is, the ratio $Rmh_1$ of the high Tg polyfunctional monomer (I) may be 100 mass % in the total amount of the polyfunctional monomer.

If the ratio $Rmh_1$ of the high Tg polyfunctional monomer (I) is set to 100 mass % in the total amount of the polyfunctional monomer, it becomes possible to further improve the whiteness of a character due to the porosification of the cured product and print the character of white color that is even higher in hiding property.

A ratio in the total amount of the polyfunctional monomer of another polyfunctional monomer besides the high Tg polyfunctional monomer (I) is a remaining amount after the high Tg polyfunctional monomer (I).

That is, in setting the ratio $Rmh_1$ of the high Tg polyfunctional monomer (I) to a predetermined value within the range mentioned above, the ratio of the other polyfunctional monomer should be set such that the total amount of the polyfunctional monomer would be 100 mass %.

Also, a ratio of the high Tg polyfunctional monomer (I) in a total amount of the white ink is preferably not less than 8.5 mass % and preferably not more than 38 mass %.

If the ratio of the high Tg polyfunctional monomer (I) is less than this range, the above-described effect, due to selectively using the high Tg polyfunctional monomer (I), of enhancing the whiteness and the hiding property of a character cannot be obtained in some cases.

On the other hand, if the ratio of the high Tg polyfunctional monomer (I) exceeds the range mentioned above, although also depending on a ratio of the monofunctional monomer, flexibility is decreased, the cured product becomes rigid and brittle, and the abrasion resistance of a character constituted of the cured product becomes insufficient in some cases.

In contrast, by setting the ratio of the high Tg polyfunctional monomer (I) within the range mentioned above, it becomes possible to further enhance the whiteness and the hiding property of a character while suppressing insufficiency of the abrasion resistance of the character.

Here, in consideration of improving the effects even more, the ratio of the high Tg polyfunctional monomer (I) is preferably not less than 13 mass % and preferably not more than 33 mass % in the total amount of the white ink even within the range mentioned above.

The ratio of the other polyfunctional monomer is preferably not more than 17 mass % and especially preferably not more than 13 mass % in the total amount of the white ink.

If the ratio of the other polyfunctional monomer exceeds this range, the ratio of the high Tg polyfunctional monomer (I) is decreased relatively and the effect of enhancing the whiteness and the hiding property of a character cannot be obtained in some cases.

Also, the ratio of the monofunctional monomer is decreased relatively and the effects of imparting a suitable flexibility to the cured product, enhancing the rate of the curing reaction, and suppressing the viscosity of the white ink cannot be obtained in some cases.

Here, a lower limit of the ratio of the other polyfunctional monomer is not restricted in particular and it is possible, as mentioned above, for the entire amount of the polyfunctional monomer to be the high Tg polyfunctional monomer (I) and the other polyfunctional monomer to be not included (to be excluded).

That is, the ratio of the other polyfunctional monomer may be 0 mass % in the total amount of the white ink.

The ratio $RS_1$ of the monofunctional monomer is restricted to not less than 15 mass % and not more than 70 mass % in the total amount of the radical polymerizable components.

The reasons for this are also as have been described above.

That is, by setting the ratio $RS_1$ of the monofunctional monomer within the range mentioned above, it becomes possible to further enhance the whiteness and the hiding property of a character while maintaining the effects due to using the monofunctional monomer in combination and yet suppressing insufficiencies of the toughness of the cured product and the abrasion resistance of the character.

Here, in consideration of improving the effects even more, the ratio $RS_1$ of the monofunctional monomer is preferably not less than 20 mass % and preferably not more than 65 mass % in the total amount of the radical polymerizable components even within the range mentioned above.

Also, the ratio of the monofunctional monomer in the total amount of the white ink is preferably not less than 6.5 mass % and preferably not more than 32 mass %.

If the ratio of the monofunctional monomer is less than this range, although also depending on the ratio of the polyfunctional monomer, the above-described effects due to using the monofunctional monomer in combination cannot be obtained in some cases.

That is, the effects of imparting a suitable flexibility to the cured product, enhancing the rate of the curing reaction, and suppressing the viscosity of the white ink cannot be obtained at times.

On the other hand, if the ratio of the monofunctional monomer exceeds the range mentioned above, the polyfunctional monomer that becomes the base of the three-dimensional network structure becomes deficient, the three-dimensional network structure that is formed becomes coarse, and the toughness of the cured product and the abrasion resistance of a character become insufficient in some cases.

Also, in some cases, the high Tg polyfunctional monomer (I) becomes deficient and the effect of enhancing the whiteness and the hiding property of a character cannot be obtained sufficiently.

In contrast, by setting the ratio of the monofunctional monomer within the range mentioned above, it becomes possible to further enhance the whiteness and the hiding property of a character while maintaining the effects due to using the monofunctional monomer in combination and yet suppressing insufficiencies of the toughness of the cured product and the abrasion resistance of the character.

Here, in consideration of improving the effects even more, the ratio of the monofunctional monomer is preferably not less than 8 mass % and preferably not more than 30 mass % in the total amount of the white ink even within the range mentioned above.

⟨Binder Resin⟩

A binder resin may be blended in the white ink to enhance the fixing property with respect to a surface of a printing object and the abrasion resistance associated therewith of a character.

As the binder resin, various binder resins that can be dissolved or dispersed satisfactorily in the volatile solvent or the radical polymerizable components can be used.

As the binder resin, various types of polyamide resin, acrylic resin, phenol resin, etc., that are excellent in solubility in the volatile solvent can be cited in particular. One type or two or more types of these binder resins can be used.

<Polyamide Resin>

Although not restricted thereto, for example, the following various polyamide resins, etc., can be cited as the polyamide resin. One type or two or more types of these polyamide resins can be used.

725, 744, 756, and 759 of the Versamid (registered trademark) series manufactured by BASF Japan Ltd., 615A and 640 of the Sunmide (registered trademark) series manufactured by Air Products and Chemicals, Inc., and 90, 92, 391, 394-N, 395, and TXC-135-G of the Tohmide (registered trademark) series manufactured by T&K TOKA Co., Ltd.

<Acrylic Resin>

Although not restricted thereto, for example, the following various acrylic resins, etc., can be cited as the acrylic resin. One type or two or more types of these acrylic resins can be used.

NK-350 and NK-380 of the POLYMENT (registered trademark) series manufactured by Nippon Shokubai Co., Ltd., B-67 of the PARALOID (registered trademark) series manufactured by Rohm & Haas Co., and B-813, B-817, and B-818 of the NeoCryl (registered trademark) series manufactured by DSM Co., Ltd.

<Phenol Resin>

As the phenol resin, novolac resin, which are thermoplastic resin, are especially preferable and although not restricted thereto, for example, the following various novolac resins, etc., can be cited as the novolac resin. One type or two or more types of these novolac resins can be used.

TD-2131, TD-2106, TD-2093, TD-2093Y, TD-2090, and TD-2091 of the PHENOLITE (registered trademark) series manufactured by DIC Corp. and BRG-555, BRG-564, and CKM-2432 of the SHONOL (registered trademark) series manufactured by Aica Kogyo Co., Ltd.

A ratio of the binder resin is preferably not less than 1 mass % and preferably not more than 10 mass % in the total amount of the white ink.

If the ratio of the binder resin is less than this range, the effect of enhancing the fixing property and the abrasion resistance of a character with respect to a surface of a printing object due to blending the binder resin cannot be obtained sufficiently in some cases.

On the other hand, if the ratio of the binder resin exceeds the range mentioned above, so-called cogation occurs in some cases, especially when the white ink is used in a thermal type inkjet printer.

In contrast, by setting the ratio of the binder resin within the range mentioned above, the fixing property and the abrasion resistance of a character with respect to a surface of a printing object can be enhanced sufficiently while suppressing the occurrence of cogation.

Here, in consideration of improving the effects even more, the ratio of the binder resin is preferably not less than 1.5 mass % and preferably not more than 8 mass % in the total amount of the white ink even within the range mentioned above.

〈Volatile Solvent〉

As the volatile solvent, various volatile solvents that can dissolve or disperse the radical polymerizable components and the binder resin satisfactorily and have volatility can be used.

In particular, a preferable volatile solvent is that which after printing on a surface of a printing object is performed can volatilize preferably with a delay with respect to progress of the curing reaction of the radical polymerizable components and especially after the curing reaction is substantially ended.

As the volatile solvent, for example, various alcohols, ketones, ethers, esters, etc., can be cited. One type or two or more types of these volatile solvents can be used.

<Alcohol with 1 to 3 Carbon Atoms>

As the volatile solvent, an alcohol with 1 to 3 carbon atoms that has the suitable volatility described above and is unlikely to incur damage on a head of an inkjet printer, etc., is especially preferable.

As the alcohol with 1 to 3 carbon atoms, methanol, ethanol, 1-propanol, 2-propanol, etc., can be cited. One type or two or more types of these alcohols can be used.

<Other Volatile Solvents>

Also, as the volatile solvent, at least one type of another volatile solvent such as an alcohol with 4 or more carbon atoms, a ketone, an ether, an ester, etc., may be used in combination with the alcohol with 1 to 3 carbon atoms.

These other volatile solvents are all excellent in ability to dissolve the radical polymerizable components and the binder resin and are thus capable of aiding the alcohol with 1 to 3 carbon atoms dissolve these components and controlling its dissolving ability arbitrarily.

Also, solubilities of the radical polymerizable components and the binder resin can be aided and the solubilities of these components can also be controlled arbitrarily.

As the alcohol with 4 carbon atoms or more among the other volatile solvents, 1-butanol, 2-butanol, isobutyl alcohol, tert-butyl alcohol, etc., can be cited. One type or two or more types of these alcohols can be used.

Although not restricted thereto, for example, the following various ketones, etc., can be cited as specific examples of the ketone. One type or two or more types of these ketones can be used.

2-butanone 〈methyl ethyl ketone (MEK)〉, acetone 〈dimethyl ketone〉, 2-pentanone 〈methyl propyl ketone (MPK)〉, 3-pentanone 〈diethyl ketone (DEK)〉, 3-methyl-2-butanone 〈methyl isopropyl ketone (MIPK)〉, 2-methyl-4-pentanone 〈methyl isobutyl ketone (MIBK)〉, 2,6-dimethyl-4-heptanone 〈diisobutyl ketone (DIBK)〉, cyclohexanone, and 4-hydroxy-4-methyl-pentan-2-one 〈diacetone alcohol〉.

Although not restricted thereto, for example, the following various ethers, etc., can be cited as specific examples of the ether. One type or two or more types of these ethers can be used.

1,4-dioxane 〈dioxane〉, 1,1-dimethyldiethyl ether 〈diisopropyl ether〉, 2-ethoxyethanol 〈ethyl cellosolve (EGMEE)〉, 2-butoxyethanol 〈butyl cellosolve (EGMBE)〉, and methyl tert-butyl ether 〈MTBE〉.

Also, as the ether, a glycol ether can also be used.

Although not restricted thereto, for example, the following various glycol ethers, etc., can be cited as specific examples of the glycol ether. One type or two or more types of these glycol ethers can be used.

1-methoxy-2-propanol 〈propylene glycol monomethyl ether (PM)〉, 2-(2-methoxyethoxy) ethanol 〈methyl carbitol〉, 2-(2-ethoxyethoxy)ethanol 〈ethyl carbitol〉, 2-(2-butoxyethoxy)ethanol 〈butyl carbitol〉, 2-[2-(2-methoxyethoxy)ethoxy]ethanol 〈methyl triglycol〉, 1-butoxy-2-propanol 〈propylene glycol-1-monobutyl ether (PNB)〉, 3-methoxy-3-methyl-1-butanol ⟨methyl methoxybutanol (MMB)⟩, 2-[2-(hexyloxy)ethoxy]ethanol ⟨hexyl diglycol⟩, 1-methoxy-2-propyl propanoate ⟨methotate⟩, and 1- or 2-(methoxymethylethoxy)propanol ⟨dipropylene glycol monomethyl ether (DPM), isomer mixture⟩.

Although not restricted thereto, for example, the following various esters, etc., can be cited as specific examples of the ester. One type or two or more types of these esters can be used.

Ethyl acetate, methyl acetate, n-butyl acetate, sec-butyl acetate, 3-methoxybutyl acetate, pentyl ethanoate ⟨amyl acetate⟩, propyl acetate ⟨n-propyl acetate⟩, isopropyl ethanoate ⟨isopropyl acetate⟩, (R)-ethyl-2-hydroxypropanoate ⟨ethyl lactate⟩, methyl-2-hydroxypropanoate ⟨methyl lactate⟩, and butyl-2-hydroxypropanoate ⟨butyl lactate⟩.

Also as the ester, a glycol ester can also be used.

Although not restricted thereto, for example, the following various glycolesters, etc., can be cited as specific examples of the glycol ester. One type or two or more types of these glycol esters can be used.

1-acetoxy-2-ethoxyethane ⟨ethylene glycol monoethyl ether acetate⟩, 1-methoxy-2-propanyl acetate ⟨propylene glycol monomethyl ether acetate (PGMEA)⟩, 2-(2-butoxyethoxy)ethyl acetate ⟨butyl carbitol acetate⟩, and 2-(2-ethoxyethoxy)ethyl acetate ⟨ethyl carbitol acetate⟩.

Here, as the volatile solvent, it is preferable to selectively use that with which a difference in refractive index with respect to the high Tg polyfunctional monomer (I) is as large as possible.

Specifically, it is preferable to selectively use a volatile solvent with which the difference $\Delta R$ in refractive index with respect to a refractive index of the high Tg polyfunctional monomer (I) is not less than ±0.03.

When a volatile solvent with which the difference $\Delta R$ is less than ±0.03 is used, there is a tendency for a character to be decreased in whiteness and hiding property due to influence of the volatile solvent remaining in the cured product, especially immediately after being printed and formed by making the radical polymerizable components undergo the curing reaction.

In contrast, by selectively using a volatile solvent with which the difference $\Delta R$ is not less than ±0.03, decreasing of the whiteness and the hiding property of a character can be suppressed and the character can be imparted with high whiteness and hiding property from immediately after being formed.

As with the glass transition temperature Tg, the refractive index of the high Tg polyfunctional monomer (I) shall be represented by a value measured using a sample for measurement that is constituted of a homopolymer of the high Tg polyfunctional monomer (I) prepared by polymerizing the high Tg polyfunctional monomer (I) alone.

Also, the refractive indices of the high Tg polyfunctional monomer (I) and the volatile solvent shall both be represented by values measured under an environment of 20±0.2° C. temperature.

Here, if two or more types are to be used in combination as the high Tg polyfunctional monomers (I), the refractive index of one type of high Tg polyfunctional monomer (I) that makes up not less than 70 mass % of the combination as a main monomer is deemed to be the refractive index of the high Tg polyfunctional monomers (I) to determine the difference $\Delta R$ with respect to the refractive index of the volatile solvent.

Also, if two or more types are to be used in combination as the volatile solvents, the refractive index of one type of volatile solvent that makes up not less than 70 mass % of the combination as a main solvent is deemed to be the refractive index of the volatile solvents to determine the difference $\Delta R$ with respect to the refractive index of the high Tg polyfunctional monomer (I).

<Ratio of Volatile Solvent>

As mentioned above, the ratio $RV_1$ of the volatile solvent is restricted to not less than 50 mass % and not more than 400 mass % with respect to the total amount of the radical polymerizable components.

The reasons are as have been mentioned above.

That is, if the ratio $RV_1$ of the volatile solvent is set within the range mentioned above, a character that has sufficient thickness, is excellent in abrasion resistance, and is high in whiteness and hiding property can be printed while suppressing the overall viscosity of the white ink to be within the range suitable for discharge to suppress the occurrence of a discharge defect.

Here, in consideration of improving the effects even more, the ratio $RV_1$ of the volatile solvent is preferably not less than 70 mass % and preferably not more than 370 mass % with respect to the total amount of the radical polymerizable components even within the range mentioned above.

Also, a ratio of the volatile solvent is preferably not less than 30 mass % and preferably not more than 73 mass % in the total amount of the white ink.

If the ratio of the volatile solvent is less than this range, the above-described effect of porosifying the cured product and enhancing the whiteness and the hiding property of a character cannot be obtained in some cases.

Also, the ratio of the volatile solvent that contributes to the decrease in viscosity becomes insufficient such that the viscosity of the white ink exceeds the range suitable for discharge from a nozzle of an inkjet printer and a defect of not enabling satisfactory discharge from the nozzle is caused in some cases.

On the other hand, if the ratio of the volatile solvent exceeds the range mentioned above, the solids concentration in the white ink becomes insufficient and consequently, a character having sufficient thickness and being excellent in abrasion resistance cannot be printed on a surface of a printing object in some cases.

In contrast, if the ratio of the volatile solvent is set within the range mentioned above, a character having sufficient thickness, being excellent in abrasion resistance, and being high in whiteness and hiding property can be printed while suppressing the overall viscosity of the white ink to be within the range suitable for discharge to suppress the occurrence of a discharge defect.

Here, in consideration of improving the effects even more, the ratio of the volatile solvent is preferably not less than 38 mass % and preferably not more than 71 mass % in the total amount of the white ink.

In all cases, the ratio of the volatile solvent is a ratio of an alcohol with 1 to 3 carbon atoms if just the alcohol with 1 to 3 carbon atoms is used as the volatile solvent and is a ratio of a total of an alcohol with 1 to 3 carbon atoms and another volatile solvent if these are used in combination.

Also, a ratio of the other volatile solvent is preferably not more than 10 mass % in a total amount of the volatile solvent.

If the ratio of the other volatile solvent exceeds this range, the dissolving ability may become too strong and, for example, damage may be incurred on a head of an inkjet printer, etc.

In contrast, by setting the ratio of the other volatile solvent within the range mentioned above, progress of the curing reaction and timing of volatilization of the volatile solvent can be controlled appropriately without incurring damage on a head of an inkjet printer.

Also, the solubilities of the radical polymerizable components and the binder resin can be aided.

Here, in consideration of improving the effects even more, the ratio of the other volatile solvent is preferably not less than 3 mass % and preferably not more than 7 mass % in the total amount of the volatile solvent.

⟨Photo-Radical Polymerization Initiator⟩

As the photo-radical polymerization initiator, any of various compounds with which a radical can be formed by irradiation of light of arbitrary wavelength to make the radical polymerizable components undergo a radical polymerization reaction can be used.

Although not restricted thereto, for example, the following various compounds, etc., can be cited as specific examples of the photo-radical polymerization initiator. One type or two or more types of these photo-radical polymerization initiators can be used.

Benzophenone, hydroxybenzophenone, 2-chlorobenzophenone, 4,4'-dichlorobenzophenone, 4,4'-bisdiethylaminobenzophenone (Michler's ketone), 4,4'-bisdimethylaminobenzophenone (Michler's ketone), 4-methoxy-4'-dimethylaminobenzophenone, benzophenone compounds represented by general formula (1) in Japanese Patent Application Publication No. 2008-280427, and other benzophenones and salts thereof.

Thioxanthone, 2-chlorothioxanthone, 2-methylthioxanthone, 2-isopropylthioxanthone, 1-chloro-4-propoxythioxanthone, 2,4-diethylthioxanthone, 4-isopropylthioxanthone, isopropoxychlorothioxanthone, thioxanthone compounds represented by general formula (2) in Japanese Patent Application Publication No. 2008-280427, and other thioxanthones and salts thereof.

Ethylanthraquinone, benzanthraquinone, aminoanthraquinones, chloroanthraquinones, and other anthraquinones.

Acetophenone, 2,2-diethoxyacetophenone, 2,2-dimethoxyphenylacetophenone, 4'-dimethylaminoacetophenone, dimethylhydroxyacetophenone, and other acetophenones.

2-(o-chlorophenyl)-4,5-diphenylimidazole dimer, 2-(o-chlorophenyl)-4,5-di(m-methoxyphenyl)imidazole dimer, 2-(o-fluorophenyl)-4,5-diphenylimidazole dimer, 2-(o-methoxyphenyl)-4,5-diphenylimidazole dimer, 2-(p-methoxyphenyl)-4,5-diphenylimidazole dimer, 2-di(p-methoxyphenyl)-5-phenylimidazole dimer, 2-(2,4-dimethoxyphenyl)-4,5-diphenylimidazole dimer, 2,4,5-triarylimidazole dimer, and other imidazoles.

Benzyl dimethyl ketal, 2-benzyl-2-dimethylamino-1-(4-morpholinophenylbutane)-1-one, 2-methyl-1-[4-(methylthio)phenyl]-2-morpholinopropane-1-one, 2-hydroxy-2-methyl-1-phenyl-1-one, 2-hydroxy-2-methyl-1-phenyl-propane-1-one, 1-[4-(2-hydroxyethoxy)-phenyl]-2-hydroxy-2-methyl-1-propane-1-one, 9,10-phenanthrenequinone, benzoin, benzoin methyl ether, benzoin ethyl ether, benzoin isopropyl ether, benzoin-n-propyl ether, benzoin isobutyl ether, benzoin-n-butyl ether, and other benzoins.

9-phenylacridine, 1,7-bis(9,9'-acridinyl)heptane, and other acridine derivatives.

Bisacylphosphine oxide, bisphenylphosphine oxide, bis(2,4,6-trimethylbenzoyl)-phenylphosphine oxide, 2,4,6-trimethylbenzoyldiphenylphosphine oxide, bis(2,6-dimethoxybenzoyl)-2,4,4-trimethylpentylphosphine oxide, and other phosphine oxides.

2,2-dimethoxy-1,2-diphenylethane-1-one, 2-hydroxy-1-{4-[4-(2-hydroxy-2-methylpropionyl)benzyl]phenyl}-2-methylpropane-1-one, 2-dimethylamino-2-(4-methylbenzyl)-1-(4-morpholine-4-yl-phenyl)butane-1-one, 1-(4-isopropylphenyl)-2-hydroxy-2-methylpropane-1-one, methyl benzoylformate, azobisisobutyronitrile, benzoyl peroxide, di-tert-butyl peroxide, 1-hydroxycyclohexyl phenyl ketone, 2,4,6-trihalomethyl triazines, benzil, methylbenzoyl, 2-benzyl-2-dimethylamino-4-morpholinobutyrophenone, etc.

A ratio of the photo-radical polymerization initiator can be set arbitrarily.

However, in consideration of imparting the white ink with a satisfactory photocuring property, the ratio of the photo-radical polymerization initiator is preferably not less than 0.1 mass % and preferably not more than 12 mass % of the total amount of the white ink.

If two or more types of photo-radical polymerization initiators are to be used in combination, a ratio of a total thereof should be set within the range mentioned above.

⟨Other Components⟩

In addition to the respective components described above, various additives may further be blended in the white ink.

As the additives, for example, a sensitizer, a radical polymerization inhibitor, a surfactant, a tackifier, a colorant, etc., can be cited.

<Sensitizer>

Among the above, the sensitizer functions to aid the forming of the radical by the photo-radical polymerization initiator by being put in an excited state by irradiation of ultraviolet rays and interacting with the photo-radical polymerization initiator.

In particular, when an LED curing lamp is used as a light source, since a wavelength range thereof is narrow, it is preferable to blend the sensitizer to improve sensitivity, in other words, sensitize by widening a wavelength range in which the white ink has sensitivity.

As examples of the sensitizer, 2-isopropylthioxanthone, 2,4-diethylthioxanthone, 1-chloro-4-propoxythioxanthone, a mixture of 2-isopropylthioxanthone and 4-isopropylthioxanthone, and other thioxanthones and salts thereof, a eutectic mixture of benzophenone and 2,3- and 4-methylbenzophenones, methyl-2-benzophenone, benzophenone, 4-benzoyl-4'-methylphenylsulfide, 4-methylbenzophenone, 4-phenylbenzophenone and other benzophenones and salts thereof, 2-ethylanthraquinone, 4,4'-bisdiethylaminobenzophenone (Michler's ketone), etc., among the photo-radical polymerization initiators mentioned above can be cited.

Also, as examples of other sensitizers, ethyl-4-(dimethylamino)benzoate, 2-ethyl-4-(dimethylaminobenzoate), and other benzoate compounds, naphthalene benzoxazolyl derivatives, thiophene benzoxazolyl derivatives, stilbene benzoxazolyl derivatives, coumarin derivatives, styrene biphenyl derivatives, pyrazolone derivatives, stilbene derivatives, styryl derivatives of benzene and biphenyl, bis(benzazole-2-yl) derivatives, carbostyril, naphthalimide, derivatives of dibenzothiophene-5,5'-dioxide, pyrene derivatives, pyridotriazole, ethyl p-dimethylaminobenzoate, isoamyl p-dimethylaminobenzoate, ethanolamine, diethanolamine, triethanolamine, etc., can be cited.

As the sensitizer, one type or two or more types of each of compounds having an absorption wavelength range suited for sensitization in accordance with the wavelength range of the light from the light source and an absorption wavelength range of the photo-radical polymerization initiator can be used from among the various sensitizers described above.

A ratio of the sensitizer can be set arbitrarily.

<Radical Polymerization Inhibitor>

The radical polymerization inhibitor functions to prevent the white ink from gelling due to the radical polymerization components undergoing the radical polymerization reaction while the white ink is in storage or is sealed and kept in a package, etc.

As the radical polymerization inhibitor, it is possible to use any of various compounds having the function described above.

As examples of the radical polymerization inhibitor, nitrosamine based compounds, hydroquinones, catechols, hindered amines, phenols, phenothiazines, quinones with condensed aromatic rings, di-2-ethylhexyl maleate, etc., can be cited. One type or two or more types of these radical polymerization inhibitors can be used.

As examples of the nitrosamine based compounds among the above, ammonium salt of N-nitrosophenylhydroxylamine (ammonium N-nitrosophenylhydroxylamine), aluminum salt of N-nitrosophenylhydroxylamine (aluminum N-nitrosophenylhydroxylamine), etc., can be cited. One type or two or more types of these nitrosamine based compounds can be used.

As examples of the hydroquinones, hydroquinone, hydroquinone monomethyl ether, 1-o-2,3,5-trimethylolhydroquinone, 2-tert-butylhydroquinone, etc., can be cited. One type or two or more types of these hydroquinones can be used.

As examples of the catechols, for example, catechol, 4-methylcatechol, 4-tert-butylcatechol, etc., can be cited. One type or two or more types of these catechols can be used.

As the hindered amines, arbitrary hindered amines having a polymerization inhibition effect can be cited. One type or two or more types of these hindered amines can be used.

As examples of the phenols, phenol, butylhydroxytoluene, butylhydroxyanisole, pyrogallol, alkyl esters of gallic acid, hindered phenols, etc., can be cited. One type or two or more types of these phenols can be used.

As examples of the phenothiazines, phenothiazine, etc., can be cited.

As examples of the quinones with condensed aromatic rings, naphthoquinone, etc., can be cited.

A ratio of the radical polymerization inhibitor is preferably not less than 0.01 mass % and preferably not more than 3 mass % of the total amount of the white ink.

<Surfactant>

As the surfactant, for example, a silicone acrylate based surfactant can be used.

With the silicone acrylate based surfactant, clarity of printing can be enhanced and image quality can be improved by suppressing the volatile solvent from wet-spreading in planar directions on a surface of a printing object.

A ratio of the silicone acrylate based surfactant or other surfactant in terms of effective component amount in the surfactant is preferably not less than 0.1 mass % and preferably not more than 5 mass % of the total amount of the white ink.

〈Colorant〉

Although the colorant may be blended in the white ink for fine adjustment of color tone of the white color of a character, it is preferable for the colorant to be not included (to be excluded).

The white ink containing the respective components mentioned above can be used favorably, for example, in an inkjet printer that is of a drop-on-demand type and is of a thermal type or piezo type.

Also, to expose a character printed on a surface of a printing object, for example, an LED curing lamp or a UV lamp, etc., can be used.

In particular, by using in the inkjet printer mentioned above to perform printing and thereafter using the LED curing lamp, etc., to perform exposure and make the curing reaction occur, a character of white color with visibility can be printed on a surface of a printing object of low brightness such as that of black color, etc., or a surface of a printing object constituted of a transparent material, etc.

{Color Ink}

With the color ink for printing a character of an arbitrary color tone besides white color, the high Tg polyfunctional monomer is a high Tg polyfunctional monomer (II) with a glass transition temperature Tg of not less than 40° C., the ratio of the high Tg polyfunctional monomer (II) is not less than 30 mass % in the total amount of the polyfunctional monomer, the ratio of the monofunctional monomer is not less than 5 mass % and not more than 70 mass % in the total amount of the radical polymerizable components, the ratio of the volatile solvent is not less than 50 mass % and not more than 400 mass % with respect to the radical polymerizable components, and further, a colorant is contained.

With this arrangement, in addition to the mechanism described above, a printed character is colored by the colorant, and together, these enable the hiding property of the character to be enhanced, without using titanium oxide or other white pigment, to be approximately equivalent to that in the case of containing the white pigment.

<Contrast Ratio>

A contrast ratio of a character printed using the color ink is preferably made not less than 45%.

If the contrast ratio is less than this range, the hiding property of the character is insufficient and a color tone or a pattern, etc., of a surface of a substrate becomes more likely to show up and, for example, in some cases, unevenness of color is conspicuous when solid printing is performed or a barcode appears to be blurred or chipped when it is printed.

In contrast, by making the contrast ratio be within the range mentioned above, the hiding property of the character can be enhanced and it is possible, for example, to suppress unevenness of color from being conspicuous when solid printing is performed or a barcode from appearing blurred or chipped when it is printed.

The contrast ratio shall be represented by a value measured in conformance with "Method B (Hiding chart)" included in Japanese Industrial Standards JIS K5600-4-1: 1999 "Testing methods for paints—Part 4: Visual characteristics of film—Section 1: Hiding power (for light-coloured paints)" under an environment of ordinary temperature (5 to 35° C.).

That is, the color ink is coated such that a film thickness after curing would be 3 to 10 µm on a surface colored in black and white of a hiding chart conforming to the standards mentioned above and after using a UV lamp to expose and make the curing reaction occur within 0.15 seconds from printing, tristimulus values are measured at five locations each on a white portion and on a black portion of the hiding chart and average tristimulus values $Y_W$ and $Y_B$ are determined.

To coat the color ink on the surface of the hiding chart, solid printing using an inkjet printer or a coating method using a bar coater, spray, etc., can be adopted.

Then, from the determined average tristimulus values $Y_W$ and $Y_B$, the contrast ratio $Y_B/Y_W$ is calculated as a percentage.

To porosify the cured product more reliably and further enhance the hiding property of a character, the volatile solvent is preferably volatilized with a delay with respect to progress of the curing reaction and especially preferably, the volatile solvent is volatilized after the curing reaction is substantially ended.

For this purpose, for example, the types and combination of the radical polymerizable components and the type and combination of the volatile solvent should be selected as appropriate.

Here, it is known that the color ink differs according to its color tone in relationship between condition of color development and hiding power.

For example, in a case of the three colors of cyan (C), magenta (M), and yellow (Y) that are used in combination for full color printing, the contrast ratios are preferably respectively set within the following ranges each even within the range mentioned above to print a character having a higher hiding property.

Cyan: Not less than 50%, more preferably not less than 60%, and especially preferably not less than 75%.

Magenta: Not less than 50%, more preferably not less than 55%, and especially preferably not less than 65%.

Yellow: Not less than 50%, more preferably not less than 55%, and especially preferably not less than 60%.

Here, even if the contrast ratio is low with one time of printing, it is possible to improve the contrast ratio by printing repeatedly two times or three times.

Here, the reasons for restricting the ratio of the high Tg polyfunctional monomer (II) in the total amount of the polyfunctional monomer in the color ink (hereinafter provided at times with the symbol "$Rmh_2$") to not less than 30 mass % as stated above are as have been described above.

That is, if the ratio $Rmh_2$ of the high Tg polyfunctional monomer (II) is less than this range, the effect, due to selectively using the high Tg polyfunctional monomer (II), of enhancing the hiding property of a character cannot be obtained in some cases.

In contrast, by setting the ratio $Rmh_2$ of the high Tg polyfunctional monomer (II) within the range mentioned above, it becomes possible to enhance the contrast ratio of a character and print the character that is excellent in hiding property.

Also, the reasons for restricting the ratio of the monofunctional monomer in the total amount of the radical polymerizable components in the color ink (hereinafter provided at times with the symbol "$RS_2$") to not less than 5 mass % and not more than 70 mass % are as have been described above.

That is, if the ratio $RS_2$ of the monofunctional monomer is less than this range, the effects, due to using the monofunctional monomer in combination, of imparting a suitable flexibility to the cured product, enhancing the rate of the curing reaction, and suppressing an overall viscosity of the color ink from increasing cannot be obtained in some cases.

On the other hand, if the ratio $RS_2$ of the monofunctional monomer exceeds the range mentioned above, the polyfunctional monomer that becomes the base of the three-dimensional network structure becomes deficient relatively, the three-dimensional network structure that is formed becomes coarse, and the toughness of the cured product and the abrasion resistance of a character become insufficient in some cases.

In contrast, by setting the ratio $RS_2$ of the monofunctional monomer within the range mentioned above, it becomes possible to suppress insufficiencies of the toughness of the cured product and the abrasion resistance of the character even while maintaining the effects due to using the monofunctional monomer in combination.

Further, the reasons for restricting the ratio of the volatile solvent with respect to the total amount of the radical polymerizable components in the color ink (hereinafter provided at times with the symbol "$RV_2$") to not less than 50 mass % and not more than 400 mass % are also as have been described above.

That is, if the ratio $RV_2$ of the volatile solvent that becomes the base of porosifying the cured product is less than this range, the effect of porosifying the cured product to enhance the hiding property of a character cannot be obtained in some cases.

This also amounts to the ratio of the volatile solvent that contributes to the decrease in viscosity becoming insufficient as mentioned above such that the overall viscosity of the color ink exceeds the range suitable for an inkjet ink and a defect of not enabling satisfactory discharge from a nozzle of an inkjet printer is caused in some cases.

On the other hand, if the ratio $RV_2$ of the volatile solvent exceeds the range mentioned above, a solids concentration in the color ink becomes insufficient and consequently, a character having sufficient thickness and being excellent in abrasion resistance cannot be formed on a surface of a printing object in some cases.

In contrast, if the ratio $RV_2$ of the volatile solvent is set within the range mentioned above, a character having sufficient thickness, being excellent in abrasion resistance, and being high in hiding property can be printed while suppressing the overall viscosity of the color ink to be within the range suitable for discharge to suppress the occurrence of a discharge defect.

These are also clear from the results of examples and comparative examples described below.

⟨Radical Polymerizable Components⟩

<High Tg Polyfunctional Monomer (II)>

As the high Tg polyfunctional monomer (II), various monomers having two or more radical polymerizable groups within a single molecule, in other words, being difunctional or higher and having a glass transition temperature Tg of not less than 40° C. can be used.

Although not restricted thereto, for example, the same high Tg polyfunctional monomers (I) cited as examples for the white ink can be cited and in addition, high Tg polyfunctional monomers with a glass transition temperature Tg of not less than 40° C. but less than 60° C. can also be cited as specific examples of the high Tg polyfunctional monomer (II), One type or two or more types of these high Tg polyfunctional monomers (II) can be used.

Although not restricted thereto, for example, the following various compounds, etc., can be cited as specific examples of the high Tg polyfunctional monomers among the above with the glass transition temperature Tg of not less than 40° C. but less than 60° C. One type or two or more types of these high Tg polyfunctional monomers can be used.

(Difunctional Acrylates)

SR213〈1,4-butanediol diacrylate; glass transition temperature Tg: 45° C.〉, SR238F 〈1,6-hexanediol diacrylate; glass transition temperature Tg: 43° C.〉, SR238NS 〈1,6-hexanediol diacrylate; glass transition temperature Tg: 43° C.〉, SR272〈triethylene glycol diacrylate; glass transition temperature Tg: 48° C.〉, and SR9209〈alkoxylated aliphatic diacrylate; glass transition temperature Tg: 48° C.〉 of the SARTOMER series manufactured by ARKEMA Inc.

(Difunctional Methacrylates)

SR206NS 〈ethylene glycol dimethacrylate; glass transition temperature Tg: 58° C.〉, SR214NS 〈1,4-butanediol dimethacrylate; glass transition temperature Tg: 55° C.〉, CD541 〈ethoxylated bisphenol A dimethacrylate; glass transition temperature Tg: 54° C.〉, and SR541〈ethoxylated (6) bisphenol A dimethacrylate; glass transition temperature Tg: 54° C.〉 of the SARTOMER series manufactured by ARKEMA Inc.

Here, in consideration of further improving the effects described above, preferably a trifunctional or higher compound and more preferably a trifunctional or higher compound with a glass transition temperature Tg of not less than 90° C. is selectively used as the high Tg polyfunctional monomer (II).

In particular, it is even more preferable to selectively use a trifunctional or higher compound with a glass transition temperature Tg of not less than 200° C. and not more than 300° C. or a tetrafunctional or higher compound with a glass transition temperature Tg of not less than 100° C. but less than 200° C., etc.

<Monofunctional Monomer>

As the monofunctional monomer, various monomers that are copolymerizable with the high Tg polyfunctional monomer (II) and have just one radical polymerizable group in a single molecule can be used.

Although not restricted thereto, for example, the same N-vinyl lactam monomers represented by formula (1) and other monofunctional monomers, etc., cited as examples for the white ink can be cited as specific examples of the monofunctional monomer. One type or two or more types of these monofunctional monomers can be used.

<Other Radical Polymerizable Components>

As other radical polymerizable components, for example, polyfunctional monomers that are difunctional or higher and have two or more radical polymerizable groups within a single molecule and have a glass transition temperature Tg of less than 40° C. and oligomers, etc., can be cited.

Although not restricted thereto, for example, the polyfunctional monomers among the same other polyfunctional monomers cited as examples for the white ink except for those with the glass transition temperature Tg of not less than 40° C. but less than 60° C., etc., can be cited as specific examples of the polyfunctional monomers with the glass transition temperature Tg of less than 40° C. One type or two or more types of these other polyfunctional monomers can be used.

<Ratios of Radical Polymerizable Components>

As mentioned above, the ratio $Rmh_2$ of the high Tg polyfunctional monomer (II) is restricted to not less than 30 mass % in the total amount of the polyfunctional monomer.

The reason is as has been mentioned above.

That is, by setting the ratio $Rmh_2$ of the high Tg polyfunctional monomer (II) within the range mentioned above, it becomes possible to enhance the contrast ratio of a character due to the porosification of the cured product and print the character that is high in hiding property.

Here, in consideration of improving the effects even more, the ratio $Rmh_2$ of the high Tg polyfunctional monomer (II) in the total amount of the polyfunctional monomer is preferably not less than 50 mass % even within the range mentioned above.

Also, an upper limit of the ratio $Rmh_2$ of the high Tg polyfunctional monomer (II) is not restricted in particular and the entire amount of the polyfunctional monomer may be the high Tg polyfunctional monomer (II).

That is, the ratio $Rmh_2$ of the high Tg polyfunctional monomer (II) in the total amount of the polyfunctional monomer may be 100 mass %.

If the ratio $Rmh_2$ of the high Tg polyfunctional monomer (II) is set to 100 mass % in the total amount of the polyfunctional monomer, it becomes possible to further improve the contrast ratio of a character due to the porosification of the cured product and print the character that is even higher in hiding property.

A ratio in the total amount of the polyfunctional monomer of another polyfunctional monomer besides the high Tg polyfunctional monomer (II) is a remaining amount after the high Tg polyfunctional monomer (II).

That is, in setting the ratio $Rmh_2$ of the high Tg polyfunctional monomer (II) to a predetermined value within the range mentioned above, the ratio of the other polyfunctional monomer should be set such that the total amount of the polyfunctional monomer would be 100 mass %.

Also, a ratio of the high Tg polyfunctional monomer (II) in a total amount of the color ink is preferably not less than 7 mass % and preferably not more than 50 mass %.

If the ratio of the high Tg polyfunctional monomer (II) is less than this range, the above-described effect, due to selectively using the high Tg polyfunctional monomer (II), of enhancing the hiding property of a character cannot be obtained in some cases.

On the other hand, if the ratio of the high Tg polyfunctional monomer (II) exceeds the range mentioned above, although also depending on a ratio of the monofunctional monomer, the flexibility is decreased, the cured product becomes rigid and brittle, and the abrasion resistance of a character constituted of the cured product becomes insufficient in some cases.

In contrast, by setting the ratio of the high Tg polyfunctional monomer (II) within the range mentioned above, it becomes possible to further enhance the hiding property of a character while suppressing insufficiency of the abrasion resistance of the character.

Here, in consideration of improving the effects even more, the ratio of the high Tg polyfunctional monomer (II) in the total amount of the color ink is preferably not less than 12 mass % and preferably not more than 40 mass % even within the range mentioned above.

Also, the ratio of the other polyfunctional monomer in the total amount of the color ink is preferably not more than 18 mass % and especially preferably not more than 13 mass %.

If the ratio of the other polyfunctional monomer exceeds this range, the ratio of the high Tg polyfunctional monomer (II) is decreased relatively and the effect of enhancing the hiding property of a character cannot be obtained in some cases.

Also, the ratio of the monofunctional monomer is decreased relatively and the effects of imparting a suitable flexibility to the cured product, enhancing the rate of the curing reaction, and suppressing the viscosity of the color ink cannot be obtained in some cases.

Here, a lower limit of the ratio of the other polyfunctional monomer is not restricted in particular and it is possible, as mentioned above, for the entire amount of the polyfunctional monomer to be the high Tg polyfunctional monomer (II) and the other polyfunctional monomer to be not included (to be excluded).

That is, the ratio of the other polyfunctional monomer may be 0 mass % in the total amount of the color ink.

The ratio $RS_2$ of the monofunctional monomer is restricted to not less than 5 mass % and not more than 70 mass % in the total amount of the radical polymerizable components.

The reasons for this are also as have been described above.

That is, by setting the ratio $RS_2$ of the monofunctional monomer within the range mentioned above, it becomes possible to suppress insufficiencies of the toughness of the cured product and the abrasion resistance of a character even while maintaining the effects due to using the monofunctional monomer in combination.

Here, in consideration of improving the effects even more, the ratio $RS_2$ of the monofunctional monomer in the total amount of the radical polymerizable components is preferably not less than 10 mass % and preferably not more than 65 mass % even within the range mentioned above.

Also, the ratio of the monofunctional monomer in the total amount of the color ink is preferably not less than 2.3 mass % and preferably not more than 32 mass %.

If the ratio of the monofunctional monomer is less than this range, although also depending on the ratio of the polyfunctional monomer, the above-described effects due to using the monofunctional monomer in combination cannot be obtained in some cases.

That is, the effects of imparting a suitable flexibility to the cured product, enhancing the rate of the curing reaction, and suppressing the viscosity of the color ink cannot be obtained at times.

On the other hand, if the ratio of the monofunctional monomer exceeds the range mentioned above, the polyfunctional monomer that becomes the base of the three-dimensional network structure becomes deficient, the three-dimensional network structure that is formed becomes coarse, and the toughness of the cured product and the abrasion resistance of a character become insufficient in some cases.

Also, in some cases, the high Tg polyfunctional monomer (II) becomes deficient and the effect of enhancing the hiding property of a character cannot be obtained sufficiently.

In contrast, by setting the ratio of the monofunctional monomer within the range mentioned above, it becomes possible to further enhance the hiding property of a character while maintaining the effects due to using the monofunctional monomer in combination and yet suppressing insufficiencies of the toughness of the cured product and the abrasion resistance of the character.

Here, in consideration of improving the effects even more, the ratio of the monofunctional monomer in the total amount of the color ink is preferably not less than 3.3 mass % and preferably not more than 30 mass % even within the range mentioned above.

⟨Coloranta⟩

As the colorant, various pigments, dyes, etc., that are of respective colors besides white (except for white) and are in accordance with the color tone of the color ink can be used.

In particular, in consideration of improving light fastness, abrasion resistance, and alcohol resistance of a character, various inorganic pigments and/or organic pigments are preferable.

As examples of the inorganic pigments among these, metal compounds such as iron oxide (colcothar, iron black, etc.), chromium oxide green, aluminum hydroxide, etc., graphite, and neutral, acidic, basic, and other various carbon blacks manufactured by a known method such as a contact method, a furnace method, a thermal method, etc., can be cited.

Also, as examples of the organic pigments, azo pigments (including azo lakes, insoluble azo pigments, condensed azo pigments, chelate azo pigments, etc.), benzimidazolone pigments, polycyclic pigments (for example, phthalocyanine pigments, perylene pigments, perinone pigments, anthraquinone pigments, quinacridone pigments, diketopyrrolopyrrole pigments, dioxazine pigments, indigo pigments, thioindigo pigments, isoindolinone pigments, flavanthrone pigments, pyranthrone pigments, indanthrone pigments, quinophthalone pigments, etc.), dye chelates (for example, basic dye type chelates, acidic dye type chelates, etc.), nitro pigments, nitroso pigments, aniline black, etc., can be cited.

As specific examples of the pigments, the following various pigments can be cited.

(Yellow Pigments)

C. I. pigment yellow 1, 2, 3, 12, 13, 14, 14C, 16, 17, 20, 24, 42, 73, 74, 75, 81, 83, 86, 87, 93, 94, 95, 97, 98, 108, 109, 110, 114, 117, 120, 125, 128, 129, 130, 137, 138, 139, 147, 148, 150, 151, 154, 155, 166, 168, 180, 184, 185, 213, and 214

(Magenta Pigments)

C. I. pigment red 5, 7, 9, 12, 22, 38, 48:1, 48:2, 48:4, 49:1, 52, 53:1, 57, 57:1, 63:1, 97, 101, 102, 112, 122, 123, 144, 146, 149, 168, 177, 178, 179, 180, 184, 185, 190, 202, 206, 207, 209, 224, 242, 254, 255, and 270

(Cyan Pigments)

C. I. pigment blue 1, 2, 3, 15, 15:1, 15:2, 15:3, 15:4, 15:6, 15:34, 16, 18, 22, 27, 29, and 60

(Black Pigments)

C. I. pigment black 7

(Orange Pigments)

C. I. pigment orange 36, 43, 51, 55, 59, 61, 71, and 74

(Green Pigments)

C. I. pigment green 7 and 36

(Violet Pigments)

C. I. pigment violet 19, 23, 29, 30, 37, 40, and 50

One type or two or more types of the pigments can be used in accordance with the color tone of the color ink.

The pigment may be surface-treated to improve dispersion stability in the color ink.

Also, the monofunctional monomer described above, the volatile solvent to be described below, etc., may be used as a dispersion medium and the pigment may be used in a state of being dispersed in the dispersion medium as a pigment dispersion to manufacture the color ink.

A dispersant, etc., may be added to the pigment dispersion to disperse the pigment satisfactorily.

As the dispersant, it is possible to use any of various dispersants, for example, polymer-based dispersants, surfactants, etc.

A ratio of the pigment or other colorant can be set arbitrarily in accordance with the type of the colorant, the color tone of the color ink, etc.

However, the ratio of the colorant is preferably not less than 4.8 mass % and preferably not more than 18 mass % with respect to the total amount of the radical polymerizable components.

If the ratio of the colorant is less than this range, a coloring power of the colorant is too weak with respect to the above-described hiding power due to the cured product of the radical polymerizable components and a character having a sufficient color density cannot be printed in some cases.

On the other hand, if the ratio of the colorant exceeds the range mentioned above, especially in the case of a pigment, the overall viscosity of the color ink readily becomes too high or excess pigment readily aggregates within the color ink, readily causing a discharge defect in some cases.

Also, the curing of the color ink is impeded and the effect of improving the hiding property of a character due to porosification of the cured product cannot be obtained sufficiently or a character that is excellent in fixing property and abrasion resistance cannot be printed on a surface of a printing object in some cases.

In contrast, by setting the ratio of the colorant within the range mentioned above, a character that is excellent in fixing property and abrasion resistance, is high in hiding property, and yet has sufficient color density can be printed while suppressing the occurrence of a discharge defect.

Here, in consideration of improving the effects even more, the ratio of the colorant is preferably not less than 6.5 mass %, especially preferably not less than 7.5 mass %, and preferably not more than 15 mass % with respect to the total amount of the radical polymerizable components even within the range mentioned above.

Here, if a pigment dispersion is used as the colorant, the ratio of the colorant is deemed to be the ratio of the pigment itself, which is the effective component within the pigment dispersion, with respect to the total amount of the radical polymerizable components.

⟨Binder Resin⟩

A binder resin may be blended in the color ink to enhance the fixing property with respect to a surface of a printing object and the abrasion resistance associated therewith of a character.

As the binder resin, various binder resins that can be dissolved or dispersed satisfactorily in the volatile solvent and the radical polymerizable components can be used.

As specific examples of the binder resin, for example, the same polyamide resin, acrylic resin, phenol resin, etc., cited as examples for the white ink can be cited. One type or two or more types of these binder resins can be used.

A ratio of the binder resin is preferably not less than 1 mass % and preferably not more than 10 mass % in the total amount of the color ink.

If the ratio of the binder resin is less than this range, the effect of enhancing the fixing property and the abrasion resistance of a character with respect to a surface of a printing object due to blending the binder resin cannot be obtained sufficiently in some cases.

On the other hand, if the ratio of the binder resin exceeds the range mentioned above, so-called cogation occurs in some cases, especially when the color ink is used in a thermal type inkjet printer.

In contrast, by setting the ratio of the binder resin within the range mentioned above, the fixing property and the abrasion resistance of a character with respect to a surface of a printing object can be enhanced sufficiently while suppressing the occurrence of cogation.

Here, in consideration of improving the effects even more, the ratio of the binder resin is preferably not less than 1.5 mass % and preferably not more than 8 mass % in the total amount of the color ink even within the range mentioned above.

⟨Volatile Solvents⟩

As the volatile solvent, various volatile solvents that can dissolve or disperse the radical polymerizable components and the binder resin satisfactorily and have volatility can be used.

In particular, a preferable volatile solvent is that which after printing on a surface of a printing object is performed can volatilize preferably with a delay with respect to progress of the curing reaction of the radical polymerizable components and especially after the curing reaction is substantially ended.

As the volatile solvent, for example, the same various alcohols, ketones, ethers, esters, etc., cited as examples for the white ink can be cited. One type or two or more types of these volatile solvents can be used.

As the volatile solvent, an alcohol with 1 to 3 carbon atoms that has the suitable volatility described above and is unlikely to incur damage on a head of an inkjet printer, etc., is especially preferable.

Also, as the volatile solvent, at least one type of another volatile solvent such as an alcohol with 4 or more carbon atoms, a ketone, an ether, an ester, etc., may be used in combination with the alcohol with 1 to 3 carbon atoms.

The reasons for these are as have been described above.

Here, as the volatile solvent, it is preferable to selectively use that with which a difference in refractive index with respect to the high Tg polyfunctional monomer (II) is as large as possible.

Specifically, it is preferable to selectively use a volatile solvent with which the difference $\Delta R$ in refractive index with respect to a refractive index of the high Tg polyfunctional monomer (II) is not less than ±0.03.

The reason for this is also as has been described above.

The refractive index of the high Tg polyfunctional monomer (II) can be measured in the same way and under the same conditions as the refractive indices of the high Tg polyfunctional monomer (I) and the volatile solvent described above.

Also likewise, if two or more types are to be used in combination as the high Tg polyfunctional monomers (II), the refractive index of one type of high Tg polyfunctional monomer (II) that makes up not less than 70 mass % of the combination as a main monomer is deemed to be the refractive index of the high Tg polyfunctional monomers (II) to determine the difference $\Delta R$ with respect to the refractive index of the volatile solvent.

Further likewise, if two or more types are to be used in combination as the volatile solvents, the refractive index of one type of volatile solvent that makes up not less than 70 mass % of the combination as a main solvent is deemed to be the refractive index of the volatile solvents to determine the difference $\Delta R$ with respect to the refractive index of the high Tg polyfunctional monomer (II).

<Ratio of Volatile Solvent>

As mentioned above, the ratio $RV_2$ of the volatile solvent is restricted to not less than 50 mass % and not more than 400 mass % with respect to the total amount of the radical polymerizable components.

The reasons are as have been mentioned above.

That is, if the ratio $RV_2$ of the volatile solvent is set within the range mentioned above, a character having sufficient thickness, being excellent in abrasion resistance, and being high in hiding property can be printed while suppressing the overall viscosity of the color ink to be within the range suitable for discharge to suppress the occurrence of a discharge defect.

Here, in consideration of improving the effects even more, the ratio $RV_2$ of the volatile solvent with respect to the total amount of the radical polymerizable components is preferably not less than 70 mass %, especially preferably not less than 130 mass %, and preferably not more than 370 mass % even within the range mentioned above.

Also, a ratio of the volatile solvent in the total amount of the color ink is preferably not less than 30 mass %, more preferably not less than 44 mass %, especially preferably not less than 53 mass %, preferably not more than 71 mass %, and especially preferably not more than 68 mass %.

If the ratio of the volatile solvent is less than this range, the above-described effect of porosifying the cured product and enhancing the hiding property of a character cannot be obtained in some cases.

Also, the ratio of the volatile solvent that contributes to the decrease in viscosity becomes insufficient such that the viscosity of the color ink exceeds the range suitable for discharge from a nozzle of an inkjet printer and a defect of not enabling satisfactory discharge from the nozzle is caused in some cases.

On the other hand, if the ratio of the volatile solvent exceeds the range mentioned above, the solids concentration in the color ink becomes insufficient and consequently, a character having sufficient thickness and being excellent in abrasion resistance cannot be printed on a surface of a printing object in some cases.

In contrast, if the ratio of the volatile solvent is set within the range mentioned above, a character having sufficient thickness, being excellent in abrasion resistance, and being high in hiding property can be printed while suppressing the overall viscosity of the color ink to be within the range suitable for discharge to suppress the occurrence of a discharge defect.

Here, in consideration of improving the effects even more, the ratio of the volatile solvent in the total amount of the color ink is preferably not less than 25 mass %, especially preferably not less than 35 mass %, and preferably not more than 53 mass %.

In all cases, the ratio of the volatile solvent is a ratio of an alcohol with 1 to 3 carbon atoms if just the alcohol with 1 to 3 carbon atoms is used as the volatile solvent and is a ratio of a total of an alcohol with 1 to 3 carbon atoms and another volatile solvent if these are used in combination.

Also, a ratio of the other volatile solvent is preferably not more than 15 mass % in a total amount of the volatile solvent.

If the ratio of the other volatile solvent exceeds this range, the dissolving ability may become too strong and, for example, damage may be incurred on a head of an inkjet printer, etc.

In contrast, by setting the ratio of the other volatile solvent within the range mentioned above, the progress of the curing reaction and the timing of volatilization of the volatile solvent can be controlled appropriately without incurring damage on a head of an inkjet printer.

Also, the solubilities of the radical polymerizable components and the binder resin can be aided.

Here, for example, in a case where the pigment dispersion, etc., described above is used as the colorant, the ratios of the respective volatile solvents described above shall all be ratios that include a volatile solvent that is contained in the pigment dispersion.

⟨Photo-Radical Polymerization Initiator⟩

As the photo-radical polymerization initiator, any of various compounds with which a radical can be formed by irradiation of light of arbitrary wavelength to make the radical polymerizable components undergo a radical polymerization reaction can be used.

As specific examples of the photo-radical polymerization initiator, for example, one type or two or more types of the same various compounds, etc., cited as examples for the white ink can be used.

A ratio of the photo-radical polymerization initiator can be set arbitrarily.

However, in consideration of imparting the color ink with a satisfactory photocuring property, the ratio of the photo-radical polymerization initiator is preferably not less than 0.1 mass % and preferably not more than 12 mass % of the total amount of the color ink.

If two or more types of photo-radical polymerization initiators are to be used in combination, a ratio of a total thereof should be set within the range mentioned above.

⟨Other Components⟩

In addition to the respective components described above, various additives may further be blended in the color ink.

As the additives, for example, a sensitizer, a radical polymerization inhibitor, a surfactant, a tackifier, etc., can be cited.

Even in regard to these additives, for example, the same various compounds cited as examples for the white ink can be used and the ratios of the respective additives are preferably set to be substantially equal to those in the case of the white ink.

The color ink containing the respective components mentioned above can be used favorably, for example, in an inkjet printer that is of a drop-on-demand type and is of a thermal type or piezo type.

Also, to expose a character printed on a surface of a printing object, for example, an LED curing lamp or a UV lamp, etc., can be used.

In particular, by using in the inkjet printer mentioned above to perform printing and thereafter using the LED curing lamp, etc., to perform exposure and make the curing reaction occur, a character of a vivid color tone with visibility can be printed on a surface of a printing object of low brightness such as that of black color, etc., or a surface of a printing object constituted of a transparent material, etc.

<<Hiding Layer Coating Agent, Recording Sheet and Method for Manufacturing the Same>>

A hiding layer coating agent according to a preferred embodiment of the present invention is characterized in containing radical polymerizable components including a difunctional or higher polyfunctional monomer and a monofunctional monomer, a volatile solvent, and a photo-radical polymerization initiator and in that the polyfunctional monomer includes a high Tg polyfunctional monomer with a glass transition temperature Tg of not less than 40° C. at a ratio of not less than 30 mass % in a total amount of the polyfunctional monomer, a ratio of the monofunctional monomer is not less than 5 mass % and not more than 70 mass % in a total amount of the radical polymerizable components, and a ratio of the volatile solvent is not less than 50 mass % and not more than 400 mass % with respect to the total amount of the radical polymerizable components.

Also, a recording sheet according to a preferred embodiment of the present invention is characterized in including a base sheet and a hiding layer that is constituted of a cured product of the hiding layer coating agent provided on a surface of the base sheet.

Further, a method for manufacturing a recording sheet according to a preferred embodiment of the present invention is characterized in including a step of forming the hiding layer by coating the hiding layer coating agent on the surface of the base sheet and thereafter a step of causing a curing reaction by exposure to ultraviolet rays.

Thereby, a hiding property of the hiding layer of the recording sheet can be improved, by the mechanism described above and without using titanium oxide or other white pigment, to be approximately equivalent to that in a case of containing the white pigment.

That is, when an image is recorded using an image recording ink that is colorless or colored and is transparent or semitransparent on the hiding layer of the recording sheet that includes the hiding layer, a region of the hiding layer in which the image is recorded is selectively decreased in hiding property and put in a transparent or semitransparent state as mentioned above.

That is, the image recording ink permeates into a porous structure of the cured product that forms the hiding layer and fills interiors of pores of the porous structure to suppress the diffuse reflection of light mentioned above and consequently, the hiding property of the region in which the image is recorded is selectively decreased.

The region in which the image is recorded is thus put in a transparent or semitransparent state due to the decrease in hiding property and, together with a region besides it being maintained in a semitransparent or nontransparent state of high hiding property, a novel expression that was impossible to realize with a conventional recording sheet is made possible.

That is, novel expressions such as those of (a) to (d) described above that were impossible to realize with the conventional recording sheet are made possible.

As with the inkjet ink, glass transition temperatures Tg (° C.) of the polyfunctional monomer including the high Tg polyfunctional monomer and the monofunctional monomer shall be represented by values determined from results of measurements made in conformance to the measurement method described in the catalog of ARKEMA Inc.

That is, first, a monomer for which the glass transition temperature Tg (° C.) is to be determined is polymerized alone to prepare a sample for measurement constituted of a homopolymer of the monomer.

Specifically, the monomer is polymerized by using a medium pressure mercury arc lamp of 300 W/inch to irradiate ultraviolet rays at conditions of UV processing speed: 25 ft/min and integrated exposure: 1.5 J/cm2 to prepare the sample.

In this process, the integrated exposure is measured using an IL390B radio meter made by International Light Technologies Inc.

Next, using the prepared sample, the glass transition temperature Tg (° C.) is determined from a measurement result obtained by differential scanning calorimetry (DSC) or, depending on the type of monomer, dynamic mechanical analysis (DMA).

{Hiding Layer Coating Agent}

As mentioned above, with the hiding layer coating agent, the high Tg polyfunctional monomer is the same high Tg polyfunctional monomer (II) with the glass transition temperature Tg of not less than 40° C. as that used in the color ink, the ratio of the high Tg polyfunctional monomer (II) is not less than 30 mass % in the total amount of the polyfunctional monomer, the ratio of the monofunctional monomer is not less than 5 mass % and not more than 70 mass % in the total amount of the radical polymerizable components, and the ratio of the volatile solvent is not less than 50 mass % and not more than 400 mass % with respect to the radical polymerizable components.

<Whiteness>

The hiding property of the hiding layer constituted of the hiding layer coating agent that is not colored shall be evaluated by a whiteness determined by the following method.

That is, the hiding layer coating agent that is not colored is coated such that a film thickness after curing would be 3 to 10 μm on a surface of a PET film at ordinary temperature (5 to 35° C.) and within 0.15 seconds from coating, an LED curing lamp is used to expose and make the curing reaction occur.

Next, the L value of the coated surface is measured using a handheld colorimeter 〈X-rite (registered trademark) eXact manufactured by Videojet X-Rite K. K.〉 and the whiteness of the hiding layer is evaluated by the following standards.

∘∘∘: The L value was not less than 70.
∘∘: The L value was not less than 60 but less than 70.
∘: The L value was not less than 50 but less than 60.
Δ: The L value was not less than 40 but less than 50.
x: The L value was less than 40.

To coat the hiding layer coating agent on the surface of the PET film, solid printing using an inkjet printer or a coating method such as a bar coating method, a spray coating method, etc., is adopted. With the solid printing using the inkjet printer, the film thickness after curing can be made to be within the range mentioned above, for example, by setting a resolution of printing to 600×600 dpi.

Even if the L value is low with one time of printing, it is possible to improve the L value by printing repeatedly two times or three times.

<Contrast Ratio>

The hiding property of the hiding layer constituted of the hiding layer coating agent that is colored shall be evaluated by a contrast ratio measured in conformance with "Method B (Hiding chart)" included in Japanese Industrial Standards JIS K5600-4-1: 1999 "Testing methods for paints—Part 4: Visual characteristics of film-Section 1: Hiding power (for light-coloured paints)" under an environment of ordinary temperature (5 to 35° C.).

That is, the hiding layer coating agent is coated such that a film thickness after curing would be 3 to 10 μm on a surface colored in black and white of a hiding chart conforming to the standards mentioned above and after using a UV lamp to expose and make the curing reaction occur within 0.15 seconds from coating, tristimulus values are measured at five locations each on a white portion and on a black portion of the hiding chart and average tristimulus values $Y_W$ and $Y_B$ are determined.

To coat the hiding layer coating agent on the surface of the hiding chart, solid printing using an inkjet printer or a coating method such as a bar coating method, a spray coating method, etc., can be adopted.

Then, from the determined average tristimulus values $Y_W$ and $Y_B$, the contrast ratio $Y_B/Y_W$ is calculated as a percentage.

The contrast ratio is preferably made not less than 45%.

If the contrast ratio of the hiding layer is less than this range, the hiding property of the hiding layer is insufficient, the difference in hiding property with respect to a region in which an image is recorded is decreased, and images of various expression modes such as mentioned above cannot be recorded more vividly in some cases.

In contrast, by making the contrast ratio of the hiding layer be within the range mentioned above, the hiding property of the hiding layer can be improved, the difference in hiding property with respect to a region in which an image is recorded can be increased, and images of various expression modes such as mentioned above can be recorded more vividly.

To porosify the cured product more reliably and further improve the hiding property of the hiding layer, the volatile solvent is preferably volatilized with a delay with respect to progress of the curing reaction and especially preferably, the volatile solvent is volatilized after the curing reaction is substantially ended.

For this purpose, for example, the types and combination of the radical polymerizable components and the type and combination of the volatile solvent should be selected as appropriate.

Here, it is known that the hiding layer coating agent differs according to its color tone in relationship between condition of color development and hiding power.

For example, in a case of the three colors of cyan (C), magenta (M), and yellow (Y), lower limits of the contrast ratios are preferably respectively set within the following ranges each even within the range mentioned above to form the hiding layer having a higher hiding property.

Cyan: Not less than 50%, more preferably not less than 60%, and especially preferably not less than 75%.

Magenta: Not less than 50%, more preferably not less than 55%, and especially preferably not less than 65%.

Yellow: Not less than 50%, more preferably not less than 55%, and especially preferably not less than 60%.

Here, even if the contrast ratio is low with one time of printing, it is possible to improve the contrast ratio by printing repeatedly two times or three times.

Also, by using the monofunctional monomer in combination with the polyfunctional monomer, the cured product that forms the hiding layer can be imparted with a suitable flexibility.

Therefore, for example, the hiding layer laminated on the surface of the base sheet that is constituted, for example, of a bendable film or sheet of PET, PE, PP, etc., can be enhanced in followability with respect to bending of the base sheet and peeling, etc., of the hiding layer when the base sheet is bent, etc., can also be suppressed.

Also, the monofunctional monomer is generally higher in rate of curing reaction in comparison to the polyfunctional monomer and therefore, by using the monofunctional monomer in combination, the radical polymerizable components as a whole can be enhanced in the rate of the curing reaction and the volatile solvent can also be volatilized after the curing reaction has substantially ended as described above.

Consequently, the cured product can be porosified more reliably and the hiding property of the hiding layer can be enhanced further.

In addition, the monofunctional monomer is generally low in viscosity in comparison to the polyfunctional monomer and therefore, by using it in combination with the volatile solvent that likewise contributes to a decrease in viscosity, a viscosity of the hiding layer coating agent can be suppressed from increasing.

In particular, in a case of printing the hiding layer coating agent by an inkjet printing method, the viscosity thereof can be adjusted to be within the range suitable for discharge from a nozzle of an inkjet printer.

Here, the ratio of the high Tg polyfunctional monomer (II) in the total amount of the polyfunctional monomer (hereinafter provided at times with the symbol "$Rmh_3$") is restricted to not less than 30 mass % as stated above by the following reason.

That is, if the ratio $Rmh_3$ of the high Tg polyfunctional monomer (II) is less than this range, the effect, due to selectively using the high Tg polyfunctional monomer (II), of improving the hiding property of the hiding layer cannot be obtained in some cases.

In contrast, by setting the ratio $Rmh_3$ of the high Tg polyfunctional monomer (II) within the range mentioned above, the hiding property of the hiding layer can be improved, the difference in hiding property with respect to a region in which an image is recorded can be increased, and images of various expression modes such as mentioned above can be recorded more vividly.

Also, the ratio of the monofunctional monomer in the total amount of the radical polymerizable components (hereinafter provided at times with the symbol "$RS_3$") is restricted to not less than 5 mass % and not more than 70 mass % for the following reasons.

That is, if the ratio $RS_3$ of the monofunctional monomer is less than this range, the effects, due to using the monofunctional monomer in combination, of imparting a suitable flexibility to the cured product, enhancing the rate of the curing reaction, and suppressing the overall viscosity of the hiding layer coating agent from increasing cannot be obtained in some cases.

Also, a scratch resistance of the hiding layer that is formed on the surface of an acrylic plate, a glass plate, or other base sheet that is hard is decreased and a scratch is formed readily on a surface of the hiding layer.

The hiding layer is basically solid-printed on the surface of the base sheet and therefore, even a small scratch is conspicuous and damages an aesthetic appearance of a recorded image in some cases.

On the other hand, if the ratio $RS_3$ of the monofunctional monomer exceeds the range mentioned above, the polyfunctional monomer that becomes the base of a three-dimensional network structure becomes deficient relatively, the three-dimensional network structure that is formed becomes coarse, and the toughness of the cured product and an abrasion resistance of the hiding layer become insufficient in some cases.

In contrast, by setting the ratio $RS_3$ of the monofunctional monomer within the range mentioned above, it becomes possible to suppress the toughness of the cured product, the abrasion resistance associated therewith of the hiding layer, and the scratch resistance of the hiding layer from becoming insufficient even while maintaining the effects due to using the monofunctional monomer in combination.

Further, the ratio of the volatile solvent with respect to the total amount of the radical polymerizable components (hereinafter provided at times with the symbol "$RV_3$") is restricted to not less than 50 mass % and not more than 400 mass % for the following reasons.

That is, if the ratio $RV_3$ of the volatile solvent that becomes the base of porosifying the cured product is less than this range, the effect of porosifying the cured product to improve the hiding property of the hiding layer cannot be obtained in some cases.

Also, the ratio of the volatile solvent that contributes to the decrease in viscosity becomes insufficient such that the overall viscosity exceeds the range suitable for printing the hiding layer solvent by an inkjet printing method and a defect of not enabling satisfactory discharge from a nozzle of an inkjet printer (discharge defect) is caused in some cases.

On the other hand, if the ratio $RV_3$ of the volatile solvent exceeds the range mentioned above, a solids concentration in the hiding layer coating agent becomes insufficient and consequently, the hiding layer having sufficient thickness and being excellent in abrasion resistance and scratch resistance cannot be formed on the surface of the base sheet in some cases.

In contrast, if the ratio $RV_3$ of the volatile solvent is set within the range mentioned above, the overall viscosity of the hiding layer coating agent can be adjusted to be within the range suitable for discharge from a nozzle of an inkjet printer to suppress the occurrence of a discharge defect.

Moreover, the hiding layer that is excellent in abrasion resistance and scratch resistance and high in hiding property can also be formed.

These are also clear from the results of examples and comparative examples described below.

《Radical Polymerizable Components》
<High Tg Polyfunctional Monomer (II)>

As mentioned above, as the high Tg polyfunctional monomer, one type or two or more types of the same high Tg polyfunctional monomers (II) cited as examples for the color ink can be used.

That is, although not restricted thereto, for example, the same high Tg polyfunctional monomers (I) cited as examples for the white ink can be cited and in addition, high Tg polyfunctional monomers with the glass transition temperature Tg of not less than 40° C. but less than 60° C. can also be cited as specific examples of the high Tg polyfunctional monomer (II). One type or two or more types of these high Tg polyfunctional monomers (II) can be used.

Here, in consideration of further improving the effects described above, preferably a trifunctional or higher compound and more preferably a trifunctional or higher compound with a glass transition temperature Tg of not less than 90° C. is selectively used as the high Tg polyfunctional monomer (II).

In particular, it is even more preferable to selectively use a trifunctional or higher compound with a glass transition temperature Tg of not less than 200° C. and not more than 300° C. or a tetrafunctional or higher compound with a glass transition temperature Tg of not less than 100° C. but less than 200° C., etc.

<Monofunctional Monomer>

As the monofunctional monomer, various monomers that are copolymerizable with the high Tg polyfunctional monomer (II) and have just one radical polymerizable group in a single molecule can be used.

Although not restricted thereto, for example, the same N-vinyl lactam monomers represented by formula (1) and other monofunctional monomers, etc., cited as examples for the white ink can be cited as specific examples of the monofunctional monomer. One type or two or more types of these monofunctional monomers can be used.

<Other Radical Polymerizable Components>

As other radical polymerizable components that may be used in combination with the high Tg polyfunctional monomer (II) and the monofunctional monomer, for example, polyfunctional monomers that are difunctional or higher and have two or more radical polymerizable groups within a single molecule and have a glass transition temperature Tg of less than 40° C. and oligomers, etc., can be cited.

Although not restricted thereto, for example, the polyfunctional monomers among the same other polyfunctional monomers cited as examples for the white ink except for those with the glass transition temperature Tg of not less than 40° C. but less than 60° C., etc., can be cited as specific examples of the polyfunctional monomers with the glass transition temperature Tg of less than 40° C. One type or two or more types of these other polyfunctional monomers can be used.

<Ratios of Radical Polymerizable Components>

As mentioned above, the ratio $Rmh_3$ of the high Tg polyfunctional monomer (II) in the total amount of the polyfunctional monomer is restricted to not less than 30 mass %.

The reason is as has been mentioned above.

That is, by setting the ratio $Rmh_3$ of the high Tg polyfunctional monomer (II) within the range mentioned above, it becomes possible to improve the hiding property of the hiding layer due to the porosification of the cured product.

Here, in consideration of improving the effects even more, the ratio $Rmh_3$ of the high Tg polyfunctional monomer (II) in the total amount of the polyfunctional monomer is preferably not less than 50 mass % even within the range mentioned above.

Also, an upper limit of the ratio $Rmh_3$ of the high Tg polyfunctional monomer (II) is not restricted in particular and the entire amount of the polyfunctional monomer may be the high Tg polyfunctional monomer (II).

That is, the ratio $Rmh_3$ of the high Tg polyfunctional monomer (II) in the total amount of the polyfunctional monomer may be 100 mass %.

If the ratio $Rmh_3$ of the high Tg polyfunctional monomer (II) is set to 100 mass % in the total amount of the polyfunctional monomer, it becomes possible to further improve the hiding property of the hiding layer due to the porosification of the cured product.

A ratio in the total amount of the polyfunctional monomer of another polyfunctional monomer besides the high Tg polyfunctional monomer (II) is a remaining amount after the high Tg polyfunctional monomer (II).

That is, in setting the ratio $Rmh_3$ of the high Tg polyfunctional monomer (II) to a predetermined value within the range mentioned above, the ratio of the other polyfunctional monomer should be set such that the total amount of the polyfunctional monomer would be 100 mass %.

That is, the ratio of the other polyfunctional monomer is preferably not less than 0 mass %, preferably not more than 70 mass %, and especially preferably not more than 50 mass % in the total amount of the polyfunctional monomer.

Also, a ratio of the high Tg polyfunctional monomer (II) in a total amount of the hiding layer coating agent is preferably not less than 8 mass % and preferably not more than 42.5 mass %.

If the ratio of the high Tg polyfunctional monomer (II) is less than this range, the above-described effect, due to selectively using the high Tg polyfunctional monomer (II), of improving the hiding property of the hiding layer cannot be obtained in some cases.

On the other hand, if the ratio of the high Tg polyfunctional monomer (II) exceeds the range mentioned above, although also depending on a ratio of the monofunctional monomer, the flexibility is decreased, the cured product becomes rigid and brittle, and the scratch resistance of the hiding layer constituted of the cured product becomes insufficient in some cases.

In contrast, by setting the ratio of the high Tg polyfunctional monomer (II) within the range mentioned above, it becomes possible to further improve the hiding property of the hiding layer while suppressing the scratch resistance of the hiding layer from becoming insufficient.

Here, in consideration of improving the effects even more, the ratio of the high Tg polyfunctional monomer (II) in the total amount of the hiding layer coating agent is preferably not less than 11 mass % and preferably not more than 40 mass % even within the range mentioned above.

Also, the ratio of the other polyfunctional monomer in the total amount of the hiding layer coating agent is preferably not more than 17 mass % and especially preferably not more than 13 mass %.

If the ratio of the other polyfunctional monomer exceeds this range, the ratio of the high Tg polyfunctional monomer (II) is decreased relatively and the effect of enhancing the hiding property of the hiding layer cannot be obtained in some cases.

Also, the ratio of the monofunctional monomer is decreased relatively and the effects of imparting a suitable flexibility to the cured product, enhancing the rate of the curing reaction, and suppressing the viscosity of the hiding layer coating agent from increasing cannot be obtained in some cases.

Further, the scratch resistance of the hiding layer is decreased in some cases.

Here, a lower limit of the ratio of the other polyfunctional monomer is not restricted in particular and it is possible, as mentioned above, for the entire amount of the polyfunctional monomer to be the high Tg polyfunctional monomer (II) and the other polyfunctional monomer to be not included (to be excluded).

That is, the ratio of the other polyfunctional monomer may be 0 mass % in the total amount of the hiding layer coating agent.

The ratio $RS_3$ of the monofunctional monomer in the total amount of the radical polymerizable components is restricted to not less than 5 mass % and not more than 70 mass %.

The reasons for this are also as have been described above.

That is, by setting the ratio $RS_3$ of the monofunctional monomer within the range mentioned above, it becomes possible to suppress the toughness of the cured product, the abrasion resistance associated therewith of the hiding layer, and the scratch resistance of the hiding layer from becoming insufficient even while maintaining the effects due to using the monofunctional monomer in combination.

Here, in consideration of improving the effects even more, the ratio $RS_3$ of the monofunctional monomer in the total amount of the radical polymerizable components is preferably not less than 10 mass % and preferably not more than 65 mass % even within the range mentioned above.

Also, the ratio of the monofunctional monomer in the total amount of the hiding layer coating agent is preferably not less than 2.3 mass % and preferably not more than 32 mass %.

If the ratio of the monofunctional monomer is less than this range, although also depending on the ratio of the polyfunctional monomer, the above-described effects due to using the monofunctional monomer in combination cannot be obtained in some cases.

That is, the effects of imparting a suitable flexibility to the cured product, enhancing the rate of the curing reaction, and suppressing the viscosity of the hiding layer coating agent from increasing cannot be obtained at times.

Also, the scratch resistance of the hiding layer is decreased in some cases.

On the other hand, if the ratio of the monofunctional monomer exceeds the range mentioned above, the polyfunctional monomer that becomes the base of the three-dimensional network structure becomes deficient, the three-dimensional network structure that is formed becomes coarse, and the toughness of the cured product and the abrasion resistance of the hiding layer become insufficient in some cases.

Also, in some cases, the high Tg polyfunctional monomer becomes deficient and the effect of improving the hiding property of the hiding layer cannot be obtained sufficiently.

In contrast, by setting the ratio of the monofunctional monomer within the range mentioned above, the hiding property of the hiding layer can be improved further while maintaining the effects due to using the monofunctional monomer in combination and yet suppressing the toughness of the cured product, the abrasion resistance associated therewith of the hiding layer, and the scratch resistance of the hiding layer from becoming insufficient Here, in consideration of improving the effects even more, the ratio of the monofunctional monomer in the total amount of the hiding layer coating agent is preferably not less than 3.3 mass % and preferably not more than 30 mass % even within the range mentioned above.

⟨Colorant⟩

The hiding layer may be a colorless semitransparent or colorless nontransparent layer having the hiding property due to the mechanism described above, that is, a layer of substantially white color or may be a colored semitransparent or colored nontransparent layer that is colored to an arbitrary color tone as mentioned above.

To color the hiding layer, a colorant of an arbitrary color tone should be blended in the hiding layer coating agent.

As the colorant, various pigments, dyes, etc., that are of respective colors besides white (except for white) can be used.

In particular, in consideration of improving light fastness of the color tone of the hiding layer or fastness of not losing color or not undergoing color migration, etc., even if the recording sheet is wetted with water or a solvent, etc., various inorganic pigments and/or organic pigments are preferable.

As the inorganic pigments and/or organic pigments, one type or two or more types of the same inorganic pigments and/or organic pigments cited as examples for the color ink can be used.

One type or two or more types of the pigments can be used in accordance with the color tone of the hiding layer.

The pigment may be surface-treated to improve dispersion stability in the hiding layer coating agent.

Also, the monofunctional monomer described above, the volatile solvent to be described below, etc., may be used as a dispersion medium and the pigment may be used in a state of being dispersed in the dispersion medium as a pigment dispersion to manufacture the hiding layer coating agent.

A dispersant, etc., may be added to the pigment dispersion to disperse the pigment satisfactorily.

As the dispersant, it is possible to use any of various dispersants, for example, polymer-based dispersants, surfactants, etc.

A ratio of the pigment or other colorant can be set arbitrarily in accordance with the type of the colorant, the color tone of the hiding layer, etc.

However, the ratio of the colorant is preferably not less than 4.8 mass % and preferably not more than 18 mass % with respect to the total amount of the radical polymerizable components.

If the ratio of the colorant is less than this range, the coloring power of the colorant is too weak with respect to the above-described hiding power due to the cured product of the radical polymerizable components and the hiding layer having a sufficient color density cannot be formed in some cases.

On the other hand, if the ratio of the colorant exceeds the range mentioned above, especially in the case of a pigment, the overall viscosity of the hiding layer coating agent readily becomes too high or excess pigment readily aggregates within the hiding layer coating agent.

Therefore, in some cases, a discharge defect is caused readily, especially in a case of printing the hiding layer coating agent by an inkjet printing method.

Also, the curing of the hiding layer coating agent is impeded and the effect of improving the hiding property of the hiding layer due to porosification of the cured product cannot be obtained sufficiently or the hiding layer that is excellent in fixing property and abrasion resistance cannot be printed on the surface of the base sheet in some cases.

In contrast, by setting the ratio of the colorant within the range mentioned above, the overall viscosity of the hiding layer coating agent can be adjusted to be within the range suitable for discharge from a nozzle of an inkjet printer to suppress the occurrence of a discharge defect.

Moreover, the hiding layer that is excellent in fixing property and abrasion resistance, is high in hiding property, and yet has sufficient color density can be formed.

Here, in consideration of improving the effects even more, the ratio of the colorant is preferably not less than 6.5 mass %, especially preferably not less than 7.5 mass %, and preferably not more than 15 mass % with respect to the total amount of the radical polymerizable components even within the range mentioned above.

Here, if a pigment dispersion is used as the colorant, the ratio of the colorant is deemed to be the ratio of the pigment itself, which is the effective component within the pigment dispersion, with respect to the total amount of the radical polymerizable components.

⟨Binder Resin⟩

A binder resin may be blended in the hiding layer coating agent to enhance the fixing property of the hiding layer with respect to the surface of the base sheet and the abrasion resistance of the hiding layer associated therewith.

As the binder resin, various binder resins that can be dissolved or dispersed satisfactorily in the volatile solvent or the radical polymerizable components can be used.

As specific examples of the binder resin, for example, the same polyamide resin, acrylic resin, phenol resin, etc., cited as examples for the white ink can be cited. One type or two or more types of these binder resins can be used.

A ratio of the binder resin is preferably not less than 1 mass % and preferably not more than 10 mass % in the total amount of the hiding layer coating agent.

If the ratio of the binder resin is less than this range, the effect of enhancing the fixing property of the hiding layer with respect to the surface of the base sheet and the abrasion resistance of the hiding layer associated therewith due to blending the binder resin cannot be obtained sufficiently in some cases.

On the other hand, if the ratio of the binder resin exceeds the range mentioned above, so-called cogation occurs in some cases, especially when the hiding layer coating agent is used in a thermal type inkjet printer.

In contrast, by setting the ratio of the binder resin within the range mentioned above, the fixing property of the hiding layer with respect to the surface of the base sheet and the abrasion resistance of the hiding layer associated therewith can be enhanced sufficiently while suppressing the occurrence of cogation.

Here, in consideration of improving the effects even more, the ratio of the binder resin is preferably not less than 1.5 mass % and preferably not more than 8 mass % in the total amount of the hiding layer coating agent even within the range mentioned above.

⟨Volatile Solvent⟩

As the volatile solvent, various volatile solvents that can dissolve or disperse the radical polymerizable components and the binder resin satisfactorily and have volatility can be used.

In particular, a preferable volatile solvent is that which after printing on the surface of the base sheet is performed can volatilize preferably with a delay with respect to progress of the curing reaction of the radical polymerizable components and especially after the curing reaction is substantially ended.

As the volatile solvent, for example, the same various alcohols, ketones, ethers, esters, etc., cited as examples for the white ink can be cited. One type or two or more types of these volatile solvents can be used.

As the volatile solvent, an alcohol with 1 to 3 carbon atoms that has the suitable volatility described above and is unlikely to incur damage on a head of an inkjet printer, etc., is especially preferable.

Also, as the volatile solvent, at least one type of another volatile solvent such as an alcohol with 4 or more carbon atoms, a ketone, an ether, an ester, etc., may be used in combination with the alcohol with 1 to 3 carbon atoms.

These other volatile solvents are all excellent in ability to dissolve the radical polymerizable components and the binder resin and are thus capable of aiding the alcohol with 1 to 3 carbon atoms dissolve these components and controlling its dissolving ability arbitrarily.

Here, as the volatile solvent, it is preferable to selectively use that with which a difference in refractive index with respect to the high Tg polyfunctional monomer (II) is as large as possible.

Specifically, it is preferable to selectively use a volatile solvent with which the difference $\Delta R$ in refractive index with respect to the refractive index of the high Tg polyfunctional monomer (II) is not less than ±0.03.

When a volatile solvent with which the difference $\Delta R$ is less than ±0.03 is used, there is a tendency for the hiding layer to be decreased in hiding property due to influence of the volatile solvent remaining in the cured product, especially immediately after being formed by coating the hiding layer coating agent on the surface of the base sheet and making the radical polymerizable components undergo the curing reaction.

In contrast, by selectively using a volatile solvent with which the difference $\Delta R$ is not less than ±0.03, decreasing of the hiding property of the hiding layer can be suppressed and the hiding layer can be imparted with a high hiding property from immediately after being formed.

The refractive index of the high Tg polyfunctional monomer (II) can be measured in the same way and under the same conditions as the refractive indices of the high Tg polyfunctional monomer (I) and the volatile solvent described above.

Also likewise, if two or more types are to be used in combination as the high Tg polyfunctional monomers (II), the refractive index of one type of high Tg polyfunctional monomer (II) that makes up not less than 70 mass % of the combination as a main monomer is deemed to be the refractive index of the high Tg polyfunctional monomers (II) to determine the difference ΔR with respect to the refractive index of the volatile solvent.

Further likewise, if two or more types are to be used in combination as the volatile solvents, the refractive index of one type of volatile solvent that makes up not less than 70 mass % of the combination as a main solvent is deemed to be the refractive index of the volatile solvents to determine the difference ΔR with respect to the refractive index of the high Tg polyfunctional monomer (II).

<Ratio of Volatile Solvent>

As mentioned above, the ratio $RV_3$ of the volatile solvent is restricted to not less than 50 mass % and not more than 400 mass % with respect to the total amount of the radical polymerizable components.

The reasons are as have been mentioned above.

That is, if the ratio $RV_3$ of the volatile solvent is set within the range mentioned above, the hiding layer that has sufficient thickness, is excellent in scratch resistance, and is high in hiding property can be formed while suppressing the overall viscosity of the hiding layer coating agent to be within the range suitable for discharge to suppress the occurrence of a discharge defect.

Here, in consideration of improving the effects even more, the ratio $RV_3$ of the volatile solvent with respect to the total amount of the radical polymerizable components is preferably not less than 70 mass % and preferably not more than 370 mass % even within the range mentioned above.

Also, a ratio of the volatile solvent in the total amount of the hiding layer coating agent is preferably not less than 30 mass %, especially preferably not less than 40 mass %, preferably not more than 75 mass %, and especially preferably not more than 72 mass %.

If the ratio of the volatile solvent is less than this range, the above-described effect of porosifying the cured product and improving the hiding property of the hiding layer cannot be obtained in some cases.

Also, the ratio of the volatile solvent that contributes to the decrease in viscosity becomes insufficient such that the viscosity of the hiding layer coating agent exceeds the range suitable for discharge from a nozzle of an inkjet printer and a discharge defect is caused in some cases.

On the other hand, if the ratio of the volatile solvent exceeds the range mentioned above, the solids concentration in the hiding layer coating agent becomes insufficient and consequently, the hiding layer having sufficient thickness and being excellent in scratch resistance cannot be formed on the surface of the base sheet in some cases.

In contrast, if the ratio of the volatile solvent is set within the range mentioned above, the hiding layer having sufficient thickness, being excellent in scratch resistance, and being high in hiding property can be formed while suppressing the overall viscosity of the hiding layer coating agent to be within the range suitable for discharge to suppress the occurrence of a discharge defect.

In all cases, the ratio of the volatile solvent is a ratio of an alcohol with 1 to 3 carbon atoms if just the alcohol with 1 to 3 carbon atoms is used as the volatile solvent and is a ratio of a total of an alcohol with 1 to 3 carbon atoms and another volatile solvent if these are used in combination.

Also, a ratio of the other volatile solvent is preferably not more than 15 mass % in a total amount of the volatile solvent.

If the ratio of the other volatile solvent exceeds this range, the dissolving ability may become too strong and, for example, damage may be incurred on a head of an inkjet printer, etc.

In contrast, by setting the ratio of the other volatile solvent within the range mentioned above, the alcohol with 1 to 3 carbon atoms can be aided in dissolving the radical polymerizable components and the binder resin and its dissolving ability can be controlled arbitrarily without incurring damage on a head of an inkjet printer.

Here, for example, in a case where the pigment dispersion, etc., described above is used as the colorant, the ratios of the respective volatile solvents described above shall all be ratios that include a volatile solvent that is contained in the pigment dispersion.

⟨Photo-Radical Polymerization Initiator⟩

As the photo-radical polymerization initiator, any of various compounds with which a radical can be formed by irradiation of light of arbitrary wavelength to make the radical polymerizable components undergo a radical polymerization reaction can be used.

As specific examples of the photo-radical polymerization initiator, for example, one type or two or more types of the same various compounds, etc., cited as examples for the white ink can be used.

A ratio of the photo-radical polymerization initiator can be set arbitrarily.

However, in consideration of imparting the hiding layer coating agent with a satisfactory photocuring property, the ratio of the photo-radical polymerization initiator is preferably not less than 0.1 mass % and preferably not more than 12 mass % of the total amount of the hiding layer coating agent.

If two or more types of photo-radical polymerization initiators are to be used in combination, a ratio of a total thereof should be set within the range mentioned above.

⟨Other Components⟩

In addition to the respective components described above, various additives may further be blended in the hiding layer coating agent.

As the additives, for example, a sensitizer, a radical polymerization inhibitor, a surfactant, a tackifier, etc., can be cited.

Even in regard to these additives, for example, the same various compounds cited as examples for the white ink can be used and the ratios of the respective additives are preferably set to be substantially equal to those in the case of the white ink.

{Recording Sheet}

The recording sheet according to the preferred embodiment of the present invention is characterized in including the base sheet and the hiding layer that is constituted of the cured product of the hiding layer coating agent provided on the surface of the base sheet and has the hiding property.

The hiding layer may be formed on just one surface of the base sheet or may be formed on both surfaces of the base sheet.

⟨Base Sheet⟩

As the base sheet, as mentioned above, various sheets such as a bendable film or sheet of PET, PE, PP, etc., or an acrylic plate, a glass plate, or other base sheet that is hard, etc., can be used.

The base sheet may be in any state, for example, among colorless or colored and transparent, semitransparent, or nontransparent in accordance with the various expression modes described above.

Also, a surface of the base sheet, in particular, the surface on which the hiding layer is formed may be colored to an arbitrary color tone or a pattern may be printed in advance on the surface.

A thickness, size, etc., of the base sheet can be set arbitrarily in accordance with the expression mode and application of the recording sheet.

To enhance an adhesive property of the hiding layer, various substrate treatments may be applied to the surface of the base sheet on which the hiding layer is formed.

⟨Hiding Layer⟩

Although not restricted in particular, the thickness of the hiding layer is preferably not less than 1 μm, especially preferably not less than 3 μm, preferably not more than 20 μm, and especially preferably not more than 15 μm.

If the thickness is less than this range, the hiding layer cannot be imparted with a sufficient hiding property in some cases.

Also, the abrasion resistance of the hiding layer becomes insufficient in some cases.

On the other hand, if the thickness exceeds the range mentioned above, the followability of the hiding layer that is formed, for example, on the surface of the bendable base sheet mentioned above is decreased and the hiding layer becomes easily peeled, etc., due to bending of the base sheet in some cases.

Also, in some cases, a formed image cannot be made transparent sufficiently, especially if a discharge amount of an image recording ink is low.

In contrast, by setting the thickness within the range mentioned above, the hiding layer can be imparted with a satisfactory followability with respect to the base sheet and a formed image can be made transparent sufficiently even if the discharge amount of the ink is low.

Moreover, the hiding layer can also be imparted with a high abrasion resistance, hiding property, etc.

In particular, even within the range mentioned above, the greater the thickness of the hiding layer is made, the more the hiding property of the hiding layer can be improved.

{Method for Manufacturing Recording Sheet}

The method for manufacturing the recording sheet according to the preferred embodiment of the present invention is characterized in including the step of forming the hiding layer by coating the hiding layer coating agent on the surface of the base sheet and thereafter the step of causing the curing reaction by exposure to ultraviolet rays.

A method for coating the hiding layer coating agent on the surface of the base sheet is not restricted in particular and various coating methods such as a bar coating method, spray coating method, etc., can be adopted.

However, to form the hiding layer that is uniform in thickness and yet thin, it is preferable to print the hiding layer coating agent on the surface of the base sheet by an inkjet printing method using, for example, an inkjet printer that is of a drop-on-demand type and is of a thermal type or piezo type.

By the inkjet printing method, the hiding layer can be formed not just solidly across an entirety of the surface of the base sheet but it is also possible to form it, for example, to an arbitrary planar shape.

In printing the hiding layer by the inkjet printing method, the resolution of printing, although not restricted thereto, is preferably set to not less than 300×300 dpi.

If a dot density is less than this range, the number of dots is too few, the thickness of the hiding layer formed on the surface of the base sheet is insufficient, the hiding property of the hiding layer is decreased, and images of various expression modes such as mentioned above cannot be recorded more vividly in some cases.

In contrast, by setting the dot density within the range mentioned above, the hiding layer having sufficient thickness and being excellent in hiding property can be formed on the surface of the base sheet and images of various expression modes such as mentioned above can be recorded more vividly.

Also, if the hiding layer is to be formed by another coating method, a coating thickness of the hiding layer coating agent is preferably not less than 1 μm and preferably not more than 20 μm.

If the coating thickness is less than the range mentioned above, the thickness of the hiding layer formed on the surface of the base sheet is insufficient, the hiding property of the hiding layer is decreased, and images of various expression modes such as mentioned above cannot be recorded more vividly in some cases.

On the other hand, if the coating thickness exceeds the range mentioned above, the thickness of the hiding layer formed on the surface of the base sheet is too great and a discharge amount of an image recording ink must be increased to sufficiently decrease the hiding property of a region in which an image is recorded.

Defects such as decreasing of vividness of a recorded image, etc., are thus caused in some cases.

In contrast, by setting the coating thickness within the range mentioned above, the hiding layer that has a sufficient hiding property and yet enables the hiding property of the region in which an image is recorded to be decreased satisfactorily by discharge of a small amount of an image recording ink to enable images of various expression modes to be recorded more vividly can be formed.

To expose the coated hiding layer, for example, an LED curing lamp or a UV lamp, etc., can be used.

The hiding layer after curing can thereby be imparted with a high hiding property by the mechanism described above.

<<Recorded Product, Method for Manufacturing the Same and Image Recording Ink>>

{Recorded Product and Method for Manufacturing the Same}

A recorded product according to a preferred embodiment of the present invention is characterized in that a transparent or semitransparent image is recorded on the hiding layer of the recording sheet.

The recorded product can be manufactured by a manufacturing method for manufacturing that includes a step of recording the image on the hiding layer by an inkjet printing method using an image recording ink that is colorless or colored and is transparent or semitransparent.

For the recording of the image by the inkjet printing method, inkjet printers of various types, for example, an inkjet printer of a continuous type or an inkjet printer of a drop-on-demand type, etc., can be used.

{Image Recording Ink}

As an image recording ink according to a preferred embodiment of the present invention, various inks that are capable of recording an image by the inkjet printing method using the various inkjet printers mentioned above and yet with which the hiding property of the region of the hiding layer in which the image is recorded can be selectively decreased by the mechanism described above can be used.

That is, as the image recording ink, an ink that is colorless or has color due to being colored by a dye, pigment, etc., and is transparent or semitransparent and contains a transparent or semitransparent binder resin or precursor thereof that is capable of filling interiors of pores of the hiding layer to suppress diffuse reflection of light can be used.

Also, as the image recording ink, either of a dry-solidified type ink that is solidified and fixed to the hiding layer by being dried after recording and a photocuring ink that has a photocuring property and can be made to undergo a curing reaction by exposure to ultraviolet rays, etc., after recording can be used.

A photocuring ink is especially preferable.

By using the photocuring ink as the image recording ink, the toughness and the abrasion resistance of the hiding layer after image recording can be improved.

Also, for example, even if the recorded product becomes wet, etc., with water or a solvent, etc., the record does not become blotted or blurred and therefore, fastness of the record can also be enhanced.

As the photocuring ink, various inks that are nonsolvent based, water based, or solvent based, etc., and contain a monomer or an oligomer as a precursor of a binder resin can be cited.

Among these, the photocuring ink that is nonsolvent based can be used favorably, for example, in an inkjet printer that is of the drop-on-demand type and is of the piezo type, etc.

On the other hand, the photocuring ink that is water based or solvent based can be used favorably in various inkjet printers not just of the piezo type but also of the thermal type, etc., because it is easily decreased in viscosity and the water or the solvent also becomes a material for bubble formation by heating.

Especially in consideration of a drying property, etc., of the ink, the photocuring ink that is solvent based is more preferable than that which is water based.

Although not restricted thereto, for example, an ink that contain radical polymerizable components including a difunctional or higher polyfunctional monomer and a monofunctional monomer, a volatile solvent, and a photo-radical polymerization initiator and with which the polyfunctional monomer excludes a high Tg polyfunctional monomer with a glass transition temperature Tg of not less than 40° C. or includes the high Tg polyfunctional monomer at a ratio of less than 30 mass % in the total amount of the polyfunctional monomer can be cited as the photocuring ink that is solvent based.

As the radical polymerization components in the photocuring ink that is solvent based the same various monomers and oligomers as those used in the hiding layer coating agent can be used.

Also, even in regard to the volatile solvent and the photo-radical polymerization initiator, the same volatile solvent and photo-radical polymerization initiator as those used in the hiding layer coating agent can be used.

The same also applies to other components.

In addition to the respective components mentioned above, additives such as, for example, a sensitizer, a radical polymerization inhibitor, a surfactant, a tackifier, a colorant, etc., can be blended in the photocuring ink.

Even in regard to these additives, the same components as those used in the hiding layer coating agent can be used.

Unlike the hiding layer coating agent, the photocuring ink excludes the high Tg polyfunctional monomer or contains the high Tg polyfunctional monomer at a ratio (Rmh$_4$) of just less than 30 mass % and thereby, the forming of a porous structure by the mechanism described above during the curing reaction can be suppressed.

The cured product can thus be made transparent or semitransparent to selectively and satisfactorily decrease the hiding property of the region of the hiding layer in which an image is recorded.

A ratio in the total amount of the polyfunctional monomer of another polyfunctional monomer besides the high Tg polyfunctional monomer is a remaining amount after the high Tg polyfunctional monomer.

That is, in setting the ratio Rmh$_4$ of the high Tg polyfunctional monomer to a predetermined value within the range mentioned above, the ratio of the other polyfunctional monomer should be set such that the total amount of the polyfunctional monomer would be 100 mass %.

That is, the ratio of the other polyfunctional monomer preferably exceeds 70 mass % but is not more than 100 mass % in the total amount of the polyfunctional monomer.

As described above, the monofunctional monomer functions to impart a suitable flexibility to the cured product, enhance the rate of the curing reaction, and suppress an overall viscosity of the photocuring ink from increasing.

A ratio of the monofunctional monomer in a total amount of the radical polymerizable components (RS$_4$) is preferably not less than 5 mass %, especially preferably not less than 10 mass %, preferably not more than 70 mass %, and especially preferably not more than 60 mass %.

If the ratio RS$_4$ of the monofunctional monomer is less than this range, the functions due to using the monofunctional monomer cannot be obtained sufficiently in some cases.

Also, especially with the hiding layer that is formed on the surface of an acrylic plate, a glass plate, or other base sheet that is hard, the region in which an image is recorded is decreased in scratch resistance and a scratch is formed readily on a surface of the region.

On the other hand, if the ratio RS$_4$ of the monofunctional monomer exceeds the range mentioned above, the polyfunctional monomer that becomes the base of a three-dimensional network structure becomes deficient relatively, the three-dimensional network structure that is formed becomes coarse, and the toughness of the cured product becomes insufficient in some cases.

In contrast, by setting the ratio RS$_4$ of the monofunctional monomer within the range mentioned above, it becomes possible to suppress the toughness of the cured product and the abrasion resistance and the scratch resistance of the region of the hiding layer in which an image is recorded from becoming insufficient even while maintaining the effects due to using the monofunctional monomer in combination.

A ratio of the volatile solvent (RV$_4$) is preferably not less than 20 mass %, especially preferably not less than 30 mass %, preferably not more than 400 mass %, and especially preferably not more than 350 mass %.

If the ratio RV$_4$ of the volatile solvent that contributes to the decrease in viscosity is less than this range, the overall viscosity of the photocuring ink exceeds a range suitable for the inkjet printing method and a discharge defect is caused in some cases.

On the other hand, if the ratio RV$_4$ of the volatile solvent exceeds the range mentioned above, a solids concentration in the photocuring ink becomes insufficient and consequently, the hiding property of the region of the hiding layer in which an image is recorded cannot be decreased sufficiently in some cases.

In contrast, if the ratio RV$_4$ of the volatile solvent is set within the range mentioned above, the overall viscosity of the photocuring ink can be adjusted to be within the range suitable for discharge from a nozzle of an inkjet printer to suppress the occurrence of a discharge defect.

Moreover, the hiding property of the region of the hiding layer in which an image is recorded can be decreased sufficiently and images of various expression modes such as mentioned above can be recorded more vividly.

The image recording inks such as the photocuring ink containing the respective components described above, etc., can be used favorably widely in the various inkjet printers mentioned above.

Also, to expose an image recorded on the surface of the hiding layer, for example, an LED curing lamp or a UV lamp, etc., can be used.

EXAMPLES

Although the present invention shall now be described based on examples and comparative examples, the arrangement of the present invention is not necessarily restricted to these examples.

<<White Inks>>

Example 1-1

The respective components indicated below were blended at the ratios shown in Table 1 and after stirring until sufficiently dissolved, filtration using a 5 µm membrane filter was performed to prepare a white ink.

(Radical Polymerizable Components)

High Tg polyfunctional monomer (I): tris(2-hydroxyethyl) isocyanate triacrylate 〈SARTOMER SR368NS manufactured by ARKEMA Inc.; trifunctional; glass transition temperature Tg: 272° C.; refractive index: 1.449〉

Monofunctional monomer: ethoxylated phenyl acrylate 〈EBECRYL (registered trademark) 110 manufactured by Daicel-Allnex Ltd.; EQ 2 mol〉

(Binder Resin)

Polyamide resin: Versamid 725 manufactured by BASF Japan Ltd.

(Volatile Solvent)

Ethanol 〈Refractive index: 1.361〉

(Photo-radical Polymerization Initiator)

2,4,6-trimethylbenzoyldiphenylphosphine oxide 〈SpeedCure (registered trademark) TPO manufactured by Lambson Japan Co., Ltd.〉

(Other Components)

Sensitizer: 2-isopropylthioxanthone 〈SpeedCure 2-ITX manufactured by Lambson Japan Co., Ltd.〉

Radical polymerization inhibitor: Florstab UV-5 manufactured by Kromachem Ltd.

Surfactant: silicone acrylate based surfactant

TABLE 1

| Component | | Mass % |
|---|---|---|
| High Tg polyfunctional monomer (I) | SR368NS | 15 |
| Monofunctional monomer | EBECRYL 110 | 15 |
| Binder resin | Polyamide resin | 3 |
| Volatile solvent | Ethanol | 60 |
| Photo-radical polymerization initiator | TPO | 5.5 |
| Sensitizer | 2-ITX | 0.3 |
| Radical polymerization inhibitor | UV-5 | 1 |
| Surfactant | Silicone acrylate based | 0.2 |
| Total amount | | 100 |

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference $\Delta R$ in refractive index between SR368NS as the high Tg polyfunctional monomer (I) and ethanol as the volatile solvent was 0.088.

Example 1-2

A white ink was prepared in the same manner as in Example 1-1 with the exception of blending, in place of SR368NS, the same amount of pentaerythritol tetraacrylate 〈SARTOMER SR295NS manufactured by ARKEMA Inc.; tetrafunctional; glass transition temperature Tg: 103° C.; refractive index: 1.478〉 as the high Tg polyfunctional monomer (I).

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference $\Delta R$ in refractive index between SR295NS as the high Tg polyfunctional monomer (I) and ethanol as the volatile solvent was 0.117.

Example 1-3

A white ink was prepared in the same manner as in Example 1-1 with the exception of blending, in place of SR368NS, the same amount of pentaerythritol triacrylate 〈SARTOMER SR444NS manufactured by ARKEMA Inc.; trifunctional; glass transition temperature Tg: 103° C.; refractive index: 1.480〉 as the high Tg polyfunctional monomer (I).

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference $\Delta R$ in refractive index between SR444NS as the high Tg polyfunctional monomer (I) and ethanol as the volatile solvent was 0.119.

Example 1-4

A white ink was prepared in the same manner as in Example 1-1 with the exception of blending, in place of SR368NS, the same amount of dipentaerythritol pentaacrylate 〈SARTOMER SR399NS manufactured by ARKEMA Inc.; pentafunctional; glass transition temperature Tg: 90° C.; refractive index: 1.4898〉 as the high Tg polyfunctional monomer (I).

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference ΔR in refractive index between SR399NS as the high Tg polyfunctional monomer (I) and ethanol as the volatile solvent was 0.128.

Example 1-5

A white ink was prepared in the same manner as in Example 1-1 with the exception of blending, in place of SR368NS, the same amount of trimethylolpropane triacrylate ⟨SARTOMER SR351NS manufactured by ARKEMA Inc.; trifunctional; glass transition temperature Tg: 62° C.; refractive index: 1.47⟩ as the high Tg polyfunctional monomer (I).

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference ΔR in refractive index between SR351NS as the high Tg polyfunctional monomer (I) and ethanol as the volatile solvent was 0.111.

Example 1-6

A white ink was prepared in the same manner as in Example 1-1 with the exception of blending, in place of SR368NS, the same amount of tricyclodecane dimethanol diacrylate (SARTOMER SR833NS manufactured by ARKEMA Inc.; difunctional; glass transition temperature Tg: 186° C.; refractive index: 1.505) as the high Tg polyfunctional monomer (I).

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference ΔR in refractive index between SR833NS as the high Tg polyfunctional monomer (I) and ethanol as the volatile solvent was 0.144.

Comparative Example 1-1

A white ink was prepared in the same manner as in Example 1-1 with the exception of blending, in place of SR368NS as the high Tg polyfunctional monomer (I), the same amount of ethoxylated (20) trimethylolpropane triacrylate ⟨SARTOMER SR415 manufactured by ARKEMA Inc.; trifunctional; glass transition temperature Tg: 38° C.⟩.

The ratio $Rmh_1$ of the high Tg polyfunctional monomer (I) was 0 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Example 1-7

A white ink was prepared in the same manner as in Example 1-1 with the exception of setting the ratio of ethanol as a volatile solvent to 55 mass % in the total amount of the white ink and further blending 1-butanol ⟨refractive index: 1.399⟩ at a ratio of 5 mass % in the total amount of the white ink.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvents was 200 mass % with respect to the total amount of the radical polymerizable components.

Also, the difference ΔR in refractive index between SR368NS as the high Tg polyfunctional monomer (I) and ethanol as the main solvent in the volatile solvents was 0.088.

Example 1-8

A white ink was prepared in the same manner as in Example 1-1 with the exception of setting the ratio of ethanol as a volatile solvent to 55 mass % in the total amount of the white ink and further blending acetone ⟨refractive index: 1.359⟩ at a ratio of 5 mass % in the total amount of the white ink.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvents was 200 mass % with respect to the total amount of the radical polymerizable components.

Also, the difference ΔR in refractive index between SR368NS as the high Tg polyfunctional monomer (I) and ethanol as the main solvent in the volatile solvents was 0.088.

Example 1-9

A white ink was prepared in the same manner as in Example 1-1 with the exception of setting the ratio of ethanol as a volatile solvent to 55 mass % in the total amount of the PGP-18 T white ink and further blending ethyl acetate ⟨refractive index: 1.37⟩ at a ratio of 5 mass % in the total amount of the white ink.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvents was 200 mass % with respect to the total amount of the radical polymerizable components.

Also, the difference ΔR in refractive index between SR368NS as the high Tg polyfunctional monomer (I) and ethanol as the main solvent in the volatile solvents was 0.088.

Example 1-10

A white ink was prepared in the same manner as in Example 1-1 with the exception of setting the ratio of ethanol as a volatile solvent to 55 mass % in the total amount of the white ink and further blending cyclohexanone ⟨refractive index: 1.426⟩ at a ratio of 5 mass % in the total amount of the white ink.

Example 1-11

A white ink was prepared in the same manner as in Example 1-1 with the exception of blending, in place of ethanol, the same amount of cyclohexanone 〈refractive index: 1.426〉 as the volatile solvent.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference $\Delta R$ in refractive index between SR368NS as the high Tg polyfunctional monomer (I) and cyclohexanone as the volatile solvent was 0.023.

Comparative Example 1-2

A white ink was prepared in the same manner as in Example 1-1 with the exception of blending, in place of ethanol as the volatile solvent, the same amount of ultrapure water.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 0 mass % with respect to the total amount of the radical polymerizable components.

Example 1-12

A white ink was prepared in the same manner as in Example 1-1 with the exception of not blending the polyamide resin as the binder resin and besides setting the ratio of ethanol as the volatile solvent to 63 mass % in the total amount of the white ink.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 210 mass % with respect to the total amount of the radical polymerizable components.

Also, the difference $\Delta R$ in refractive index between SR368NS as the high Tg polyfunctional monomer (I) and ethanol as the volatile solvent was 0.088.

Example 1-13

A white ink was prepared in the same manner as in Example 1-1 with the exception of not blending the polyamide resin as the binder resin and besides setting the ratio of ethanol as the volatile solvent to 63 mass % in the total amount of the white ink and moreover blending, in place of EBECRYL 110, the same amount of N-vinyl-ε-caprolactam (VCAP) as the monofunctional monomer.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 210 mass % with respect to the total amount of the radical polymerizable components.

Also, the difference $\Delta R$ in refractive index between SR368NS as the high Tg polyfunctional monomer (I) and ethanol as the volatile solvent was 0.088.

Examples 1-14 to 1-18 and Comparative Examples 1-3 and 1-4

White inks were prepared in the same manner as in Example 1-1 with the exception of setting the ratios in the total amount of the white ink of SR368NS as the high Tg polyfunctional monomer (I), EBECRYL 110 as the monofunctional monomer, and ethanol as the volatile solvent respectively to the values shown in Table 2.

The ratios $Rmh_1$ of the high Tg polyfunctional monomer (I), the ratios $RS_1$ of the monofunctional monomer, and the ratios $RV_1$ of the volatile solvent were respectively as shown in Table 2.

TABLE 2

| | | Comparative Example 1-3 | Example 1-14 | Example 1-15 | Example 1-16 | Example 1-17 | Example 1-18 | Comparative Example 1-4 |
|---|---|---|---|---|---|---|---|---|
| Blending amount (mass %) | SR368NS | 32 | 30 | 25 | 22 | 10 | 9 | 8 |
| | EBECRYL 110 | 32 | 30 | 25 | 22 | 10 | 9 | 8 |
| | Ethanol | 26 | 30 | 40 | 46 | 70 | 72 | 74 |
| Ratio (mass %) | $Rmh_1$ | 100 | 100 | 100 | 100 | 100 | 100 | 100 |
| | $RS_1$ | 50 | 50 | 50 | 50 | 50 | 50 | 50 |
| | $RV_1$ | 40.6 | 50 | 80 | 104.5 | 350 | 400 | 462.5 |

Also, the difference $\Delta R$ in refractive index between SR368NS as the high Tg polyfunctional monomer (I) and ethanol as the volatile solvent was 0.088.

Examples 1-19 to 1-22, Comparative Example 1-5

White inks were prepared in the same manner as in Example 1-1 with the exception of setting the ratios of ethanol as the volatile solvent to 45 mass % in the total amount of the white ink, setting the ratios in the total amount of the white ink of SR368NS as the high Tg polyfunctional monomer (I) respectively to the values shown in Table 3, and further blending 1,6-hexanediol diacrylate (SARTOMER SR238F manufactured by ARKEMA Inc.; difunctional; glass transition temperature Tg: 43° C.) as another polyfunctional monomer at the ratios shown in the same Table.

The ratios $Rmh_1$ of the high Tg polyfunctional monomer (I), the ratios $RS_1$ of the monofunctional monomer, and the ratios $RV_1$ of the volatile solvent were respectively as shown in Table 3.

TABLE 3

|  |  | Comparative Example 1-5 | Example 1-19 | Example 1-20 | Example 1-21 | Example 1-22 |
|---|---|---|---|---|---|---|
| Blending amount (mass %) | SR368NS | 10 | 15 | 20 | 25 | 30 |
|  | SR238F | 20 | 15 | 10 | 5 | — |
| Ratio (mass %) | $Rmh_1$ | 33.3 | 50 | 66.7 | 83.3 | 100 |
|  | $RS_1$ | 33.3 | 33.3 | 33.3 | 33.3 | 33.3 |
|  | $RV_1$ | 100 | 100 | 100 | 100 | 100 |

Also, the difference ΔR in refractive index between SR368NS as the high Tg polyfunctional monomer (I) and ethanol as the volatile solvent was 0.088.

Examples 1-23 to 1-26, Comparative Examples 1-6 and 1-7

White inks were prepared in the same manner as in Example 1-1 with the exception of setting the ratios of ethanol as the volatile solvent to 45 mass % in the total amount of the white ink and setting the ratios of SR368NS as the high Tg polyfunctional monomer (I) and EBECRYL 110 as the monofunctional monomer respectively to the values shown in Table 4.

The ratios $Rmh_1$ of the high Tg polyfunctional monomer (I), the ratios $RS_1$ of the monofunctional monomer, and the ratios $RV_1$ of the volatile solvent were respectively as shown in Table 4.

TABLE 4

|  |  | Comparative Example 1-6 | Example 1-23 | Example 1-24 | Example 1-25 | Example 1-26 | Comparative Example 1-7 |
|---|---|---|---|---|---|---|---|
| Blending amount (mass %) | SR368NS | 39 | 38 | 35 | 16 | 14 | 12 |
|  | EBECRYL 110 | 6 | 7 | 10 | 29 | 31 | 33 |
| Ratio (mass %) | $Rmh_1$ | 100 | 100 | 100 | 100 | 100 | 100 |
|  | $RS_1$ | 13.3 | 15.6 | 22.2 | 64.4 | 68.9 | 73.3 |
|  | $RV_1$ | 100 | 100 | 100 | 100 | 100 | 100 |

Also, the difference ΔR in refractive index between SR368NS as the high Tg polyfunctional monomer (I) and ethanol as the volatile solvent was 0.088.

Example 1-27

A white ink was prepared in the same manner as in Example 1-1 with the exception of blending, in place of the polyamide resin, the same amount of an acrylic resin (NeoCryl B-813 manufactured by DSM Co., Ltd.) as the binder resin.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference ΔR in refractive index between SR368NS as the high Tg polyfunctional monomer (I) and ethanol as the volatile solvent was 0.088.

Example 1-28

A white ink was prepared in the same manner as in Example 1-1 with the exception of blending, in place of the polyamide resin, the same amount of a phenol resin (PHENOLITE TD-2106 manufactured by DIC Corp.) as the binder resin.

The ratio $Rmh_1$ of the high Tg polyfunctional monomer (I) was 100 mass % in the total amount of the polyfunctional monomer, the ratio $RS_1$ of the monofunctional monomer was 50 mass % in the total amount of the radical polymerizable components, and the ratio $RV_1$ of the volatile solvent was 200 mass % with respect to the total amount of the radical polymerizable components.

Also, the difference ΔR in refractive index between SR368NS as the high Tg polyfunctional monomer (I) and ethanol as the volatile solvent was 0.088.

Examples 1-29 to 1-32

White inks were prepared in the same manner as in Example 1-28 with the exception of setting the ratios of ethanol as the volatile solvent and the ratios of the phenol resin as the binder resin respectively to the values shown in Table 5.

The ratios $Rmh_1$ of the high Tg polyfunctional monomer (I), the ratios $RS_1$ of the monofunctional monomer, and the ratios $RV_1$ of the volatile solvent were respectively as shown in Table 5.

TABLE 5

|  |  | Example 1-29 | Example 1-30 | Example 1-31 | Example 1-32 |
|---|---|---|---|---|---|
| Blending amount (mass %) | Ethanol | 62 | 61 | 56 | 53 |
|  | Phenol resin | 1 | 2 | 7 | 10 |
| Ratio (mass %) | $Rmh_1$ | 100 | 100 | 100 | 100 |
|  | $RS_1$ | 50 | 50 | 50 | 50 |
|  | $RV_1$ | 206.7 | 203.3 | 186.7 | 176.7 |

Also, the difference ΔR in refractive index between SR368NS as the high Tg polyfunctional monomer (I) and ethanol as the volatile solvent was 0.088.

<Printing and Exposure Conditions>

Using the white inks prepared in the respective examples and comparative examples described above in an inkjet printer, printing on a surface of a printing object was performed under ordinary temperature (5 to 35° C.), and within 0.15 seconds from printing, the curing reaction was made to occur by exposure using an LED curing lamp. A resolution of printing was set to 600×600 dpi.

<Whiteness Evaluation>

The L value that represents the whiteness of a character printed using each white ink was determined by the method described above.

That is, a solidly printed surface of 0.5×0.5 inches was formed on a surface of a polyethylene terephthalate (PET) film as the printing object under the printing and exposure conditions described above.

Next, the L value of the solidly printed surface that was formed was measured using the handheld colorimeter ⟨X-rite (registered trademark) eXact manufactured by Videojet X-Rite K. K.⟩ and the whiteness was evaluated by the following standards.

○○○: The L value was not less than 70.
○○: The L value was not less than 60 but less than 70.
○: The L value was not less than 50 but less than 60.
Δ: The L value was not less than 40 but less than 50.
x: The L value was less than 40.

<Abrasion Resistance Evaluation>

A character of approximately 8.5 pt was formed on a surface of a PET film as the printing object under the printing and exposure conditions described above.

Next, the state of the formed character when it was rubbed a plurality of times with a cotton swab was observed and the abrasion resistance was evaluated by the following standards.

○: The character was legible even upon being rubbed 10 times by the cotton swab.
Δ: The character became illegible upon being rubbed 4 times to 9 times.
x: The character became illegible upon being rubbed 1 to 3 times.

<Followability Evaluation>

A barcode was formed on a surface of a PET film of 5 μm thickness as the printing object under the printing and exposure conditions described above.

Next, upon folding the PET film in a direction orthogonal to fine lines of the formed barcode and then spreading it again, the state of the fine lines was observed, reading by a barcode reader was performed, and followability was evaluated by the following standards.

○: No breaks or chipping were seen in the fine lines and reading by the barcode reader was also possible.
Δ: Although slight breaks or chipping were seen in the fine lines, reading by the barcode reader was possible.
x: Large breaks or chipping were seen in the fine lines and reading by the barcode reader was not possible.

<Discharge Property Evaluation>

A character was formed on a surface of a PET film as the printing object under the printing and exposure conditions described above. The formed character was then observed and the discharge property was evaluated by the following standards.

○: The character was without any blur, etc., and was clearly legible.
Δ: Although some blurring of the character was seen, it was legible.
x: The character was severely blurred and was illegible.

The results of the above are shown in Table 6 to Table 13.

TABLE 6

|  |  |  | Example 1-1 | Example 1-2 | Example 1-3 | Example 1-4 | Example 1-5 |
|---|---|---|---|---|---|---|---|
| Radical polymerizable components | High Tg polyfunctional monomer | Tg (° C.) | 272 | 103 | 103 | 90 | 62 |
|  |  | Number of functional groups | 3 | 4 | 3 | 5 | 3 |
|  |  | Mass % | 15 | 15 | 15 | 15 | 15 |
|  | Other polyfunctional monomer | Tg (° C.) | — | — | — | — | — |
|  |  | Number of functional groups | — | — | — | — | — |
|  |  | Mass % | — | — | — | — | — |
|  | Monofunctional monomer (mass %) | EBECRYL 110 | 15 | 15 | 15 | 15 | 15 |
|  |  | VCAP | — | — | — | — | — |
| Binder resin (mass %) | Polyamide resin |  | 3 | 3 | 3 | 3 | 3 |
|  | Acrylic resin |  | — | — | — | — | — |
|  | Phenol resin |  | — | — | — | — | — |
| Volatile solvent (mass %) | Ethanol |  | 60 | 60 | 60 | 60 | 60 |
|  | 1-butanol |  | — | — | — | — | — |
|  | Acetone |  | — | — | — | — | — |
|  | Ethyl acetate |  | — | — | — | — | — |
|  | Cyclohexanone |  | — | — | — | — | — |

TABLE 6-continued

|  |  | Example 1-1 | Example 1-2 | Example 1-3 | Example 1-4 | Example 1-5 |
|---|---|---|---|---|---|---|
| Ultrapure water (mass %) |  | — | — | — | — | — |
| Ratios of respective components (mass %) | $Rmh_1$ | 100 | 100 | 100 | 100 | 100 |
|  | $RS_1$ | 50 | 50 | 50 | 50 | 50 |
|  | $RV_1$ | 200 | 200 | 200 | 200 | 200 |
| Difference $\Delta R$ in refractive index |  | 0.088 | 0.117 | 0.119 | 0.128 | 0.111 |
| Evaluation | Whiteness | ○○○ | ○○○ | ○○ | ○○ | ○ |
|  | Abrasion resistance | ○ | ○ | ○ | ○ | ○ |
|  | Followability | ○ | ○ | ○ | ○ | ○ |
|  | Discharge property | ○ | ○ | ○ | ○ | ○ |

TABLE 7

|  |  |  | Example 1-6 | Comparative Example 1-1 | Example 1-7 | Example 1-8 | Example 1-9 |
|---|---|---|---|---|---|---|---|
| Radical polymerizable components | High Tg polyfunctional monomer | Tg (° C.) | 186 | — | 272 | 272 | 272 |
|  |  | Number of functional groups | 2 | — | 3 | 3 | 3 |
|  |  | Mass % | 15 | — | 15 | 15 | 15 |
|  | Other polyfunctional monomer | Tg (° C.) | — | 38 | — | — | — |
|  |  | Number of functional groups | — | 3 | — | — | — |
|  |  | Mass % | — | 15 | — | — | — |
|  | Monofunctional monomer (mass %) | EBECRYL 110 | 15 | 15 | 15 | 15 | 15 |
|  |  | VCAP | — | — | — | — | — |
| Binder resin (mass %) | Polyamide resin |  | 3 | 3 | 3 | 3 | 3 |
|  | Acrylic resin |  | — | — | — | — | — |
|  | Phenol resin |  | — | — | — | — | — |
| Volatile solvent (mass %) | Ethanol |  | 60 | 60 | 55 | 55 | 55 |
|  | 1-butanol |  | — | — | 5 | — | — |
|  | Acetone |  | — | — | — | 5 | — |
|  | Ethyl acetate |  | — | — | — | — | 5 |
|  | Cyclohexanone |  | — | — | — | — | — |
| Ultrapure water (mass %) |  |  | — | — | — | — | — |
| Ratios of respective components (mass %) | $Rmh_1$ |  | 100 | 0 | 100 | 100 | 100 |
|  | $RS_1$ |  | 50 | 50 | 50 | 50 | 50 |
|  | $RV_1$ |  | 200 | 200 | 200 | 200 | 200 |
| Difference $\Delta R$ in refractive index |  |  | 0.144 | — | 0.088 | 0.088 | 0.088 |
| Evaluation | Whiteness |  | Δ | x | ○○○ | ○○○ | ○○○ |
|  | Abrasion resistance |  | ○ | ○ | ○ | ○ | ○ |
|  | Followability |  | ○ | ○ | ○ | ○ | ○ |
|  | Discharge property |  | ○ | ○ | ○ | ○ | ○ |

TABLE 8

|  |  |  | Example 1-10 | Example 1-11 | Comparative Example 1-2 | Example 1-12 | Example 1-13 |
|---|---|---|---|---|---|---|---|
| Radical polymerizable components | High Tg polyfunctional monomer (I) | Tg (° C.) | 272 | 272 | 272 | 272 | 272 |
|  |  | Number of functional groups | 3 | 3 | 3 | 3 | 3 |
|  |  | Mass % | 15 | 15 | 15 | 15 | 15 |
|  | Other polyfunctional monomer | Tg (° C.) | — | — | — | — | — |
|  |  | Number of functional groups | — | — | — | — | — |
|  |  | Mass % | — | — | — | — | — |
|  | Monofunctional monomer (mass %) | EBECRYL 110 | 15 | 15 | 15 | 15 | — |
|  |  | VCAP | — | — | — | — | 15 |

TABLE 8-continued

|  |  | Example 1-10 | Example 1-11 | Comparative Example 1-2 | Example 1-12 | Example 1-13 |
|---|---|---|---|---|---|---|
| Binder resin (mass %) | Polyamide resin | 3 | 3 | 3 | — | — |
|  | Acrylic resin | — | — | — | — | — |
|  | Phenol resin | — | — | — | — | — |
| Volatile solvent (mass %) | Ethanol | 55 | — | — | 63 | 63 |
|  | 1-butanol | — | — | — | — | — |
|  | Acetone | — | — | — | — | — |
|  | Ethyl acetate | — | — | — | — | — |
|  | Cyclohexanone | 5 | 60 | — | — | — |
| Ultrapure water (mass %) |  | — | — | 60 | — | — |
| Ratios of respective components (mass %) | $Rmh_1$ | 100 | 100 | 100 | 100 | 100 |
|  | $RS_1$ | 50 | 50 | 50 | 50 | 50 |
|  | $RV_1$ | 200 | 200 | 0 | 210 | 210 |
| Difference $\Delta R$ in refractive index |  | 0.088 | 0.023 | — | 0.088 | 0.088 |
| Evaluation | Whiteness | ○○○ | ○ | x | ○○○ | ○○○ |
|  | Abrasion resistance | ○ | ○ | x | Δ | ○ |
|  | Followability | ○ | ○ | x | ○ | ○ |
|  | Discharge property | ○ | Δ | x | ○ | ○ |

TABLE 9

|  |  |  | Comparative Example 1-3 | Example 1-14 | Example 1-15 | Example 1-16 | Example 1-17 |
|---|---|---|---|---|---|---|---|
| Radical polymerizable components | High Tg polyfunctional monomer (I) | Tg (° C.) | 272 | 272 | 272 | 272 | 272 |
|  |  | Number of functional groups | 3 | 3 | 3 | 3 | 3 |
|  |  | Mass % | 32 | 30 | 25 | 22 | 10 |
|  | Other polyfunctional monomer | Tg (° C.) | — | — | — | — | — |
|  |  | Number of functional groups | — | — | — | — | — |
|  |  | Mass % | — | — | — | — | — |
|  | Monofunctional monomer (mass %) | EBECRYL 110 | 32 | 30 | 25 | 22 | 10 |
|  |  | VCAP | — | — | — | — | — |
| Binder resin (mass %) | Polyamide resin |  | 3 | 3 | 3 | 3 | 3 |
|  | Acrylic resin |  | — | — | — | — | — |
|  | Phenol resin |  | — | — | — | — | — |
| Volatile solvent (mass %) | Ethanol |  | 26 | 30 | 40 | 46 | 70 |
|  | 1-butanol |  | — | — | — | — | — |
|  | Acetone |  | — | — | — | — | — |
|  | Ethyl acetate |  | — | — | — | — | — |
|  | Cyclohexanone |  | — | — | — | — | — |
| Ultrapure water (mass %) |  |  | — | — | — | — | — |
| Ratios of respective components (mass %) | $Rmh_1$ |  | 100 | 100 | 100 | 100 | 100 |
|  | $RS_1$ |  | 50 | 50 | 50 | 50 | 50 |
|  | $RV_1$ |  | 40.6 | 50 | 80 | 104.5 | 350 |
| Difference $\Delta R$ in refractive index |  |  | 0.088 | 0.088 | 0.088 | 0.088 | 0.088 |
| Evaluation | Whiteness |  | x | ○○ | ○○○ | ○○○ | ○○○ |
|  | Abrasion resistance |  | ○ | ○ | ○ | ○ | ○ |
|  | Followability |  | ○ | ○ | ○ | ○ | ○ |
|  | Discharge property |  | x | Δ | ○ | ○ | ○ |

TABLE 10

| | | | Example 1-18 | Comparative Example 1-4 | Comparative Example 1-5 | Example 1-19 | Example 1-20 |
|---|---|---|---|---|---|---|---|
| Radical polymerizable components | High Tg polyfunctional monomer (I) | Tg (° C.) | 272 | 272 | 272 | 272 | 272 |
| | | Number of functional groups | 3 | 3 | 3 | 3 | 3 |
| | | Mass % | 9 | 8 | 10 | 15 | 20 |
| | Other polyfunctional monomer | Tg (° C.) | — | — | 43 | 43 | 43 |
| | | Number of functional groups | — | — | 2 | 2 | 2 |
| | | Mass % | — | — | 20 | 15 | 10 |
| | Monofunctional monomer (mass %) | EBECRYL 110 | 9 | 8 | 15 | 15 | 15 |
| | | VCAP | — | — | — | — | — |
| Binder resin (mass %) | Polyamide resin | | 3 | 3 | 3 | 3 | 3 |
| | Acrylic resin | | — | — | — | — | — |
| | Phenol resin | | — | — | — | — | — |
| Volatile solvent (mass %) | Ethanol | | 72 | 74 | 45 | 45 | 45 |
| | 1-butanol | | — | — | — | — | — |
| | Acetone | | — | — | — | — | — |
| | Ethyl acetate | | — | — | — | — | — |
| | Cyclohexanone | | — | — | — | — | — |
| Ultrapure water (mass %) | | | — | — | — | — | — |
| Ratios of respective components (mass %) | $Rmh_1$ | | 100 | 100 | 33.3 | 50 | 66.7 |
| | $RS_1$ | | 50 | 50 | 33.3 | 33.3 | 33.3 |
| | $RV_1$ | | 400 | 462.5 | 100 | 100 | 100 |
| Difference $\Delta R$ in refractive index | | | 0.088 | 0.088 | 0.088 | 0.088 | 0.088 |
| Evaluation | Whiteness | | ooo | ooo | x | oo | ooo |
| | Abrasion resistance | | Δ | x | o | o | o |
| | Followability | | o | o | o | o | o |
| | Discharge property | | o | o | o | o | o |

TABLE 11

| | | | Example 1-21 | Example 1-22 | Comparative Example 1-6 | Example 1-23 | Example 1-24 |
|---|---|---|---|---|---|---|---|
| Radical polymerizable components | High Tg polyfunctional monomer (I) | Tg (° C.) | 272 | 272 | 272 | 272 | 272 |
| | | Number of functional groups | 3 | 3 | 3 | 3 | 3 |
| | | Mass % | 25 | 30 | 39 | 38 | 35 |
| | Other polyfunctional monomer | Tg (° C.) | 43 | — | — | — | — |
| | | Number of functional groups | 2 | — | — | — | — |
| | | Mass % | 5 | — | — | — | — |
| | Monofunctional monomer (mass %) | EBECRYL 110 | 15 | 15 | 6 | 7 | 10 |
| | | VCAP | — | — | — | — | — |
| Binder resin (mass %) | Polyamide resin | | 3 | 3 | 3 | 3 | 3 |
| | Acrylic resin | | — | — | — | — | — |
| | Phenol resin | | — | — | — | — | — |
| Volatile solvent (mass %) | Ethanol | | 45 | 45 | 45 | 45 | 45 |
| | 1-butanol | | — | — | — | — | — |
| | Acetone | | — | — | — | — | — |
| | Ethyl acetate | | — | — | — | — | — |
| | Cyclohexanone | | — | — | — | — | — |
| Ultrapure water (mass %) | | | — | — | — | — | — |
| Ratios of respective components (mass %) | $Rmh_1$ | | 83.3 | 100 | 100 | 100 | 100 |
| | $RS_1$ | | 33.3 | 33.3 | 13.3 | 15.6 | 22.2 |
| | $RV_1$ | | 100 | 100 | 100 | 100 | 100 |
| Difference $\Delta R$ in refractive index | | | 0.088 | 0.088 | 0.088 | 0.088 | 0.088 |
| Evaluation | Whiteness | | ooo | ooo | ooo | ooo | ooo |
| | Abrasion resistance | | o | o | o | o | o |
| | Followability | | o | o | x | Δ | o |
| | Discharge property | | o | o | x | Δ | o |

TABLE 12

|  |  |  | Example 1-25 | Example 1-26 | Comparative Example 1-7 | Example 1-27 | Example 1-28 |
|---|---|---|---|---|---|---|---|
| Radical polymerizable components | High Tg polyfunctional monomer (I) | Tg (° C.) | 272 | 272 | 272 | 272 | 272 |
|  |  | Number of functional groups | 3 | 3 | 3 | 3 | 3 |
|  |  | Mass % | 16 | 14 | 12 | 15 | 15 |
|  | Other polyfunctional monomer | Tg (° C.) | — | — | — | — | — |
|  |  | Number of functional groups | — | — | — | — | — |
|  |  | Mass % | — | — | — | — | — |
|  | Monofunctional monomer (mass %) | EBECRYL 110 | 29 | 31 | 33 | 15 | 15 |
|  |  | VCAP | — | — | — | — | — |
| Binder resin (mass %) | Polyamide resin |  | 3 | 3 | 3 | — | — |
|  | Acrylic resin |  | — | — | — | 3 | — |
|  | Phenol resin |  | — | — | — | — | 3 |
| Volatile solvent (mass %) | Ethanol |  | 45 | 45 | 45 | 60 | 60 |
|  | 1-butanol |  | — | — | — | — | — |
|  | Acetone |  | — | — | — | — | — |
|  | Ethyl acetate |  | — | — | — | — | — |
|  | Cyclohexanone |  | — | — | — | — | — |
| Ultrapure water (mass %) |  |  | — | — | — | — | — |
| Ratios of respective components (mass %) | $Rmh_1$ |  | 100 | 100 | 100 | 100 | 100 |
|  | $RS_1$ |  | 64.4 | 68.9 | 73.3 | 50 | 50 |
|  | $RV_1$ |  | 100 | 100 | 100 | 200 | 200 |
| Difference $\Delta R$ in refractive index |  |  | 0.088 | 0.088 | 0.088 | 0.088 | 0.088 |
| Evaluation | Whiteness |  | ○○○ | ○○○ | ○○○ | ○○○ | ○○○ |
|  | Abrasion resistance |  | ○ | Δ | x | ○ | ○ |
|  | Followability |  | ○ | ○ | ○ | ○ | ○ |
|  | Discharge property |  | ○ | ○ | ○ | ○ | ○ |

TABLE 13

|  |  |  | Example 1-29 | Example 1-30 | Example 1-31 | Example 1-32 |
|---|---|---|---|---|---|---|
| Radical polymerizable components | High Tg polyfunctional monomer (I) | Tg (° C.) | 272 | 272 | 272 | 272 |
|  |  | Number of functional groups | 3 | 3 | 3 | 3 |
|  |  | Mass % | 15 | 15 | 15 | 15 |
|  | Other polyfunctional monomer | Tg (° C.) | — | — | — | — |
|  |  | Number of functional groups | — | — | — | — |
|  |  | Mass % | — | — | — | — |
|  | Monofunctional monomer (mass %) | EBECRYL 110 | 15 | 15 | 15 | 15 |
|  |  | VCAP | — | — | — | — |
| Binder resin (mass %) | Polyamide resin |  | — | — | — | — |
|  | Acrylic resin |  | — | — | — | — |
|  | Phenol resin |  | 1 | 2 | 7 | 10 |
| Volatile solvent (mass %) | Ethanol |  | 62 | 61 | 56 | 53 |
|  | 1-butanol |  | — | — | — | — |
|  | Acetone |  | — | — | — | — |
|  | Ethyl acetate |  | — | — | — | — |
|  | Cyclohexanone |  | — | — | — | — |
| Ultrapure water (mass %) |  |  | — | — | — | — |
| Ratios of respective components (mass %) | $Rmh_1$ |  | 100 | 100 | 100 | 100 |
|  | $RS_1$ |  | 50 | 50 | 50 | 50 |
|  | $RV_1$ |  | 206.7 | 203.3 | 186.7 | 176.7 |
| Difference $\Delta R$ in refractive index |  |  | 0.088 | 0.088 | 0.088 | 0.088 |
| Evaluation | Whiteness |  | ○○○ | ○○○ | ○○○ | ○○○ |
|  | Abrasion resistance |  | Δ | ○ | ○ | ○ |
|  | Followability |  | ○ | ○ | ○ | ○ |
|  | Discharge property |  | ○ | ○ | ○ | Δ |

From the results of Examples 1-1 to 1-32 and Comparative Examples 1-1 and 1-2 in Table 6 to Table 13, it was found that the white ink must contain radical polymerizable components, a volatile solvent, and a photo-radical polymerization initiator and must contain, as the radical polymerizable components among these, a difunctional or higher polyfunctional monomer and a monofunctional monomer and the polyfunctional monomer must include the high Tg polyfunctional monomer (I) with the glass transition temperature Tg of not less than 60° C.

Also, especially from the results of Examples 1-1 and 1-19 to 1-22 and Comparative Example 1-5, it was found that the ratio $Rmh_1$ of the high Tg polyfunctional monomer (I) must be not less than 50 mass % and is especially preferably not less than 65 mass % in the total amount of the polyfunctional monomer.

From the results of Examples 1-1 and 1-23 to 1-26 and Comparative Examples 1-6 and 1-7, it was found that the ratio $RS_1$ of the monofunctional monomer must be not less than 15 mass % and not more than 70 mass %, is especially preferably not less than 20 mass %, and is preferably not more than 65 mass % in the total amount of the radical polymerizable components.

From the results of Examples 1-1 and 1-14 to 1-18 and Comparative Examples 1-3 and 1-4, it was found that the ratio $RV_1$ of the volatile solvent must be not less than 50 mass % and not more than 400 mass %, is especially preferably not less than 70 mass %, and is preferably not more than 370 mass % with respect to the total amount of the radical polymerizable components.

From the results of Examples 1-1 to 1-6, it was found that as the high Tg polyfunctional monomer (I), it is preferable to selectively use a compound that is trifunctional or higher and more preferably a compound that is trifunctional or higher and has a glass transition temperature Tg of not less than 90° C. and especially, it is even more preferable to selectively use a compound that is trifunctional or higher and has a glass transition temperature Tg of not less than 200° C. and not more than 300° C. or a compound that is tetrafunctional or higher and has a glass transition temperature Tg of not less than 100° C. but less than 200° C.

From the results of Examples 1-1 and 1-7 to 1-11, it was found that as the volatile solvent, an alcohol with 1 to 3 carbon atoms may be used alone or an alcohol with 1 to 3 carbon atoms may be used in combination with an alcohol with 4 carbon atoms or more, a ketone, an ester, or an ether as another volatile solvent and in the case of combined use, the ratio of the other volatile solvent is preferably not more than 10 mass % in the total amount of the volatile solvents.

Also, from the results of Examples 1-1 to 1-6 and 1-7 to 1-11, it was found that as the volatile solvent, it is preferable to selectively use a volatile solvent with which the difference ΔR in refractive index with respect to the high Tg polyfunctional monomer (I) is not less than ±0.03.

From the results of Examples 1-1, 1-12, and 1-13, it was found that it is preferable for the white ink to contain vinylcaprolactam as the monofunctional monomer and/or to contain a binder resin.

From the results of Examples 1-1, 1-27, and 1-28, it was found that a polyamide resin, an acrylic resin, a phenol resin, etc., is usable as the binder resin.

Further, from the results of Examples 1-29 to 1-32, it was found that the ratio of a phenol resin or other binder resin is preferably not less than 1 mass %, especially preferably not less than 1.5 mass %, preferably not more than 10 mass %, and especially preferably not more than 8 mass % in the total amount of the white ink.

<<Color Inks>>

Example 2-1

(Preparation of Cyan Pigment Dispersion)

The respective components indicated below were blended at the ratios shown in Table 14, stirred, and thereafter dispersed using a beads mill to prepare a cyan pigment dispersion (hereinafter indicated at times as "B-01" as the type of dispersion).

Pigment: C. I. pigment blue 15:4

Dispersant: DISPERBYK (registered trademark)-145 (solids content: 100%) manufactured by BYK-Chemie Japan K. K.

Dispersion medium: Ethanol

TABLE 14

| Component | Mass % |
| --- | --- |
| Pigment | 15 |
| Dispersant | 5 |
| Dispersion medium | 80 |

(Preparation of Color Ink)

The respective components indicated below were blended at the ratios shown in Table 15 and stirred until sufficiently dissolved, and then after adding the priorly prepared pigment dispersion B-01 at the ratio shown in Table 15 and stirring further, filtration using a 5 μm membrane filter was performed to prepare a color ink.

Radical Polymerizable Components

High Tg polyfunctional monomer (II): tris(2-hydroxyethyl)isocyanate triacrylate 〈SARTOMER SR368NS manufactured by ARKEMA Inc.; trifunctional; glass transition temperature Tg: 272° C.; refractive index: 1.449〉

Monofunctional monomer: N-vinyl-ε-caprolactam (VCAP)

Volatile Solvent

Ethanol 〈Refractive index: 1.361〉

Photo-radical Polymerization Initiator 2,4,6-trimethylbenzoyldiphenylphosphine oxide 〈SpeedCure (registered trademark) TPO manufactured by Lambson Japan Co., Ltd.〉

Other Components

Sensitizer: 2-isopropythioxanthone 〈SpeedCure 2-ITX manufactured by Lambson Japan Co., Ltd.〉

Radical polymerization inhibitor: Florstab UV-5 manufactured by Kromachem Ltd.

Surfactant: silicone acrylate based surfactant

TABLE 15

| Component | | Mass % |
|---|---|---|
| Pigment dispersion | B-01 | 20 |
| High Tg polyfunctional monomer (II) | SR368NS | 25 |
| Monofunctional monomer | VCAP | 5 |
| Volatile solvent | Ethanol | 43 |
| Photo-radical polymerization initiator | TPO | 5.4 |
| Sensitizer | 2-ITX | 0.8 |
| Radical polymerization inhibitor | UV-5 | 0.5 |
| Surfactant | Silicone acrylate based | 0.3 |
| Total amount | | 100 |

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR368NS as the high Tg polyfunctional monomer (II) and ethanol as the volatile solvent was 0.088.

Example 2-2

A color ink was prepared in the same manner as in Example 2-1 with the exception of blending, in place of SR368NS, the same amount of pentaerythritol tetraacrylate 〈SARTOMER SR295NS manufactured by ARKEMA Inc.; tetrafunctional; glass transition temperature Tg: 103° C.; refractive index: 1.478〉 as the high Tg polyfunctional monomer (II).

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR295NS as the high Tg polyfunctional monomer (II) and ethanol as the volatile solvent was 0.117.

Example 2-3

A color ink was prepared in the same manner as in Example 2-1 with the exception of blending, in place of SR368NS, the same amount of pentaerythritol triacrylate 〈SARTOMER SR444NS manufactured by ARKEMA Inc.; trifunctional; glass transition temperature Tg: 103° C.; refractive index: 1.480〉 as the high Tg polyfunctional monomer (II).

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR444NS as the high Tg polyfunctional monomer (II) and ethanol as the volatile solvent was 0.119.

Example 2-4

A color ink was prepared in the same manner as in Example 2-1 with the exception of blending, in place of SR368NS, the same amount of dipentaerythritol pentaacrylate 〈SARTOMER SR399NS manufactured by ARKEMA Inc.; pentafunctional; glass transition temperature Tg: 90° C.; refractive index: 1.489〉 the high Tg polyfunctional monomer (II).

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR399NS as the high Tg polyfunctional monomer (II) and ethanol as the volatile solvent was 0.128.

Example 2-5

A color ink was prepared in the same manner as in Example 2-1 with the exception of blending, in place of SR368NS, the same amount of trimethylolpropane triacrylate 〈SARTOMER SR351NS manufactured by ARKEMA Inc.; trifunctional; glass transition temperature Tg: 62° C.; refractive index: 1.472〉 as the high Tg polyfunctional monomer (II).

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR351NS as the high Tg polyfunctional monomer (II) and ethanol as the volatile solvent was 0.111.

Example 2-6

A color ink was prepared in the same manner as in Example 2-1 with the exception of blending, in place of SR368NS, the same amount of tricyclodecane dimethanol diacrylate 〈SARTOMER SR833NS manufactured by ARKEMA Inc.; difunctional; glass transition temperature Tg: 186° C.; refractive index: 1.505〉 as the high Tg polyfunctional monomer (II).

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference $\Delta R$ in refractive index between SR833NS as the high Tg polyfunctional monomer (II) and ethanol as the volatile solvent was 0.144.

Example 2-7

A color ink was prepared in the same manner as in Example 2-1 with the exception of blending, in place of SR368NS, the same amount of 1,6-hexanediol diacrylate 〈SARTOMER SR238NS manufactured by ARKEMA Inc.; difunctional; glass transition temperature Tg: 43° C.; refractive index: 1.456〉 as the high Tg polyfunctional monomer (II).

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference $\Delta R$ in refractive index between SR238NS as the high Tg polyfunctional monomer (II) and ethanol as the volatile solvent was 0.095.

Comparative Example 2-1

A color ink was prepared in the same manner as in Example 2-1 with the exception of blending, in place of SR368NS as the high Tg polyfunctional monomer (II), the same amount of ethoxylated (20) trimethylolpropane triacrylate 〈SARTOMER SR415 manufactured by ARKEMA Inc.; trifunctional; glass transition temperature Tg: 38° C.〉.

The ratio $Rmh_2$ of the high Tg polyfunctional monomer (II) in the total amount of the polyfunctional monomer was 0 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Comparative Example 2-2

A color ink was prepared in the same manner as in Example 2-1 with the exception of blending, in place of SR368NS as the high Tg polyfunctional monomer (II), the same amount of propoxylated (2) neopentyl glycol diacrylate 〈SARTOMER SR9003NS manufactured by ARKEMA Inc.; difunctional; glass transition temperature Tg: 32° C.〉.

The ratio $Rmh_2$ of the high Tg polyfunctional monomer (II) in the total amount of the polyfunctional monomer was 0 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Example 2-8

A color ink was prepared in the same manner as in Example 2-1 with the exception of setting a ratio of ethanol as a volatile solvent to 38 mass % in the total amount of the color ink and further blending 1-butanol 〈refractive index: 1.399〉 at a ratio of 5 mass % in the total amount of the color ink.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvents with respect to the total amount of the radical polymerizable components was 196.7 mass % including the ethanol contained in the pigment dispersion.

Also, the difference $\Delta R$ in refractive index between SR368NS as the high Tg polyfunctional monomer (II) and ethanol as the main solvent in the volatile solvents was 0.088.

Example 2-9

A color ink was prepared in the same manner as in Example 2-1 with the exception of setting the ratio of ethanol as a volatile solvent to 38 mass % in the total amount of the color ink and further blending acetone 〈Refractive index: 1.359〉 at a ratio of 5 mass % in the total amount of the color ink.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvents with respect to the total amount of the radical polymerizable components was 196.7 mass % including the ethanol contained in the pigment dispersion.

Also, the difference $\Delta R$ in refractive index between SR368NS as the high Tg polyfunctional monomer (II) and ethanol as the main solvent in the volatile solvents was 0.088.

Example 2-10

A color ink was prepared in the same manner as in Example 2-1 with the exception of setting the ratio of ethanol as a volatile solvent to 38 mass % in the total amount of the color ink and further blending ethyl acetate 〈Refractive index: 1.372〉 at a ratio of 5 mass % in the total amount of the color ink.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvents with respect to the total amount of the radical polymerizable components was 196.7 mass % including the ethanol contained in the pigment dispersion.

Also, the difference ΔR in refractive index between SR368NS as the high Tg polyfunctional monomer (II) and ethanol as the main solvent in the volatile solvents was 0.088.

Example 2-11

A color ink was prepared in the same manner as in Example 2-1 with the exception of setting the ratio of ethanol as a volatile solvent to 38 mass % in the total amount of the color ink and further blending cyclohexanone ⟨refractive index: 1.42⟩ at a ratio of 5 mass % in the total amount of the color ink.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvents with respect to the total amount of the radical polymerizable components was 196.7 mass % including the ethanol contained in the pigment dispersion.

Also, the difference ΔR in refractive index between SR368NS as the high Tg polyfunctional monomer (II) and ethanol as the main solvent in the volatile solvents was 0.088.

Example 2-12

A color ink was prepared in the same manner as in Example 2-1 with the exception of blending, in place of ethanol, the same amount of cyclohexanone ⟨Refractive index: 1.426⟩ as the volatile solvent.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR368NS as the high Tg polyfunctional monomer (II) and cyclohexanone as the volatile solvent was 0.023.

Comparative Example 2-3

A color ink was prepared in the same manner as in Example 2-1 with the exception of blending, in place of ethanol as the volatile solvent, the same amount of ultrapure water.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 53.3 mass % including the ethanol contained in the pigment dispersion.

Example 2-13

A color ink was prepared in the same manner as in Example 2-1 with the exception of blending a polyamide resin ⟨Versamid 725 manufactured by BASF Japan Ltd.⟩ as a binder resin at a ratio of 3 mass % in the total amount of the color ink, blending, in place of VCAP, the same amount of ethoxylated phenyl acrylate ⟨EBECRYL (registered trademark) 110 manufactured by Daicel-Allnex Ltd.; EQ 2 mol⟩ as the monofunctional monomer, and setting the ratio of ethanol as the volatile solvent to 40 mass % in the total amount of the color ink.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 186.7 mass % including the ethanol contained in the pigment dispersion.

Also, the difference ΔR in refractive index between SR368NS as the high Tg polyfunctional monomer (II) and ethanol as the volatile solvent was 0.088.

Example 2-14

A color ink was prepared in the same manner as in Example 2-13 with the exception of blending, in place of the polyamide resin, the same amount of an acrylic resin ⟨NeoCryl B-813 manufactured by DSM Co., Ltd.⟩ as the binder resin.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 186.7 mass % including the ethanol contained in the pigment dispersion.

Also, the difference ΔR in refractive index between SR368NS as the high Tg polyfunctional monomer (II) and ethanol as the volatile solvent was 0.088.

Example 2-15

A color ink was prepared in the same manner as in Example 2-13 with the exception of blending, in place of the polyamide resin, the same amount of a phenol resin ⟨PHENOLITE TD-2106 manufactured by DIC Corp.⟩ as the binder resin.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 186.7 mass % including the ethanol contained in the pigment dispersion.

Also, the difference ΔR in refractive index between SR368NS as the high Tg polyfunctional monomer (II) and ethanol as the volatile solvent was 0.088.

Examples 2-16 to 2-19

Color inks were prepared in the same manner as in Example 2-13 with the exception of setting the ratios in the total amount of the color ink of the polyamide resin as the binder resin and ethanol as the volatile solvent respectively to the values shown in Table 16.

The ratios $Rmh_2$ of the high Tg polyfunctional monomer (II), the ratios $RS_2$ of the monofunctional monomer, and the ratios $RV_2$ of the volatile solvent including the ethanol contained in the pigment dispersion were respectively as shown in Table 16.

TABLE 16

|  |  | Example 2-16 | Example 2-17 | Example 2-18 | Example 2-19 |
|---|---|---|---|---|---|
| Blending amount (mass %) | Polyamide resin | 1 | 2 | 7 | 10 |
|  | Ethanol | 42 | 41 | 36 | 33 |
| Ratio (mass %) | $Rmh_2$ | 100 | 100 | 100 | 100 |
|  | $RS_2$ | 16.7 | 16.7 | 16.7 | 16.7 |
|  | $RV_2$ | 193.3 | 190.0 | 173.3 | 163.3 |

Also, the differences ΔR in refractive index between SR368NS as the high Tg polyfunctional monomer (II) and ethanol as the volatile solvent were all 0.088.

Examples 2-20 to 2-24, Comparative Examples 2-4 and 2-5

Color inks were prepared in the same manner as in Example 2-1 with the exception of setting the ratios in the total amount of the color ink of SR368NS as the high Tg polyfunctional monomer (II), VCAP as the monofunctional monomer, and ethanol as the volatile solvent respectively to the values shown in Table 17.

The ratios $Rmh_2$ of the high Tg polyfunctional monomer (II), the ratios $RS_2$ of the monofunctional monomer, and the ratios $RV_2$ of the volatile solvent including the ethanol contained in the pigment dispersion were respectively as shown in Table 17.

TABLE 17

|  |  | Comparative Example 2-4 | Example 2-20 | Example 2-21 | Example 2-22 | Example 2-23 | Example 2-24 | Comparative Example 2-5 |
|---|---|---|---|---|---|---|---|---|
| Blending amount (mass %) | SR368NS | 13 | 15 | 17.5 | 30 | 37.5 | 48.1 | 55 |
|  | VCAP | 2.7 | 3 | 3.5 | 6 | 7.5 | 9.9 | 11 |
|  | Ethanol | 57.3 | 55 | 52 | 37 | 28 | 14 | 7 |
| Ratio (mass %) | $Rmh_2$ | 100 | 100 | 100 | 100 | 100 | 100 | 100 |
|  | $RS_2$ | 17.2 | 16.7 | 16.7 | 16.7 | 16.7 | 16.7 | 16.7 |
|  | $RV_2$ | 466.9 | 394.4 | 323.8 | 147.2 | 97.8 | 51.7 | 34.8 |

Also, the differences ΔR in refractive index between SR368NS as the high Tg polyfunctional monomer (II) and ethanol as the volatile solvent were all 0.088.

Examples 2-25 to 2-27, Comparative Example 2-6

Color inks were prepared in the same manner as in Example 2-1 with the exception of setting the ratios in the total amount of the color ink of SR368NS as the high Tg polyfunctional monomer (II) respectively to the values shown in Table 18 and further blending propoxylated (2) neopentyl glycol diacrylate 〈SARTOMER SR9003NS manufactured by ARKEMA Inc.; difunctional; glass transition temperature Tg: 32° C.〉 as another polyfunctional monomer at the ratios shown in the same Table.

The ratios $Rmh_2$ of the high Tg polyfunctional monomer (II), the ratios $RS_2$ of the monofunctional monomer, and the ratios $RV_2$ of the volatile solvent including the ethanol contained in the pigment dispersion were respectively as shown in Table 18.

TABLE 18

|  |  | Comparative Example 2-6 | Example 2-25 | Example 2-26 | Example 2-27 |
|---|---|---|---|---|---|
| Blending amount (mass %) | SR368NS | 5 | 8 | 13 | 19 |
|  | SR9003NS | 20 | 17 | 12 | 6 |
| Ratio (mass %) | $Rmh_2$ | 20 | 32 | 52 | 76 |
|  | $RS_2$ | 16.7 | 16.7 | 16.7 | 16.7 |
|  | $RV_2$ | 196.7 | 196.7 | 196.7 | 196.7 |

Also, the differences ΔR in refractive index between SR368NS as the high Tg polyfunctional monomer (II) and ethanol as the volatile solvent were all 0.088.

Examples 2-28 to 2-32, Comparative Examples 2-7 and 2-8

Color inks were prepared in the same manner as in Example 2-1 with the exception of setting the ratios in the total amount of the color ink of SR368NS as the high Tg polyfunctional monomer (II) and VCAP as the monofunctional monomer respectively to the values shown in Table 19 and setting the ratios in the total amount of the color ink of ethanol as the volatile solvent to 28 mass %.

The ratios $Rmh_2$ of the high Tg polyfunctional monomer (II), the ratios $RS_2$ of the monofunctional monomer, and the ratios $RV_2$ of the volatile solvent including the ethanol contained in the pigment dispersion were respectively as shown in Table 19.

TABLE 19

|  |  | Comparative Example 2-7 | Example 2-28 | Example 2-29 | Example 2-30 | Example 2-31 | Example 2-32 | Comparative Example 2-8 |
|---|---|---|---|---|---|---|---|---|
| Blending amount (mass %) | SR368NS | 43 | 42.5 | 40 | 28 | 16 | 14 | 12 |
|  | VCAP | 2 | 2.5 | 5 | 17 | 29 | 31 | 33 |
| Ratio (mass %) | $Rmh_2$ | 100 | 100 | 100 | 100 | 100 | 100 | 100 |
|  | $RS_2$ | 4.4 | 5.6 | 11.1 | 37.8 | 64.4 | 68.9 | 73.3 |
|  | $RV_2$ | 97.8 | 97.8 | 97.8 | 97.8 | 97.8 | 97.8 | 97.8 |

Also, the differences ΔR in refractive index between SR368NS as the high Tg polyfunctional monomer (II) and ethanol as the volatile solvent were all 0.088.

Example 2-33

A color ink was prepared in the same manner as in Example 2-1 with the exception of blending, in place of the pigment dispersion B-01, the same amount of a magenta pigment dispersion prepared by the respective components indicated below being blended at the ratios shown in Table 20, stirred, and thereafter dispersed using a beads mill (hereinafter indicated at times as "R-01" as the type of dispersion).

Pigment: C. I. pigment violet 19
Dispersant: DISPERBYK (registered trademark)-145 (solids content: 100%) manufactured by BYK-Chemie Japan K. K.
Dispersion medium: Ethanol

TABLE 20

| Component | Mass % |
|---|---|
| Pigment | 15 |
| Dispersant | 5 |
| Dispersion medium | 80 |

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR368NS as the high Tg polyfunctional monomer (II) and ethanol as the volatile solvent was 0.088.

Example 2-34

A color ink was prepared in the same manner as in Example 2-1 with the exception of blending, in place of the pigment dispersion B-01, the same amount of a yellow pigment dispersion prepared by the respective components indicated below being blended at the ratios shown in Table 21, stirred, and thereafter dispersed using a beads mill (hereinafter indicated at times as "Y-01" as the type of dispersion).

Pigment: C. I. pigment yellow 139
Dispersant: DISPERBYK (registered trademark)-145 (solids content: 100%) manufactured by BYK-Chemie Japan K. K.
Dispersion medium: Ethanol

TABLE 21

| Component | Mass % |
|---|---|
| Pigment | 15 |
| Dispersant | 5 |
| Dispersion medium | 80 |

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 196.7 mass % including the ethanol contained in the pigment dispersion.

Also, the difference ΔR in refractive index between SR368NS as the high Tg polyfunctional monomer (II) and ethanol as the volatile solvent was 0.088.

Comparative Example 2-9

A color ink was prepared in the same manner as in Example 2-1 with the exception of setting the ratio of the pigment dispersion B-01 to 10 mass % in the total amount of the color ink and further blending titanium oxide, which is a white pigment, at a ratio of 10 mass % in the total amount of the color ink.

The ratio $Rmh_2$ of the high Tg polyfunctional monomer (II) in the total amount of the polyfunctional monomer was 100 mass %, the ratio $RS_2$ of the monofunctional monomer in the total amount of the radical polymerizable components was 16.7 mass %, and the ratio $RV_2$ of the volatile solvent with respect to the total amount of the radical polymerizable components was 170.0 mass % including the ethanol contained in the pigment dispersion.

Also, the difference ΔR in refractive index between SR368NS as the high Tg polyfunctional monomer (II) and ethanol as the volatile solvent was 0.088.

<Printing and Exposure Conditions>

Using the color inks prepared in the respective examples and comparative examples described above in an inkjet printer, printing on a surface of a printing object was performed under ordinary temperature (5 to 35° C.), and within 0.15 seconds from printing, the curing reaction was made to occur by exposure using an LED curing lamp. The resolution of printing was set to 600×600 dpi.

<Hiding Property Evaluation>

The hiding property of a character printed using each color ink was determined by the method described above.

That is, under the printing and exposure conditions described above, the color ink was printed on a surface of a hiding chart such that a film thickness after curing would be 3 to 10 μm and after making the curing reaction occur, tristimulus values were measured at five locations each on a white portion and on a black portion of the hiding chart and average tristimulus values $Y_W$ and $Y_B$ were determined.

Then, for each color ink of each color, the contrast ratio $Y_B/Y_W$ was calculated as a percentage from the determined average tristimulus values $Y_W$ and $Y_B$ and the hiding property was evaluated by the following standards.

(Cyan)
∘∘∘: Not less than 75.
∘∘: Not less than 60 but less than 75.
∘: Not less than 50 but less than 60.
Δ: Not less than 45 but less than 50.
x: Less than 45.

(Magenta)
∘∘∘: Not less than 65.
∘∘: Not less than 55 but less than 65.
∘: Not less than 50 but less than 55.
Δ: Not less than 45 but less than 50.
x: Less than 45.

(Yellow)
∘∘∘: Not less than 60.
∘∘: Not less than 55 but less than 60.
∘: Not less than 50 but less than 55.
Δ: Not less than 45 but less than 50.
x: Less than 45.

<Dispersion Stability Evaluation>

Each of the color inks prepared in the respective examples and comparative examples was placed in a sealed container and after leaving to stand in a dark location under an ordinary temperature (5 to 35° C.) environment for one week, its state was checked and the dispersion stability was evaluated by the following standards.

∘: No change from before being left to stand was seen.
x: Sedimentation was seen.

<Abrasion Resistance Evaluation>

A character of approximately 8.5 pt was printed on a surface of a PET film as the printing object under the printing and exposure conditions described above.

Next, after observing the state of the printed character upon rubbing it once with a cotton swab, the state was observed upon further rubbing it once with a cotton swab impregnated with isopropanol (IPA). The abrasion resistance was then evaluated by the following standards.

∘: Even upon rubbing with the cotton swab not impregnated with IPA, chipping of a level making the character illegible was not seen and even upon rubbing with the cotton swab impregnated with IPA, chipping of a level making the character illegible was not seen.

Δ: Although chipping of a level making the character illegible was seen upon rubbing with the cotton swab impregnated with IPA, chipping of a level making the character illegible was not seen upon prior rubbing with the cotton swab not impregnated with IPA.

x: Chipping of a level making the character illegible was seen upon just rubbing with the cotton swab not impregnated with IPA.

<Followability Evaluation>

A barcode was formed on a surface of a PET film of 5 μm thickness as the printing object under the printing and exposure conditions described above.

Next, upon folding the PET film in a direction orthogonal to fine lines of the formed barcode and then spreading it again, the state of the fine lines was observed, reading by a barcode reader was performed, and followability was evaluated by the following standards.

∘: No breaks or chipping were seen in the fine lines and reading by the barcode reader was also possible.

Δ: Although slight breaks or chipping were seen in the fine lines, reading by the barcode reader was possible.

x: Large breaks or chipping were seen in the fine lines and reading by the barcode reader was not possible.

<Discharge Property Evaluation>

Characters were printed successively on a surface of a PET film as the printing object under the printing and exposure conditions described above. The characters printed on the 500th and 1000th printing were observed and the discharge property was evaluated by the following standards.

∘: Even on the 1000th printing, the character was without any blur, etc., and was clearly legible.

Δ: Although the character was without any blur, etc., and was clearly legible on the 500th printing, on the 1000th printing, the character was blurred and illegible.

x: The character was blurred and illegible on the 500th printing.

The results of the above are shown in Table 22 to Table 30.

TABLE 22

| | | | Example 2-1 | Example 2-2 | Example 2-3 | Example 2-4 | Example 2-5 |
|---|---|---|---|---|---|---|---|
| Colorant | Type | | B-01 | B-01 | B-01 | B-01 | B-01 |
| | Mass % | | 20 | 20 | 20 | 20 | 20 |
| Titanium oxide | | | — | — | — | — | — |
| Radical polymerizable components | High Tg polyfunctional monomer | Tg (° C.) | 272 | 103 | 103 | 90 | 62 |
| | | Number of functional groups | 3 | 4 | 3 | 5 | 3 |
| | | Mass % | 25 | 25 | 25 | 25 | 25 |
| | Other polyfunctional monomer | Tg (° C.) | — | — | — | — | — |
| | | Number of functional groups | — | — | — | — | — |
| | | Mass % | — | — | — | — | — |
| | Monofunctional monomer (mass %) | VCAP | 5 | 5 | 5 | 5 | 5 |
| | | EBECRYL 110 | — | — | — | — | — |
| Binder resin (mass %) | Polyamide resin | | — | — | — | — | — |
| | Acrylic resin | | | | | | |
| | Phenol resin | | — | — | — | — | — |

TABLE 22-continued

|  |  | Example 2-1 | Example 2-2 | Example 2-3 | Example 2-4 | Example 2-5 |
|---|---|---|---|---|---|---|
| Volatile solvent (mass %) | Ethanol | 43 | 43 | 43 | 43 | 43 |
|  | 1-butanol | — | — | — | — | — |
|  | Acetone | — | — | — | — | — |
|  | Ethyl acetate | — | — | — | — | — |
|  | Cyclohexanone | — | — | — | — | — |
| Ultrapure water (mass %) |  | — | — | — | — | — |
| Ratios of respective components (mass %) | $Rmh_2$ | 100 | 100 | 100 | 100 | 100 |
|  | $RS_2$ | 16.7 | 16.7 | 16.7 | 16.7 | 16.7 |
|  | $RV_2$ | 196.7 | 196.7 | 196.7 | 196.7 | 196.7 |
| Difference $\Delta R$ in refractive index |  | 0.088 | 0.117 | 0.119 | 0.128 | 0.111 |
| Evaluation | Hiding property | ○○○ | ○○○ | ○○ | ○○ | ○ |
|  | Dispersion stability | ○ | ○ | ○ | ○ | ○ |
|  | Abrasion resistance | ○ | ○ | ○ | ○ | ○ |
|  | Followability | ○ | ○ | ○ | ○ | ○ |
|  | Discharge property | ○ | ○ | ○ | ○ | ○ |

TABLE 23

|  |  |  | Example 2-6 | Example 2-7 | Comparative Example 2-1 | Comparative Example 2-2 | Example 2-8 |
|---|---|---|---|---|---|---|---|
| Colorant | Type |  | B-01 | B-01 | B-01 | B-01 | B-01 |
|  | Mass % |  | 20 | 20 | 20 | 20 | 20 |
| Titanium oxide |  |  | — | — | — | — | — |
| Radical polymerizable components | High Tg polyfunctional monomer | Tg (° C.) | 186 | 43 | — | — | 272 |
|  |  | Number of functional groups | 2 | 2 | — | — | 3 |
|  |  | Mass % | 25 | 25 | — | — | 25 |
|  | Other polyfunctional monomer | Tg (° C.) | — | — | 38 | 32 | — |
|  |  | Number of functional groups | — | — | 3 | 2 | — |
|  |  | Mass % | — | — | 25 | 25 | — |
|  | Monofunctional monomer (mass %) | VCAP | 5 | 5 | 5 | 5 | 5 |
|  |  | EBECRYL 110 | — | — | — | — | — |
| Binder resin (mass %) | Polyamide resin |  | — | — | — | — | — |
|  | Acrylic resin |  | — | — | — | — | — |
|  | Phenol resin |  | — | — | — | — | — |
| Volatile solvent (mass %) | Ethanol |  | 43 | 43 | 43 | 43 | 38 |
|  | 1-butanol |  | — | — | — | — | 5 |
|  | Acetone |  | — | — | — | — | — |
|  | Ethyl acetate |  | — | — | — | — | — |
|  | Cyclohexanone |  | — | — | — | — | — |
| Ultrapure water (mass %) |  |  | — | — | — | — | — |
| Ratios of respective components (mass %) | $Rmh_2$ |  | 100 | 100 | 0 | 0 | 100 |
|  | $RS_2$ |  | 16.7 | 16.7 | 16.7 | 16.7 | 16.7 |
|  | $RV_2$ |  | 196.7 | 196.7 | 196.7 | 196.7 | 196.7 |
| Difference $\Delta R$ in refractive index |  |  | 0.144 | 0.095 | — | — | 0.088 |
| Evaluation | Hiding property |  | Δ | Δ | x | x | ○○○ |
|  | Dispersion stability |  | ○ | ○ | ○ | ○ | ○ |
|  | Abrasion resistance |  | ○ | ○ | ○ | ○ | ○ |
|  | Followability |  | ○ | ○ | ○ | ○ | ○ |
|  | Discharge property |  | ○ | ○ | ○ | ○ | ○ |

TABLE 24

|  |  |  | Example 2-9 | Example 2-10 | Example 2-11 | Example 2-12 | Comparative Example 2-3 |
|---|---|---|---|---|---|---|---|
| Colorant | Type |  | B-01 | B-01 | B-01 | B-01 | B-01 |
|  | Mass % |  | 20 | 20 | 20 | 20 | 20 |
| Titanium oxide |  |  | — | — | — | — | — |
| Radical polymerizable components | High Tg polyfunctional monomer | Tg (° C.) | 272 | 272 | 272 | 272 | 272 |
|  |  | Number of functional groups | 3 | 3 | 3 | 3 | 3 |
|  |  | Mass % | 25 | 25 | 25 | 25 | 25 |
|  | Other polyfunctional monomer | Tg (° C.) | — | — | — | — | — |
|  |  | Number of functional groups |  |  |  |  |  |
|  |  | Mass % | — | — | — | — | — |
|  | Monofunctional monomer (mass %) | VCAP | 5 | 5 | 5 | 5 | 5 |
|  |  | EBECRYL 110 | — | — | — | — | — |
| Binder resin (mass %) | Polyamide resin |  | — | — | — | — | — |
|  | Acrylic resin |  | — | — | — | — | — |
|  | Phenol resin |  | — | — | — | — | — |
| Volatile solvent (mass %) | Ethanol |  | 38 | 38 | 38 | — | — |
|  | 1-butanol |  | — | — | — | — | — |
|  | Acetone |  | 5 | — | — | — | — |
|  | Ethyl acetate |  | — | 5 | — | — | — |
|  | Cyclohexanone |  | — | — | 5 | 43 | — |
| Ultrapure water (mass %) |  |  | — | — | — | — | 43 |
| Ratios of respective components (mass %) | Rmh$_2$ |  | 100 | 100 | 100 | 100 | 100 |
|  | RS$_2$ |  | 16.7 | 16.7 | 16.7 | 16.7 | 16.7 |
|  | RV$_2$ |  | 196.7 | 196.7 | 196.7 | 196.7 | 53.3 |
| Difference ΔR in refractive index |  |  | 0.088 | 0.088 | 0.088 | 0.023 | — |
| Evaluation | Hiding property |  | ○○○ | ○○○ | ○○○ | ○ | x |
|  | Dispersion stability |  | ○ | ○ | ○ | ○ | ○ |
|  | Abrasion resistance |  | ○ | ○ | ○ | ○ | x |
|  | Followability |  | ○ | ○ | ○ | ○ | x |
|  | Discharge property |  | ○ | ○ | ○ | Δ | x |

TABLE 25

|  |  |  | Example 2-13 | Example 2-14 | Example 2-15 | Example 2-16 | Example 2-17 |
|---|---|---|---|---|---|---|---|
| Colorant | Type |  | B-01 | B-01 | B-01 | B-01 | B-01 |
|  | Mass % |  | 20 | 20 | 20 | 20 | 20 |
| Titanium oxide |  |  | — | — | — | — | — |
| Radical polymerizable components | High Tg polyfunctional monomer | Tg (° C.) | 272 | 272 | 272 | 272 | 272 |
|  |  | Number of functional groups | 3 | 3 | 3 | 3 | 3 |
|  |  | Mass % | 25 | 25 | 25 | 25 | 25 |
|  | Other polyfunctional monomer | Tg (° C.) | — | — | — | — | — |
|  |  | Number of functional groups |  |  |  |  |  |
|  |  | Mass % | — | — | — | — | — |
|  | Monofunctional monomer (mass %) | VCAP | — | — | — | — | — |
|  |  | EBECRYL 110 | 5 | 5 | 5 | 5 | 5 |
| Binder resin (mass %) | Polyamide resin |  | 3 | — | — | 1 | 2 |
|  | Acrylic resin |  | — | 3 | — | — | — |
|  | Phenol resin |  | — | — | 3 | — | — |
| Volatile solvent (mass %) | Ethanol |  | 40 | 40 | 40 | 42 | 41 |
|  | 1-butanol |  | — | — | — | — | — |
|  | Acetone |  | — | — | — | — | — |
|  | Ethyl acetate |  | — | — | — | — | — |
|  | Cyclohexanone |  | — | — | — | — | — |
| Ultrapure water (mass %) |  |  | — | — | — | — | — |
| Ratios of respective components (mass %) | Rmh$_2$ |  | 100 | 100 | 100 | 100 | 100 |
|  | RS$_2$ |  | 16.7 | 16.7 | 16.7 | 16.7 | 16.7 |
|  | RV$_2$ |  | 186.7 | 186.7 | 186.7 | 193.3 | 190.0 |

TABLE 25-continued

|  |  | Example 2-13 | Example 2-14 | Example 2-15 | Example 2-16 | Example 2-17 |
|---|---|---|---|---|---|---|
| Difference ΔR in refractive index |  | 0.088 | 0.088 | 0.088 | 0.088 | 0.088 |
| Evaluation | Hiding property | ○○○ | ○○○ | ○○○ | ○○○ | ○○○ |
|  | Dispersion stability | ○ | ○ | ○ | ○ | ○ |
|  | Abrasion resistance | ○ | ○ | ○ | Δ | ○ |
|  | Followability | ○ | ○ | ○ | ○ | ○ |
|  | Discharge property | ○ | ○ | ○ | ○ | ○ |

TABLE 26

|  |  |  | Example 2-18 | Example 2-19 | Comparative Example 2-4 | Example 2-20 | Example 2-21 |
|---|---|---|---|---|---|---|---|
| Colorant | Type |  | B-01 | B-01 | B-01 | B-01 | B-01 |
|  | Mass % |  | 20 | 20 | 20 | 20 | 20 |
| Titanium oxide |  |  | — | — | — | — | — |
| Radical polymerizable components | High Tg polyfunctional monomer | Tg (° C.) | 272 | 272 | 272 | 272 | 272 |
|  |  | Number of functional groups | 3 | 3 | 3 | 3 | 3 |
|  |  | Mass % | 25 | 25 | 13 | 15 | 17.5 |
|  | Other polyfunctional monomer | Tg (° C.) | — | — | — | — | — |
|  |  | Number of functional groups | — | — | — | — | — |
|  |  | Mass % | — | — | — | — | — |
|  | Monofunctional monomer (mass %) | VCAP | — | — | 2.7 | 3 | 3.5 |
|  |  | EBECRYL 110 | 5 | 5 | — | — | — |
| Binder resin (mass %) | Polyamide resin |  | 7 | 10 | — | — | — |
|  | Acrylic resin |  | — | — | — | — | — |
|  | Phenol resin |  | — | — | — | — | — |
| Volatile solvent (mass %) | Ethanol |  | 36 | 33 | 57.3 | 55 | 52 |
|  | 1-butanol |  | — | — | — | — | — |
|  | Acetone |  | — | — | — | — | — |
|  | Ethyl acetate |  | — | — | — | — | — |
|  | Cyclohexanone |  | — | — | — | — | — |
| Ultrapure water (mass %) |  |  | — | — | — | — | — |
| Ratios of respective components (mass %) | $Rmh_2$ |  | 100 | 100 | 100 | 100 | 100 |
|  | $RS_2$ |  | 16.7 | 16.7 | 17.2 | 16.7 | 16.7 |
|  | $RV_2$ |  | 173.3 | 163.3 | 466.9 | 394.4 | 323.8 |
| Difference ΔR in refractive index |  |  | 0.088 | 0.088 | 0.088 | 0.088 | 0.088 |
| Evaluation | Hiding property |  | ○○○ | ○○○ | ○○ | ○○○ | ○○○ |
|  | Dispersion stability |  | ○ | ○ | ○ | ○ | ○ |
|  | Abrasion resistance |  | ○ | ○ | x | Δ | ○ |
|  | Followability |  | ○ | ○ | ○ | ○ | ○ |
|  | Discharge property |  | ○ | Δ | ○ | ○ | ○ |

TABLE 27

|  |  |  | Example 2-22 | Example 2-23 | Example 2-24 | Comparative Example 2-5 |
|---|---|---|---|---|---|---|
| Colorant | Type |  | B-01 | B-01 | B-01 | B-01 |
|  | Mass % |  | 20 | 20 | 20 | 20 |
| Titanium oxide |  |  |  | — | — | — |
| Radical polymerizable components | High Tg polyfunctional monomer | Tg (° C.) | 272 | 272 | 272 | 272 |
|  |  | Number of functional groups | 3 | 3 | 3 | 3 |
|  |  | Mass % | 30 | 37.5 | 48.1 | 55 |

TABLE 27-continued

|  |  |  | Example 2-22 | Example 2-23 | Example 2-24 | Comparative Example 2-5 |
|---|---|---|---|---|---|---|
|  | Other polyfunctional monomer | Tg (° C.) | — | — | — | — |
|  |  | Number of functional groups | — | — | — | — |
|  |  | Mass % | — | — | — | — |
|  | Monofunctional monomer (mass %) | VCAP | 6 | 7.5 | 9.9 | 11 |
|  |  | EBECRYL 110 | — | — | — | — |
| Binder resin (mass %) | Polyamide resin |  | — | — | — | — |
|  | Acrylic resin |  | — | — | — | — |
|  | Phenol resin |  | — | — | — | — |
| Volatile solvent (mass %) | Ethanol |  | 37 | 28 | 14 | 7 |
|  | 1-butanol |  | — | — | — | — |
|  | Acetone |  | — | — | — | — |
|  | Ethyl acetate |  | — | — | — | — |
|  | Cyclohexanone |  | — | — | — | — |
| Ultrapure water (mass %) |  |  | — | — | — | — |
| Ratios of respective components (mass %) | $Rmh_2$ |  | 100 | 100 | 100 | 100 |
|  | $RS_2$ |  | 16.7 | 16.7 | 16.7 | 16.7 |
|  | $RV_2$ |  | 147.2 | 97.8 | 51.7 | 34.8 |
| Difference ΔR in refractive index |  |  | 0.088 | 0.088 | 0.088 | 0.088 |
| Evaluation | Hiding property |  | ○○○ | ○○ | ○○ | x |
|  | Dispersion stability |  | ○ | ○ | ○ | ○ |
|  | Abrasion resistance |  | ○ | ○ | ○ | ○ |
|  | Followability |  | ○ | ○ | ○ | ○ |
|  | Discharge property |  | ○ | ○ | Δ | x |

TABLE 28

|  |  |  | Comparative Example 2-6 | Example 2-25 | Example 2-26 | Example 2-27 |
|---|---|---|---|---|---|---|
| Colorant | Type |  | B-01 | B-01 | B-01 | B-01 |
|  | Mass % |  | 20 | 20 | 20 | 20 |
| Titanium oxide |  |  | — | — | — | — |
| Radical polymerizable components | High Tg polyfunctional monomer | Tg (° C.) | 272 | 272 | 272 | 272 |
|  |  | Number of functional groups | 3 | 3 | 3 | 3 |
|  |  | Mass % | 5 | 8 | 13 | 19 |
|  | Other polyfunctional monomer | Tg (° C.) | 32 | 32 | 32 | 32 |
|  |  | Number of functional groups | 2 | 2 | 2 | 2 |
|  |  | Mass % | 20 | 17 | 12 | 6 |
|  | Monofunctional monomer | VCAP | 5 | 5 | 5 | 5 |
|  |  | EBECRYL 110 | — | — | — | — |
| Binder resin (mass %) | Polyamide resin |  | — | — | — | — |
|  | Acrylic resin |  | — | — | — | — |
|  | Phenol resin |  | — | — | — | — |
| Volatile solvent (mass %) | Ethanol |  | 43 | 43 | 43 | 43 |
|  | 1-butanol |  | — | — | — | — |
|  | Acetone |  | — | — | — | — |
|  | Ethyl acetate |  | — | — | — | — |
|  | Cyclohexanone |  | — | — | — | — |
| Ultrapure water (mass %) |  |  | — | — | — | — |
| Ratios of respective components (mass %) | $Rmh_2$ |  | 20 | 32 | 52 | 76 |
|  | $RS_2$ |  | 16.7 | 16.7 | 16.7 | 16.7 |
|  | $RV_2$ |  | 196.7 | 196.7 | 196.7 | 196.7 |
| Difference ΔR in refractive index |  |  | 0.088 | 0.088 | 0.088 | 0.088 |
| Evaluation | Hiding property |  | x | ○○ | ○○○ | ○○○ |
|  | Dispersion stability |  | ○ | ○ | ○ | ○ |
|  | Abrasion resistance |  | ○ | ○ | ○ | ○ |
|  | Followability |  | ○ | ○ | ○ | ○ |
|  | Discharge property |  | ○ | ○ | ○ | ○ |

TABLE 29

| | | | Comparative Example 2-7 | Example 2-28 | Example 2-29 | Example 2-30 | Example 2-31 |
|---|---|---|---|---|---|---|---|
| Colorant | Type | | B-01 | B-01 | B-01 | B-01 | B-01 |
| | Mass % | | 20 | 20 | 20 | 20 | 20 |
| Titanium oxide | | | — | — | — | — | — |
| Radical polymerizable components | High Tg polyfunctional monomer | Tg (° C.) | 272 | 272 | 272 | 272 | 272 |
| | | Number of functional groups | 3 | 3 | 3 | 3 | 3 |
| | | Mass % | 43 | 42.5 | 40 | 28 | 16 |
| | Other polyfunctional monomer | Tg (° C.) | — | — | — | — | — |
| | | Number of functional groups | — | — | — | — | — |
| | | Mass % | — | — | — | — | — |
| | Monofunctional monomer (mass %) | VCAP | 2 | 2.5 | 5 | 17 | 29 |
| | | EBECRYL 110 | — | — | — | — | — |
| Binder resin (mass %) | Polyamide resin | | — | — | — | — | — |
| | Acrylic resin | | — | — | — | — | — |
| | Phenol resin | | — | — | — | — | — |
| Volatile solvent (mass %) | Ethanol | | 28 | 28 | 28 | 28 | 28 |
| | 1-butanol | | — | — | — | — | — |
| | Acetone | | — | — | — | — | — |
| | Ethyl acetate | | — | — | — | — | — |
| | Cyclohexanone | | — | — | — | — | — |
| Ultrapure water (mass %) | | | — | — | — | — | — |
| Ratios of respective components (mass %) | $Rmh_2$ | | 100 | 100 | 100 | 100 | 100 |
| | $RS_2$ | | 4.4 | 5.6 | 11.1 | 37.8 | 64.4 |
| | $RV_2$ | | 97.8 | 97.8 | 97.8 | 97.8 | 97.8 |
| Difference ΔR in refractive index | | | 0.088 | 0.088 | 0.088 | 0.088 | 0.088 |
| Evaluation | Hiding property | | ◯◯◯ | ◯◯◯ | ◯◯◯ | ◯◯◯ | ◯◯◯ |
| | Dispersion stability | | ◯ | ◯ | ◯ | ◯ | ◯ |
| | Abrasion resistance | | ◯ | ◯ | ◯ | ◯ | ◯ |
| | Followability | | x | Δ | ◯ | ◯ | ◯ |
| | Discharge property | | x | Δ | ◯ | ◯ | ◯ |

TABLE 30

| | | | Example 2-32 | Comparative Example 2-8 | Example 2-33 | Example 2-34 | Comparative Example 2-9 |
|---|---|---|---|---|---|---|---|
| Colorant | Type | | B-01 | B-01 | R-01 | Y-01 | B-01 |
| | Mass % | | 20 | 20 | 20 | 20 | 10 |
| Titanium oxide | | | — | — | — | — | 10 |
| Radical polymerizable components | High Tg polyfunctional monomer | Tg (° C.) | 272 | 272 | 272 | 272 | 272 |
| | | Number of functional groups | 3 | 3 | 3 | 3 | 3 |
| | | Mass % | 14 | 12 | 25 | 25 | 25 |
| | Other polyfunctional monomer | Tg (° C.) | — | — | — | — | — |
| | | Number of functional groups | — | — | — | — | — |
| | | Mass % | — | — | — | — | — |
| | Monofunctional monomer (mass %) | VCAP | 31 | 33 | 5 | 5 | 5 |
| | | EBECRYL 110 | — | — | — | — | — |
| Binder resin (mass %) | Polyamide resin | | — | — | — | — | — |
| | Acrylic resin | | — | — | — | — | — |
| | Phenol resin | | — | — | — | — | — |
| Volatile solvent (mass %) | Ethanol | | 28 | 28 | 43 | 43 | 43 |
| | 1-butanol | | — | — | — | — | — |
| | Acetone | | — | — | — | — | — |
| | Ethyl acetate | | — | — | — | — | — |
| | Cyclohexanone | | — | — | — | — | — |
| Ultrapure water (mass %) | | | — | — | — | — | — |
| Ratios of respective components (mass %) | $Rmh_2$ | | 100 | 100 | 100 | 100 | 100 |
| | $RS_2$ | | 68.9 | 73.3 | 16.7 | 16.7 | 16.7 |
| | $RV_2$ | | 97.8 | 97.8 | 196.7 | 196.7 | 170.0 |

TABLE 30-continued

|  |  | Example 2-32 | Comparative Example 2-8 | Example 2-33 | Example 2-34 | Comparative Example 2-9 |
|---|---|---|---|---|---|---|
| Difference ΔR in refractive index | | 0.088 | 0.088 | 0.088 | 0.088 | 0.088 |
| Evaluation | Hiding property | ○○○ | ○○○ | ○○○ | ○○○ | ○○ |
|  | Dispersion stability | ○ | ○ | ○ | ○ | x |
|  | Abrasion resistance | Δ | x | ○ | ○ | ○ |
|  | Followability | ○ | ○ | ○ | ○ | ○ |
|  | Discharge property | ○ | ○ | ○ | ○ | x |

From the results of Examples 2-1 to 2-34 and Comparative Examples 2-1, 2-2, and 2-9 in Table 22 to Table 30, it was found that
 a colorant, radical polymerizable components, a volatile solvent, and a photo-radical polymerization initiator must be contained and
 must contain, as the radical polymerizable components among these, a difunctional or higher polyfunctional monomer and a monofunctional monomer and the polyfunctional monomer must include the high Tg polyfunctional monomer (II) with the glass transition temperature Tg of not less than 40° C., and
 by these arrangements, printing with a color tone such as cyan, magenta, yellow, etc., and yet with sufficient hiding property is possible even if a white pigment of high hiding power such as titanium oxide, etc., is not contained.

Also, especially from the results of Examples 2-1 and 2-25 to 2-27 and Comparative Example 2-6, it was found that the ratio $Rmh_2$ of the high Tg polyfunctional monomer (II) in the total amount of the polyfunctional monomer must be not less than 30 mass % and is especially preferably not less than 50 mass %.

From the results of Examples 2-1 and 2-28 to 2-31 and Comparative Examples 2-7 and 2-8, it was found that the ratio $RS_2$ of the monofunctional monomer in the total amount of the radical polymerizable components must be not less than 5 mass % and not more than 70 mass %, is especially preferably not less than 10 mass %, and is preferably not more than 65 mass %.

From the results of Examples 2-1 and 2-20 to 2-24 and Comparative Examples 2-4 and 2-5, it was found that the ratio $RV_2$ of the volatile solvent with respect to the total amount of the radical polymerizable components must be not less than 50 mass % and not more than 400 mass %, is more preferably not less than 70 mass %, is especially preferably not less than 130 mass %, and is preferably not more than 370 mass %.

From the results of Examples 2-1 to 2-7, it was found that as the high Tg polyfunctional monomer (II),
 it is preferable to selectively use a compound that is trifunctional or higher and more preferably a compound that is trifunctional or higher and has a glass transition temperature Tg of not less than 90° C. and
 especially, it is even more preferable to selectively use a compound, that is trifunctional or higher and has a glass transition temperature Tg of not less than 200° C. and not more than 300° C. or a compound that is tetrafunctional or higher and has a glass transition temperature Tg of not less than 100° C. but less than 200° C.

From the results of Examples 2-1 and 2-8 to 2-12, it was found that as the volatile solvent,
 an alcohol with 1 to 3 carbon atoms may be used alone or an alcohol with 1 to 3 carbon atoms may be used in combination with an alcohol with 4 carbon atoms or more, a ketone, an ester, or an ether as another volatile solvent and
 in the case of combined use, the ratio of the other volatile solvent is preferably not more than 10 mass % in the total amount of the volatile solvents.

Also, from the results of Examples 2-1 and 2-8 to 2-12, it was found that as the volatile solvent, it is preferable to selectively use a volatile solvent with which the difference ΔR in refractive index with respect to the high Tg polyfunctional monomer (II) is not less than ±0.03.

From the results of Examples 2-1 and 2-13 to 2-15, it was found that it is preferable for the color ink to contain vinylcaprolactam as the monofunctional monomer and/or to contain a binder resin.

Also, from the results of Examples 2-13 to 2-15, it was found that a polyamide resin, an acrylic resin, a phenol resin, etc., is usable as the binder resin.

Further, from the results of Examples 2-16 to 2-19, it was found that the ratio of a polyamide resin or other binder resin is preferably not less than 1 mass %, especially preferably not less than 1.5 mass %, preferably not more than 10 mass %, and especially preferably not more than 8 mass % in the total amount of the color ink.

<<Hiding Layer Coating Agents>>

Example 3-1

The respective components indicated below were blended at the ratios shown in Table 31 and after stirring until sufficiently dissolved, filtration using a 5 μm membrane filter was performed to prepare a hiding layer coating agent.

(Radical Polymerizable Components)

High Tg polyfunctional monomer (II): tris(2-hydroxyethyl) isocyanate triacrylate ⟨SARTOMER SR368NS manufactured by ARKEMA Inc.; trifunctional; glass transition temperature Tg: 272° C.; refractive index: 1.449⟩

Monofunctional monomer: N-vinyl-ε-caprolactam (VCAP)

Volatile Solvent

Ethanol ⟨Refractive index: 1.361⟩

Photo-radical Polymerization Initiator 2,4,6-trimethylbenzoyldiphenylphosphine oxide ⟨SpeedCure (registered trademark) TPO manufactured by Lambson Japan Co., Ltd.⟩

Other Components

Sensitizer: 2-isopropylthioxanthone ⟨SpeedCure 2-ITX manufactured by Lambson Japan Co., Ltd.⟩

Radical polymerization inhibitor: Florstab UV-5 manufactured by Kromachem Ltd.

Surfactant: silicone acrylate based surfactant

TABLE 31

| Component | | Mass % |
|---|---|---|
| High Tg polyfunctional monomer (II) | SR368NS | 15 |
| Monofunctional monomer | VCAP | 15 |
| Volatile solvent | Ethanol | 63 |
| Photo-radical polymerization initiator | TPO | 5.5 |
| Sensitizer | 2-ITX | 0.3 |
| Radical polymerization inhibitor | UV-5 | 1 |
| Surfactant | Silicone acrylate based | 0.2 |
| Total amount | | 100 |

The ratio $Rmh_3$ of the high Tg polyfunctional monomer (II) in the total amount of the polyfunctional monomer was 100 mass %, the ratio $RS_3$ of the monofunctional monomer in the total amount of the radical polymerizable components was 50 mass %, and the ratio $RV_3$ of the volatile solvent with respect to the total amount of the radical polymerizable components was 210 mass %.

Also, the difference $\Delta R$ in refractive index between SR368NS as the high Tg polyfunctional monomer (II) and ethanol as the volatile solvent was 0.088.

Example 3-2

A hiding layer coating agent was prepared in the same manner as in Example 3-1 with the exception of blending, in place of SR368NS, the same amount of pentaerythritol tetraacrylate 〈SARTOMER SR295NS manufactured by ARKEMA Inc.; tetrafunctional; glass transition temperature Tg: 103° C.; refractive index: 1.478〉 as the high Tg polyfunctional monomer (II).

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR295NS as the high Tg polyfunctional monomer (II) and ethanol as the volatile solvent was 0.117.

Example 3-3

A hiding layer coating agent was prepared in the same manner as in Example 3-1 with the exception of blending, in place of SR368NS, the same amount of pentaerythritol t 〈triacrylate 〈SARTOMER SR444NS manufactured by ARKEMA Inc.; trifunctional; glass transition temperature Tg: 103° C.; refractive index: 1.480〉 as the high Tg polyfunctional monomer (II).

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR444NS as the high Tg polyfunctional monomer (II) and ethanol as the volatile solvent was 0.119.

Example 3-4

A hiding layer coating agent was prepared in the same manner as in Example 3-1 with the exception of blending, in place of SR368NS, the same amount of dipentaerythritol pentaacrylate 〈SARTOMER SR399NS manufactured by ARKEMA Inc.; pentafunctional; glass transition temperature Tg: 90° C.; refractive index: 1.489〉 as the high Tg polyfunctional monomer (II).

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR399NS as the high Tg polyfunctional monomer (II) and ethanol as the volatile solvent was 0.128.

Example 3-5

A hiding layer coating agent was prepared in the same manner as in Example 3-1 with the exception of blending, in place of SR368NS, the same amount of trimethylolpropane triacrylate 〈SARTOMER SR351NS manufactured by ARKEMA Inc.; trifunctional; glass transition temperature Tg: 62° C.; refractive index: 1.472〉 as the high Tg polyfunctional monomer (II).

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR351NS as the high Tg polyfunctional monomer (II) and ethanol as the volatile solvent was 0.111.

Example 3-6

A hiding layer coating agent was prepared in the same manner as in Example 3-1 with the exception of blending, in place of SR368NS, the same amount of tricyclodecane dimethanoldiacrylate 〈SARTOMER SR833NS manufactured by ARKEMA Inc.; difunctional; glass transition temperature Tg: 186° C.; refractive index: 1.505〉 a as the high Tg polyfunctional monomer (II).

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR833NS as the high Tg polyfunctional monomer (II) and ethanol as the volatile solvent was 0.144.

Example 3-7

(Preparation of Cyan Pigment Dispersion)
The respective components indicated below were blended at the ratios shown in Table 32, stirred, and thereafter dispersed using a beads mill to prepare a cyan pigment dispersion (hereinafter indicated at times as "B-01" as the type of dispersion).

Pigment: C. I. pigment blue 15:4
Dispersant: DISPERBYK (registered trademark)-145 (solids content: 100%) manufactured by BYK-Chemie Japan K. K.
Dispersion medium: Ethanol

TABLE 32

| Component | Mass % |
| --- | --- |
| Pigment | 15 |
| Dispersant | 5 |
| Dispersion medium | 80 |

(Preparation of Hiding Layer Coating Agent)

The respective components indicated below were blended at the ratios shown in Table 33 and stirred until sufficiently dissolved, and then after adding the priorly prepared pigment dispersion B-01 at the ratio shown in Table 33 and stirring further, filtration using a 5 μm membrane filter was performed to prepare a hiding layer coating agent.

Radical Polymerizable Components

High Tg polyfunctional monomer (II): 1,6-hexanediol diacrylate ⟨SARTOMER SR238NS manufactured by ARKEMA Inc.; difunctional; glass transition temperature Tg: 43° C.; refractive index: 1.456⟩

Monofunctional monomer: the aforementioned VCAP

Volatile Solvent

Ethanol ⟨Refractive index: 1.361⟩

Photo-radical Polymerization Initiator the aforementioned TPO

Other Components

Sensitizer: the aforementioned 2-ITX

Radical polymerization inhibitor: the aforementioned UV-5

Surfactant: the aforementioned silicone acrylate based surfactant

TABLE 33

| Component | | Mass % |
| --- | --- | --- |
| Pigment dispersion | B-01 | 20 |
| High Tg polyfunctional monomer (II) | SR238NS | 15 |
| Monofunctional monomer | VCAP | 15 |
| Volatile solvent | Ethanol | 43 |
| Photo-radical polymerization initiator | TPO | 5.5 |
| Sensitizer | 2-ITX | 0.3 |
| Radical polymerization inhibitor | UV-5 | 1 |
| Surfactant | Silicone acrylate based | 0.2 |
| Total amount | | 100 |

The ratio $Rmh_3$ of the high Tg polyfunctional monomer (II) in the total amount of the polyfunctional monomer was 100 mass %, the ratio $RS_3$ of the monofunctional monomer in the total amount of the radical polymerizable components was 50 mass %, and the ratio $RV_3$ of the volatile solvent with respect to the total amount of the radical polymerizable components was 196.7 mass % including the ethanol contained in the pigment dispersion.

Also, the difference ΔR in refractive index between SR238NS as the high Tg polyfunctional monomer (II) and ethanol as the volatile solvent was 0.095.

Comparative Example 3-1

A hiding layer coating agent was prepared in the same manner as in Example 3-7 with the exception of blending, in place of SR238NS as the high Tg polyfunctional monomer (II), the same amount of ethoxylated (20) trimethylolpropane triacrylate ⟨SARTOMER SR415 manufactured by ARKEMA Inc.; trifunctional; glass transition temperature Tg: 38° C.⟩.

The ratio $Rmh_3$ of the high Tg polyfunctional monomer (II) in the total amount of the polyfunctional monomer was 0 mass %, the ratio $RS_3$ of the monofunctional monomer in the total amount of the radical polymerizable components was 50 mass %, and the ratio $RV_3$ of the volatile solvent with respect to the total amount of the radical polymerizable components was 196.7 mass % including the ethanol contained in the pigment dispersion.

Comparative Example 3-2

A hiding layer coating agent was prepared in the same manner as in Example 3-7 with the exception of blending, in place of SR238NS as the high Tg polyfunctional monomer (II), the same amount of propoxylated (2) neopentyl glycol diacrylate ⟨SARTOMER SR9003NS manufactured by ARKEMA Inc.; difunctional; glass transition temperature Tg: 32° C.⟩.

The ratio $Rmh_3$ of the high Tg polyfunctional monomer (II) in the total amount of the polyfunctional monomer was 0 mass %, the ratio $RS_3$ of the monofunctional monomer in the total amount of the radical polymerizable components was 50 mass %, and the ratio $RV_3$ of the volatile solvent with respect to the total amount of the radical polymerizable components was 196.7 mass % including the ethanol contained in the pigment dispersion.

Example 3-8

A hiding layer coating agent was prepared in the same manner as in Example 3-1 with the exception of setting a ratio of ethanol as a volatile solvent to 58 mass % in the total amount of the hiding layer coating agent and further blending 1-butano ⟨refractive index: 1.399⟩ at a ratio of 5 mass % in the total amount of the hiding layer coating agent.

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference ΔR in refractive index between SR368NS as the high Tg polyfunctional monomer (II) and ethanol as the main solvent in the volatile solvents was 0.088.

Example 3-9

A hiding layer coating agent was prepared in the same manner as in Example 3-1 with the exception of setting the ratio of ethanol as a volatile solvent to 58 mass % in the total amount of the hiding layer coating agent and further blending acetone ⟨refractive index: 1.359⟩ at a ratio of 5 mass % in the total amount of the hiding layer coating agent.

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR368NS as the high Tg polyfunctional monomer (II) and ethanol as the main solvent in the volatile solvents was 0.088.

Example 3-10

A hiding layer coating agent was prepared in the same manner as in Example 3-1 with the exception of setting the ratio of ethanol as a volatile solvent to 58 mass % in the total amount of the hiding layer coating agent and further blending ethyl acetate ⟨refractive index: 1.372⟩ at a ratio of 5 mass % in the total amount of the hiding layer coating agent.

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR368NS as the high Tg polyfunctional monomer (II) and ethanol as the main solvent in the volatile solvents was 0.088.

Example 3-11

A hiding layer coating agent was prepared in the same manner as in Example 3-1 with the exception of setting the ratio of ethanol as a volatile solvent to 58 mass % in the total amount of the hiding layer coating agent and further blending cyclohexanone ⟨refractive index: 1.426⟩ at a ratio of 5 mass % in the total amount of the hiding layer coating agent.

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR368NS as the high Tg polyfunctional monomer (II) and ethanol as the main solvent in the volatile solvents was 0.088.

Example 3-12

A hiding layer coating agent was prepared in the same manner as in Example 3-1 with the exception of blending, in place of ethanol, the same amount of cyclohexanone ⟨refractive index: 1.426⟩ as the volatile solvent.

The ratio $Rmh_3$ of the high Tg polyfunctional monomer (II) was 100 mass % in the total amount of the polyfunctional monomer, the ratio $RS_3$ of the monofunctional monomer was 50 mass % in the total amount of the radical polymerizable components, and the ratio $RV_3$ of the volatile solvent was 210 mass % with respect to the total amount of the radical polymerizable components.

Also, the difference $\Delta R$ in refractive index between SR368NS as the high Tg polyfunctional monomer (II) and cyclohexanone as the volatile solvent was 0.023.

Example 3-13

A hiding layer coating agent was prepared in the same manner as in Example 3-1 with the exception of blending a polyamide resin ⟨Versamid 725 manufactured by BASF Japan Ltd.⟩ as a binder resin at a ratio of 3 mass % in the total amount of the hiding layer coating agent, blending, in place of VCAP, the same amount of ethoxylated phenyl acrylate ⟨EBECRYL (registered trademark) 110 manufactured by Daicel-Allnex Ltd.; EQ 2 mol⟩ as the monofunctional monomer, and setting the ratio of ethanol as the volatile solvent to 60 mass % in the total amount of the hiding layer coating agent.

The ratio $Rmh_3$ of the high Tg polyfunctional monomer (II) in the total amount of the polyfunctional monomer was 100 mass %, the ratio $RS_3$ of the monofunctional monomer in the total amount of the radical polymerizable components was 50 mass %, and the ratio $RV_3$ of the volatile solvent with respect to the total amount of the radical polymerizable components was 200 mass %.

Also, the difference $\Delta R$ in refractive index between SR368NS as the high Tg polyfunctional monomer (II) and ethanol as the volatile solvent was 0.088.

Example 3-14

A hiding layer coating agent was prepared in the same manner as in Example 3-13 with the exception of blending, in place of the polyamide resin, the same amount of an acrylic resin ⟨NeoCryl B-813 manufactured by DSM Co., Ltd.⟩ as the binder resin.

The ratio $Rmh_3$ of the high Tg polyfunctional monomer (II) in the total amount of the polyfunctional monomer was 100 mass %, the ratio $RS_3$ of the monofunctional monomer in the total amount of the radical polymerizable components was 50 mass %, and the ratio $RV_3$ of the volatile solvent with respect to the total amount of the radical polymerizable components was 200 mass %.

Also, the difference $\Delta R$ in refractive index between SR368NS as the high Tg polyfunctional monomer (II) and ethanol as the volatile solvent was 0.088.

Example 3-15

A hiding layer coating agent was prepared in the same manner as in Example 3-13 with the exception of blending, in place of the polyamide resin, the same amount of a phenol resin ⟨PHENOLITE TD-2106 manufactured by DIC Corp.⟩ as the binder resin.

The ratio $Rmh_3$ of the high Tg polyfunctional monomer (II) in the total amount of the polyfunctional monomer was 100 mass %, the ratio $RS_3$ of the monofunctional monomer in the total amount of the radical polymerizable components was 50 mass %, and the ratio $RV_3$ of the volatile solvent with respect to the total amount of the radical polymerizable components was 200 mass %.

Also, the difference ΔR in refractive index between SR368NS as the high Tg polyfunctional monomer (II) and ethanol as the volatile solvent was 0.088.

Examples 3-16 to 3-20, Comparative Examples 3-3 and 3-4

Hiding layer coating agents were prepared in the same manner as in Example 3-1 with the exception of setting the ratios in the total amount of the hiding layer coating agent of SR368NS as the high Tg polyfunctional monomer (II), VCAP as the monofunctional monomer, and ethanol as the volatile solvent respectively to the values shown in Table 34.

The ratios $Rmh_3$ of the high Tg polyfunctional monomer (II), the ratios $RS_3$ of the monofunctional monomer, and the ratios $RV_3$ of the volatile solvent with respect to the total amount of the radical polymerizable components were respectively as shown in Table 34.

TABLE 34

|  |  | Comparative Example 3-3 | Example 3-16 | Example 3-17 | Example 3-18 | Example 3-19 | Example 3-20 | Comparative Example 3-4 |
|---|---|---|---|---|---|---|---|---|
| Blending amount (mass %) | SR368NS | 32 | 30 | 25 | 20 | 11 | 9.5 | 8.5 |
|  | VCAP | 32 | 30 | 25 | 20 | 11 | 9.5 | 8.5 |
|  | Ethanol | 29 | 33 | 43 | 53 | 71 | 74 | 76 |
| Ratio (mass %) | $Rmh_3$ | 100 | 100 | 100 | 100 | 100 | 100 | 100 |
|  | $RS_3$ | 50 | 50 | 50 | 50 | 50 | 50 | 50 |
|  | $RV_3$ | 45.3 | 55 | 86 | 132.5 | 322.7 | 389.5 | 447.1 |

Also, the differences ΔR in refractive index between SR368NS as the high Tg polyfunctional monomer (II) and ethanol as the volatile solvent were all 0.088.

Examples 3-21 to 3-24, Comparative Example 3-5

Hiding layer coating agents were prepared in the same manner as in Example 3-1 with the exception of blending the same pigment dispersion B-01 as prepared in Example 3-7 at ratios of 20 mass % in the total amount of the hiding layer coating agent, setting the ratios in the total amount of the hiding layer coating agent of SR368NS as the high Tg polyfunctional monomer (II) respectively to the values shown in Table 35, further blending propoxylated (2) neopentylglycol diacrylate ⟨SARTOMER SR9003NS manufactured by ARKEMA Inc.; difunctional; glass transition temperature Tg: 32° C.⟩ as another polyfunctional monomer at the ratios shown in the same Table, and setting the ratios in the total amount of the hiding layer coating agent of VCAP as the monofunctional monomer to 5 mass % and ethanol as the volatile solvent to 43 mass %.

The ratios $Rmh_3$ of the high Tg polyfunctional monomer (II), the ratios $RS_3$ of the monofunctional monomer, and the ratios $RV_3$ of the volatile solvent including the ethanol contained in the pigment dispersion were respectively as shown in Table 35.

TABLE 35

|  |  | Comparative Example 3-5 | Example 3-21 | Example 3-22 | Example 3-23 | Example 3-24 |
|---|---|---|---|---|---|---|
| Blending amount (mass %) | SR368NS | 7 | 9 | 13 | 19 | 25 |
|  | SR9003NS | 18 | 16 | 12 | 6 | — |
| Ratio (mass %) | $Rmh_3$ | 28 | 36 | 52 | 76 | 100 |
|  | $RS_3$ | 16.7 | 16.7 | 16.7 | 16.7 | 16.7 |
|  | $RV_3$ | 196.7 | 196.7 | 196.7 | 196.7 | 196.7 |

Also, the differences ΔR in refractive index between SR368NS as the high Tg polyfunctional monomer (II) and ethanol as the volatile solvent were all 0.088.

Examples 3-25 to 3-28, Comparative Examples 3-6 and 3-7

Hiding layer coating agents were prepared in the same manner as in Example 3-24 with the exception of setting the ratios in the total amount of the hiding layer coating agent of SR368NS as the high Tg polyfunctional monomer (II) and VCAP as the monofunctional monomer respectively to the values shown in Table 36 and setting the ratios in the total amount of the hiding layer coating agent of ethanol as the volatile solvent to 28 mass %.

The ratios $Rmh_3$ of the high Tg polyfunctional monomer (II), the ratios $RS_3$ of the monofunctional monomer, and the ratios $RV_3$ of the volatile solvent including the ethanol contained in the pigment dispersion were respectively as shown in Table 36.

TABLE 36

| | | Comparative Example 3-6 | Example 3-25 | Example 3-26 | Example 3-27 | Example 3-28 | Comparative Example 3-7 |
|---|---|---|---|---|---|---|---|
| Blending amount (mass %) | SR368NS | 43 | 42.5 | 40 | 16 | 14 | 12 |
| | VCAP | 2 | 2.5 | 5 | 29 | 31 | 33 |
| Ratio (mass %) | $Rmh_3$ | 100 | 100 | 100 | 100 | 100 | 100 |
| | $RS_3$ | 4.4 | 5.6 | 11.1 | 64.4 | 68.9 | 73.3 |
| | $RV_3$ | 97.8 | 97.8 | 97.8 | 97.8 | 97.8 | 97.8 |

Also, the differences ΔR in refractive index between SR368NS as the high Tg polyfunctional monomer (II) and ethanol as the volatile solvent were all 0.088.

Example 3-29

A hiding layer coating agent was prepared in the same manner as in Example 3-24 with the exception of blending, in place of the pigment dispersion B-01, the same amount of a magenta pigment dispersion prepared by the respective components indicated below being blended at the ratios shown in Table 37, stirred, and thereafter dispersed using a beads mill (hereinafter indicated at times as "R-01" as the type of dispersion).

Pigment: C. I. pigment violet 19
Dispersant: DISPERBYK (registered trademark)-145 (solids content: 100%) manufactured by BYK-Chemie Japan K. K.
Dispersion medium: Ethanol

TABLE 37

| Component | Mass % |
|---|---|
| Pigment | 15 |
| Dispersant | 5 |
| Dispersion medium | 80 |

The ratio $Rmh_3$ of the high Tg polyfunctional monomer (II) in the total amount of the polyfunctional monomer was 100 mass %, the ratio $RS_3$ of the monofunctional monomer in the total amount of the radical polymerizable components was 16.7 mass %, and the ratio $RV_3$ of the volatile solvent with respect to the total amount of the radical polymerizable components was 196.7 mass % including the ethanol contained in the pigment dispersion.

Also, the difference ΔR in refractive index between SR368NS as the high Tg polyfunctional monomer (II) and ethanol as the volatile solvent was 0.088.

<<Manufacture of Recording Sheet>>

Recording sheets were manufactured using the hiding layer coating agents prepared in the respective examples and comparative examples in an inkjet printer to perform printing on one surface of a base sheet under an ordinary temperature (5 to 35° C.) environment and making the curing reaction occur by exposure using an LED curing lamp within 0.15 seconds from printing.

Transparent PE films of 3 μm thickness were used as the base sheets and the resolution of printing was set to 300×600 dpi.

Also, a recording sheet manufactured by coating the hiding layer coating agent prepared in Example 3-1 on one surface of the same base sheet by a bar coating method and making the curing reaction occur by exposure using an LED curing lamp within 0.15 seconds from printing was deemed to be Example 3-30.

A thickness of coating of the hiding layer coating agent by the bar coating method was set to 10 μm.

<Hiding Property Evaluation>

(Noncolored)

The hiding property of a hiding layer constituted of a hiding layer coating agent that is not colored was evaluated based on a measurement result of the whiteness (L value) described above. The evaluation standards are given below again.

∘∘∘: The L value was not less than 70.
∘∘: The L value was not less than 60 but less than 70.
∘: The L value was not less than 50 but less than 60.
Δ: The L value was not less than 40 but less than 50.
×: The L value was less than 40.

Also, the hiding property of a hiding layer constituted of a hiding layer coating agent that is colored was evaluated from a measurement result of the hiding property described above, according to the hiding layer of each color, and by the following standards.

(Cyan)
∘∘∘: Not less than 75.
∘∘: Not less than 60 but less than 75.
∘: Not less than 50 but less than 60.
Δ: Not less than 45 but less than 50.
×: Less than 45.
(Magenta)
∘∘∘: Not less than 65.
∘∘: Not less than 55 but less than 65.
∘: Not less than 50 but less than 55.
Δ: Not less than 45 but less than 50.
×: Less than 45.

<Abrasion Resistance Evaluation>

The state of a surface of the hiding layer of each recording sheet manufactured was observed upon rubbing it three times with a cotton swab and the abrasion resistance was evaluated by the following standards.

○: The hiding layer was not removed at all.
Δ: The hiding layer was removed slightly.
×: The hiding layer was removed across a wide area.

<Followability Evaluation>

A barcode was formed as a model of the hiding layer on a surface of a PET film of 5 μm thickness under the same conditions as in the manufacture of the recording sheets.

Next, upon folding the PET film in a direction orthogonal to fine lines of the formed barcode and then spreading it again, the state of the fine lines was observed, reading by a barcode reader was performed, and followability was evaluated by the following standards.

○: No breaks or chipping were seen in the fine lines and reading by the barcode reader was also possible.
Δ: Although slight breaks or chipping were seen in the fine lines, reading by the barcode reader was possible.
×: Large breaks or chipping were seen in the fine lines and reading by the barcode reader was not possible.

<<Image Recording Ink>>

<Ink i (Photocuring Clear Ink)>

After blending the respective components indicated below at the ratios shown in Table 38 and stirring until sufficiently dissolved, filtration using a 5 μm membrane filter was performed to prepare an ink i.

(Radical Polymerizable Components)

Polyfunctional monomer: propoxylated (2) neopentyl glycol diacrylate (SARTOMER SR9003NS manufactured by ARKEMA Inc.; difunctional; glass transition temperature Tg: 32° C.)

Monofunctional monomer: the aforementioned VCAP
Volatile Solvent
Ethanol
Photo-radical Polymerization Initiator
the aforementioned TPO
Other Components
Sensitizer: the aforementioned 2-ITX
Radical polymerization inhibitor: the aforementioned UV-5
Surfactant: the aforementioned silicone acrylate based surfactant

TABLE 38

| Component | | Mass % |
|---|---|---|
| Polyfunctional monomer | SR9003NS | 15 |
| Monofunctional monomer | VCAP | 15 |
| Volatile solvent | Ethanol | 63 |
| Photo-radical polymerization initiator | TPO | 5.4 |
| Sensitizer | 2-ITX | 0.8 |
| Radical polymerization inhibitor | UV-5 | 0.5 |
| Surfactant | Silicone acrylate based | 0.3 |
| Total amount | | 100 |

The ratio $Rmh_4$ of the high Tg polyfunctional monomer (II) in the total amount of the polyfunctional monomer was 0 mass %, the ratio $RS_4$ of the monofunctional monomer in the total amount of the radical polymerizable components was 50 mass %, and the ratio $RV_4$ of the volatile solvent with respect to the total amount of the radical polymerizable components was 210 mass %.

<<Manufacture and Evaluation of Recorded Products (Part 1)>>

<Manufacture of Recorded Products>

Using the ink i that is the photocuring clear ink in an inkjet printer, a noncolored image was recorded on each of the hiding layers constituted of the hiding layer coating agents of the respective examples and comparative examples on the priorly manufactured recording sheets. The resolution of recording was set to 600×600 dpi.

The ink i was then made to undergo the curing reaction by exposure using an LED curing lamp to manufacture the recorded products.

<Fastness (Waterproofness) Evaluation>

After immersing an entirety of each recorded product in water for 1 minute and then drying, the image was observed and fastness was evaluated by the following standards.

○: No change was seen in the image.
Δ: Transparency of the image decreased slightly.
×: Transparency of the image was damaged greatly.

<Transparency Evaluation of Image>

Transmission density of light of a region in which the image of each manufactured recorded product was recorded was measured using a transmission densitometer (Macbeth TD904 manufactured by GretagMacbeth Co.) and a visual filter and the transparency of the image was evaluated according to the hiding layer of each color and by the following standards.

(Noncolored)
○: Transmission density was less than 0.15.
Δ: Transmission density was not less than 0.15 but less than 0.25.
×: Transmission density was not less than 0.25.

(Cyan)
○: Transmission density was less than 0.35.
Δ: Transmission density was not less than 0.35 but less than 0.45.
×: Transmission density was not less than 0.45.

(Magenta)
○: Transmission density was less than 1.1.
Δ: Transmission density was not less than 1.1 but less than 1.2.
×: Transmission density was not less than 1.2.

The results of the above are shown in Table 39 to Table 49. Here, in each table, the symbols in the column of the coating method of the hiding layer coating agent are as follows.

IJ: inkjet printing method
BC: bar coating method

TABLE 39

| | | | | Example 3-1 | Example 3-2 | Example 3-3 | Example 3-4 | Example 3-5 |
|---|---|---|---|---|---|---|---|---|
| Hiding layer coating agent | Colorant | Type | | — | — | — | — | — |
| | | Mass % | | — | — | — | — | — |
| | Radical polymerizable components | High Tg polyfunctional monomer (II) | Tg (° C.) | 272 | 103 | 103 | 90 | 62 |
| | | | Number of functional groups | 3 | 4 | 3 | 5 | 3 |
| | | | Mass % | 15 | 15 | 15 | 15 | 15 |

TABLE 39-continued

|  |  |  |  | Example 3-1 | Example 3-2 | Example 3-3 | Example 3-4 | Example 3-5 |
|---|---|---|---|---|---|---|---|---|
|  |  | Other polyfunctional monomer | Tg (° C.) | — | — | — | — | — |
|  |  |  | Number of functional groups | — | — | — | — | — |
|  |  |  | Mass % | — | — | — | — | — |
|  |  | Monofunctional monomer (mass %) | VCAP | 15 | 15 | 15 | 15 | 15 |
|  |  |  | EBECRYL 110 | — | — | — | — | — |
|  | Binder resin (mass %) | Polyamide resin |  | — | — | — | — | — |
|  |  | Acrylic resin |  | — | — | — | — | — |
|  |  | Phenol resin |  | — | — | — | — | — |
|  | Volatile solvent (mass %) | Ethanol |  | 63 | 63 | 63 | 63 | 63 |
|  |  | 1-butanol |  | — | — | — | — | — |
|  |  | Acetone |  | — | — | — | — | — |
|  |  | Ethyl acetate |  | — | — | — | — | — |
|  |  | Cyclohexanone |  | — | — | — | — | — |
|  | Ratios of respective components (mass %) | $Rmh_3$ |  | 100 | 100 | 100 | 100 | 100 |
|  |  | $RS_3$ |  | 50 | 50 | 50 | 50 | 50 |
|  |  | $RV_3$ |  | 210 | 210 | 210 | 210 | 210 |
|  | Difference $\Delta R$ in refractive index |  |  | 0.088 | 0.117 | 0.119 | 0.128 | 0.111 |
|  | Coating method |  |  | IJ | IJ | IJ | IJ | IJ |
| Evaluation | Hiding layer | Hiding property |  | ○○○ | ○○○ | ○○ | ○○ | ○ |
|  |  | Abrasion resistance |  | ○ | ○ | ○ | ○ | ○ |
|  |  | Followability |  | ○ | ○ | ○ | ○ | ○ |
|  | Image | Fastness |  | ○ | ○ | ○ | ○ | ○ |
|  |  | Transparency |  | ○ | ○ | ○ | ○ | ○ |

TABLE 40

|  |  |  |  | Example 3-6 | Example 3-7 | Comparative Example 3-1 | Comparative Example 3-2 | Example 3-8 |
|---|---|---|---|---|---|---|---|---|
| Hiding layer coating agent | Colorant | Type |  | — | B-01 | B-01 | B-01 | — |
|  |  | Mass % |  | — | 20 | 20 | 20 | — |
|  | Radical polymerizable components | High Tg polyfunctional monomer (II) | Tg (° C.) | 186 | 43 | — | — | 272 |
|  |  |  | Number of functional groups | 2 | 2 | — | — | 3 |
|  |  |  | Mass % | 15 | 15 | — | — | 15 |
|  |  | Other polyfunctional monomer | Tg (° C.) | — | — | 38 | 32 | — |
|  |  |  | Number of functional groups | — | — | 3 | 2 | — |
|  |  |  | Mass % | — | — | 15 | 15 | — |
|  |  | Monofunctional monomer (mass %) | VCAP | 15 | 15 | 15 | 15 | 15 |
|  |  |  | EBECRYL 110 | — | — | — | — | — |
|  | Binder resin (mass %) | Polyamide resin |  | — | — | — | — | — |
|  |  | Acrylic resin |  | — | — | — | — | — |
|  |  | Phenol resin |  | — | — | — | — | — |
|  | Volatile solvent (mass %) | Ethanol |  | 63 | 43 | 43 | 43 | 58 |
|  |  | 1-butanol |  | — | — | — | — | 5 |
|  |  | Acetone |  | — | — | — | — | — |
|  |  | Ethyl acetate |  | — | — | — | — | — |
|  |  | Cyclohexanone |  | — | — | — | — | — |
|  | Ratios of respective components (mass %) | $Rmh_3$ |  | 100 | 100 | 0 | 0 | 100 |
|  |  | $RS_3$ |  | 50 | 50 | 50 | 50 | 50 |
|  |  | $RV_3$ |  | 210 | 196.7 | 196.7 | 196.7 | 210 |
|  | Difference $\Delta R$ in refractive index |  |  | 0.144 | 0.095 | — | — | 0.088 |
|  | Coating method |  |  | IJ | IJ | IJ | IJ | IJ |

TABLE 40-continued

|  |  |  | Example 3-6 | Example 3-7 | Comparative Example 3-1 | Comparative Example 3-2 | Example 3-8 |
|---|---|---|---|---|---|---|---|
| Evaluation | Hiding layer | Hiding property | Δ | Δ | x | x | ∘∘∘ |
|  |  | Abrasion resistance | ∘ | ∘ | ∘ | ∘ | ∘ |
|  |  | Followability | ∘ | ∘ | ∘ | ∘ | ∘ |
|  | Image | Fastness | ∘ | ∘ | ∘ | ∘ | ∘ |
|  |  | Transparency | ∘ | ∘ | ∘ | ∘ | ∘ |

TABLE 41

|  |  |  |  | Example 3-9 | Example 3-10 | Example 3-11 | Example 3-12 | Example 3-13 |
|---|---|---|---|---|---|---|---|---|
| Hiding layer coating agent | Colorant | Type |  | — | — | — | — | — |
|  |  | Mass % |  | — | — | — | — | — |
|  | Radical polymerizable components | High Tg polyfunctional monomer (II) | Tg (° C.) | 272 | 272 | 272 | 272 | 272 |
|  |  |  | Number of functional groups | 3 | 3 | 3 | 3 | 3 |
|  |  |  | Mass % | 15 | 15 | 15 | 15 | 15 |
|  |  | Other polyfunctional monomer | Tg (° C.) | — | — | — | — | — |
|  |  |  | Number of functional groups | — | — | — | — | — |
|  |  |  | Mass % | — | — | — | — | — |
|  |  | Monofunctional monomer (mass %) | VCAP | 15 | 15 | 15 | 15 | — |
|  |  |  | EBECRYL 110 | — | — | — | — | 15 |
|  | Binder resin (mass %) | Polyamide resin |  | — | — | — | — | 3 |
|  |  | Acrylic resin |  | — | — | — | — | — |
|  |  | Phenol resin |  | — | — | — | — | — |
|  | Volatile solvent (mass %) | Ethanol |  | 58 | 58 | 58 | — | 60 |
|  |  | 1-butanol |  | — | — | — | — | — |
|  |  | Acetone |  | 5 | — | — | — | — |
|  |  | Ethyl acetate |  | — | 5 | — | — | — |
|  |  | Cyclohexanone |  | — | — | 5 | 63 | — |
|  | Ratios of respective components (mass %) | Rmh$_3$ |  | 100 | 100 | 100 | 100 | 100 |
|  |  | RS$_3$ |  | 50 | 50 | 50 | 50 | 50 |
|  |  | RV$_3$ |  | 210 | 210 | 210 | 210 | 200 |
|  | Difference ΔR in refractive index |  |  | 0.088 | 0.088 | 0.088 | 0.023 | 0.088 |
|  | Coating method |  |  | IJ | IJ | IJ | IJ | IJ |
| Evaluation | Hiding layer | Hiding property |  | ∘∘∘ | ∘∘∘ | ∘∘∘ | ∘ | ∘∘∘ |
|  |  | Abrasion resistance |  | ∘ | ∘ | ∘ | ∘ | ∘ |
|  |  | Followability |  | ∘ | ∘ | ∘ | ∘ | ∘ |
|  | Image | Fastness |  | ∘ | ∘ | ∘ | ∘ | ∘ |
|  |  | Transparency |  | ∘ | ∘ | ∘ | ∘ | ∘ |

TABLE 42

|  |  |  |  | Example 3-14 | Example 3-15 | Comparative Example 3-3 | Example 3-16 | Example 3-17 |
|---|---|---|---|---|---|---|---|---|
| Hiding layer coating agent | Colorant | Type |  | — | — | — | — | — |
|  |  | Mass % |  | — | — | — | — | — |
|  | Radical polymerizable components | High Tg polyfunctional monomer (II) | Tg (° C.) | 272 | 272 | 272 | 272 | 272 |
|  |  |  | Number of functional groups | 3 | 3 | 3 | 3 | 3 |
|  |  |  | Mass % | 15 | 15 | 32 | 30 | 25 |

TABLE 42-continued

|  |  |  |  | Example 3-14 | Example 3-15 | Comparative Example 3-3 | Example 3-16 | Example 3-17 |
|---|---|---|---|---|---|---|---|---|
|  |  | Other polyfunctional monomer | Tg (° C.) | — | — | — | — | — |
|  |  |  | Number of functional groups | — | — | — | — | — |
|  |  |  | Mass % | — | — | — | — | — |
|  |  | Monofunctional monomer (mass %) | VCAP | — | — | 32 | 30 | 25 |
|  |  |  | EBECRYL 110 | 15 | 15 | — | — | — |
|  | Binder resin (mass %) | Polyamide resin |  | — | — | — | — | — |
|  |  | Acrylic resin |  | 3 | — | — | — | — |
|  |  | Phenol resin |  | — | 3 | — | — | — |
|  | Volatile solvent (mass %) | Ethanol |  | 60 | 60 | 29 | 33 | 43 |
|  |  | 1-butanol |  | — | — | — | — | — |
|  |  | Acetone |  | — | — | — | — | — |
|  |  | Ethyl acetate |  | — | — | — | — | — |
|  |  | Cyclohexanone |  | — | — | — | — | — |
|  | Ratios of respective components (mass %) | $Rmh_3$ |  | 100 | 100 | 100 | 100 | 100 |
|  |  | $RS_3$ |  | 50 | 50 | 50 | 50 | 50 |
|  |  | $RV_3$ |  | 210 | 210 | 45.3 | 55 | 86 |
|  | Difference ΔR in refractive index |  |  | 0.088 | 0.088 | 0.088 | 0.088 | 0.088 |
|  | Coating method |  |  | IJ | IJ | IJ | IJ | IJ |
| Evaluation | Hiding layer | Hiding property |  | ooo | ooo | x | oo | ooo |
|  |  | Abrasion resistance |  | o | o | o | o | o |
|  |  | Followability |  | o | o | o | o | o |
|  | Image | Fastness |  | o | o | o | o | o |
|  |  | Transparency |  | o | o | x | Δ | o |

TABLE 43

|  |  |  |  | Example 3-18 | Example 3-19 | Example 3-20 | Comparative Example 3-4 |
|---|---|---|---|---|---|---|---|
| Hiding layer coating agent | Colorant | Type |  | — | — | — | — |
|  |  | Mass % |  | — | — | — | — |
|  | Radical polymerizable components | High Tg polyfunctional monomer (II) | Tg (° C.) | 272 | 272 | 272 | 272 |
|  |  |  | Number of functional groups | 3 | 3 | 3 | 3 |
|  |  |  | Mass % | 20 | 11 | 9.5 | 8.5 |
|  |  | Other polyfunctional monomer | Tg (° C.) | — | — | — | — |
|  |  |  | Number of functional groups | — | — | — | — |
|  |  |  | Mass % | — | — | — | — |
|  |  | Monofunctional monomer (mass %) | VCAP | 20 | 11 | 9.5 | 8.5 |
|  |  |  | EBECRYL 110 | — | — | — | — |
|  | Binder resin (mass %) | Polyamide resin |  | — | — | — | — |
|  |  | Acrylic resin |  | — | — | — | — |
|  |  | Phenol resin |  | — | — | — | — |
|  | Volatile solvent (mass %) | Ethanol |  | 53 | 71 | 74 | 76 |
|  |  | 1-butanol |  | — | — | — | — |
|  |  | Acetone |  | — | — | — | — |
|  |  | Ethyl acetate |  | — | — | — | — |
|  |  | Cyclohexanone |  | — | — | — | — |
|  | Ratios of respective components (mass %) | $Rmh_3$ |  | 100 | 100 | 100 | 100 |
|  |  | $RS_3$ |  | 50 | 50 | 50 | 50 |
|  |  | $RV_3$ |  | 132.5 | 322.7 | 389.5 | 447.1 |
|  | Difference ΔR in refractive index |  |  | 0.088 | 0.088 | 0.088 | 0.088 |
|  | Coating method |  |  | IJ | IJ | IJ | IJ |

TABLE 43-continued

|  |  |  | Example 3-18 | Example 3-19 | Example 3-20 | Comparative Example 3-4 |
|---|---|---|---|---|---|---|
| Evaluation | Hiding layer | Hiding property | ○○○ | ○○○ | ○○○ | ○○○ |
|  |  | Abrasion resistance | ○ | ○ | Δ | x |
|  |  | Followability | ○ | ○ | ○ | ○ |
|  | Image | Fastness | ○ | ○ | ○ | ○ |
|  |  | Transparency | ○ | ○ | ○ | ○ |

TABLE 44

|  |  |  |  | Comparative Example 3-5 | Example 3-21 | Example 3-22 | Example 3-23 | Example 3-24 |
|---|---|---|---|---|---|---|---|---|
| Hiding layer coating agent | Colorant | Type |  | B-01 | B-01 | B-01 | B-01 | B-01 |
|  |  | Mass % |  | 20 | 20 | 20 | 20 | 20 |
|  | Radical polymerizable components | High Tg polyfunctional monomer (II) | Tg (° C.) | 272 | 272 | 272 | 272 | 272 |
|  |  |  | Number of functional groups | 3 | 3 | 3 | 3 | 3 |
|  |  |  | Mass % | 7 | 9 | 13 | 19 | 25 |
|  |  | Other polyfunctional monomer | Tg (° C.) | 32 | 32 | 32 | 32 | — |
|  |  |  | Number of functional groups | 2 | 2 | 2 | 2 | — |
|  |  |  | Mass % | 18 | 16 | 12 | 6 | — |
|  |  | Monofunctional monomer (mass %) | VCAP | 5 | 5 | 5 | 5 | 5 |
|  |  |  | EBECRYL 110 | — | — | — | — | — |
|  | Binder resin (mass %) | Polyamide resin |  | — | — | — | — | — |
|  |  | Acrylic resin |  | — | — | — | — | — |
|  |  | Phenol resin |  | — | — | — | — | — |
|  | Volatile solvent (mass %) | Ethanol |  | 43 | 43 | 43 | 43 | 43 |
|  |  | 1-butanol |  | — | — | — | — | — |
|  |  | Acetone |  | — | — | — | — | — |
|  |  | Ethyl acetate |  | — | — | — | — | — |
|  |  | Cyclohexanone |  | — | — | — | — | — |
|  | Ratios of respective components (mass %) | $Rmh_3$ |  | 28 | 36 | 52 | 76 | 100 |
|  |  | $RS_3$ |  | 16.7 | 16.7 | 16.7 | 16.7 | 16.7 |
|  |  | $RV_3$ |  | 196.7 | 196.7 | 196.7 | 196.7 | 196.7 |
|  | Difference ΔR in refractive index |  |  | 0.088 | 0.088 | 0.088 | 0.088 | 0.088 |
|  | Coating method |  |  | IJ | IJ | IJ | IJ | IJ |
| Evaluation | Hiding layer | Hiding property |  | x | ○○ | ○○○ | ○○○ | ○○○ |
|  |  | Abrasion resistance |  | ○ | ○ | ○ | ○ | ○ |
|  |  | Followability |  | ○ | ○ | ○ | ○ | ○ |
|  | Image | Fastness |  | ○ | ○ | ○ | ○ | ○ |
|  |  | Transparency |  | ○ | ○ | ○ | ○ | ○ |

TABLE 45

|  |  |  |  | Comparative Example 3-6 | Example 3-25 | Example 3-26 | Example 3-27 |
|---|---|---|---|---|---|---|---|
| Hiding layer coating agent | Colorant | Type |  | B-01 | B-01 | B-01 | B-01 |
|  |  | Mass % |  | 20 | 20 | 20 | 20 |
|  | Radical polymerizable components | High Tg polyfunctional monomer (II) | Tg (° C.) | 272 | 272 | 272 | 272 |
|  |  |  | Number of functional groups | 3 | 3 | 3 | 3 |
|  |  |  | Mass % | 43 | 42.5 | 40 | 16 |

TABLE 45-continued

|  |  |  |  | Comparative Example 3-6 | Example 3-25 | Example 3-26 | Example 3-27 |
|---|---|---|---|---|---|---|---|
|  |  | Other polyfunctional monomer | Tg (° C.) | — | — | — | — |
|  |  |  | Number of functional groups | — | — | — | — |
|  |  |  | Mass % | — | — | — | — |
|  |  | Monofunctional monomer (mass %) | VCAP | 2 | 2.5 | 5 | 29 |
|  |  |  | EBECRYL 110 | — | — | — | — |
|  | Binder resin (mass %) | Polyamide resin |  | — | — | — | — |
|  |  | Acrylic resin |  | — | — | — | — |
|  |  | Phenol resin |  | — | — | — | — |
|  | Volatile solvent (mass %) | Ethanol |  | 28 | 28 | 28 | 28 |
|  |  | 1-butanol |  | — | — | — | — |
|  |  | Acetone |  | — | — | — | — |
|  |  | Ethyl acetate |  | — | — | — | — |
|  |  | Cyclohexanone |  | — | — | — | — |
|  | Ratios of respective components (mass %) | $Rmh_3$ |  | 100 | 100 | 100 | 100 |
|  |  | $RS_3$ |  | 4.4 | 5.6 | 11.1 | 64.4 |
|  |  | $RV_3$ |  | 97.8 | 97.8 | 97.8 | 97.8 |
|  | Difference $\Delta R$ in refractive index |  |  | 0.088 | 0.088 | 0.088 | 0.088 |
|  | Coating method |  |  | IJ | IJ | IJ | IJ |
| Evaluation | Hiding layer | Hiding property |  | ooo | ooo | ooo | ooo |
|  |  | Abrasion resistance |  | o | o | o | o |
|  |  | Followability |  | x | Δ | o | o |
|  | Image | Fastness |  | o | o | o | o |
|  |  | Transparency |  | o | o | o | o |

TABLE 46

|  |  |  |  | Example 3-28 | Comparative Example 3-7 | Example 3-29 | Example 3-30 |
|---|---|---|---|---|---|---|---|
| Hiding layer coating agent | Colorant | Type |  | B-01 | B-01 | R-01 | — |
|  |  | Mass % |  | 20 | 20 | 20 | — |
|  | Radical polymerizable components | High Tg polyfunctional monomer (II) | Tg (° C.) | 272 | 272 | 272 | 272 |
|  |  |  | Number of functional groups | 3 | 3 | 3 | 3 |
|  |  |  | Mass % | 14 | 12 | 25 | 15 |
|  |  | Other polyfunctional monomer | Tg (° C.) | — | — | — | — |
|  |  |  | Number of functional groups | — | — | — | — |
|  |  |  | Mass % | — | — | — | — |
|  |  | Monofunctional monomer (mass %) | VCAP | 31 | 33 | 5 | 15 |
|  |  |  | EBECRYL 110 | — | — | — | — |
|  | Binder resin (mass %) | Polyamide resin |  | — | — | — | — |
|  |  | Acrylic resin |  | — | — | — | — |
|  |  | Phenol resin |  | — | — | — | — |
|  | Volatile solvent (mass %) | Ethanol |  | 28 | 28 | 43 | 63 |
|  |  | 1-butanol |  | — | — | — | — |
|  |  | Acetone |  | — | — | — | — |
|  |  | Ethyl acetate |  | — | — | — | — |
|  |  | Cyclohexanone |  | — | — | — | — |
|  | Ratios of respective components (mass %) | $Rmh_3$ |  | 100 | 100 | 100 | 100 |
|  |  | $RS_3$ |  | 68.9 | 73.3 | 16.7 | 50 |
|  |  | $RV_3$ |  | 97.8 | 97.8 | 196.7 | 210 |
|  | Difference $\Delta R$ in refractive index |  |  | 0.088 | 0.088 | 0.88 | 0.88 |
|  | Coating method |  |  | IJ | IJ | IJ | BC |

TABLE 46-continued

|  |  |  | Example 3-28 | Comparative Example 3-7 | Example 3-29 | Example 3-30 |
|---|---|---|---|---|---|---|
| Evaluation | Hiding layer | Hiding property | ⊚◯◯ | ⊚◯◯ | ⊚◯◯ | ⊚◯◯ |
|  |  | Abrasion resistance | Δ | x | ◯ | ◯ |
|  |  | Followability | ◯ | ◯ | ◯ | ◯ |
|  | Image | Fastness | ◯ | ◯ | ◯ | ◯ |
|  |  | Transparency | ◯ | ◯ | ◯ | ◯ |

From the results of Examples 3-1 to 3-30 and Comparative Examples 3-1 and 3-2 in Table 39 to Table 46, it was found that the hiding layer coating agent must contain radical polymerizable components, a volatile solvent, and a photo-radical polymerization initiator and must contain, as the radical polymerizable components among these, a difunctional or higher polyfunctional monomer and a monofunctional monomer and the polyfunctional monomer must include the high Tg polyfunctional monomer (II) with the glass transition temperature of not less than 40° C., and by these arrangements, a recording sheet that includes a hiding layer having a sufficient hiding property and yet enabling a transparent or semitransparent image to be recorded by a transparent or semitransparent image recording ink can be obtained.

Also, especially from the results of Examples 3-1 and 3-21 to 3-23 and Comparative Example 3-5, it was found that the ratio $Rmh_3$ of the high Tg polyfunctional monomer (II) in the total amount of the polyfunctional monomer must be not less than 30 mass % and is especially preferably not less than 50 mass %.

From the results of Examples 3-1 and 3-25 to 3-28 and Comparative Examples 3-6 and 3-7, it was found that the ratio $RS_3$ of the monofunctional monomer in the total amount of the radical polymerizable components must be not less than 5 mass % and not more than 70 mass %, is especially preferably not less than 10 mass %, and is preferably not more than 65 mass %.

From the results of Examples 3-1 and 3-16 to 3-20 and Comparative Examples 3-3 and 3-4, it was found that the ratio $RV_3$ of the volatile solvent with respect to the total amount of the radical polymerizable components must be not less than 50 mass % and not more than 400 mass %, is especially preferably not less than 70 mass %, and is preferably not more than 370 mass %.

From the results of Examples 3-1 to 3-7, it was found that as the high Tg polyfunctional monomer (II), it is preferable to selectively use a compound that is trifunctional or higher and more preferably a compound that is trifunctional or higher and has a glass transition temperature Tg of not less than 90° C. and especially, it is even more preferable to selectively use a compound that is trifunctional or higher and has a glass transition temperature Tg of not less than 200° C. and not more than 300° C. or a compound that is tetrafunctional or higher and has a glass transition temperature Tg of not less than 100° C. but less than 200° C.

From the results of Examples 3-1 and 3-8 to 3-12, it was found that as the volatile solvent, an alcohol with 1 to 3 carbon atoms may be used alone or an alcohol with 1 to 3 carbon atoms may be used in combination with an alcohol with 4 carbon atoms or more, a ketone, an ester, or an ether as another volatile solvent and in the case of combined use, the ratio of the other volatile solvent is preferably not more than 15 mass % in the total amount of the volatile solvents.

Also, from the results of Examples 3-1 and 3-8 to 3-12, it was found that as the volatile solvent, it is preferable to selectively use a volatile solvent with which the difference $\Delta R$ in refractive index with respect to the high Tg polyfunctional monomer (II) is not less than ±0.03.

From the results of Examples 3-1 and 3-13 to 3-15, it was found that it is preferable for the hiding layer coating agent to contain vinylcaprolactam as the monofunctional monomer and/or to contain a binder resin.

Also, from the results of Examples 3-13 to 3-15, it was found that a polyamide resin, an acrylic resin, a phenol resin, etc., is usable as the binder resin.

Also, from the results of Examples 3-1, 3-7, and 3-21 to 3-29, it was found that the hiding layer may be a colorless semitransparent or colorless nontransparent layer, that is, a layer of substantially white color or may be a colored semitransparent or colored nontransparent layer that is colored to an arbitrary color tone.

Further, from the results of Examples 3-1 and 3-30, it was found that the hiding layer may be formed by a coating method such as a bar coating method, etc., besides an inkjet printing method.

<<Image Recording Ink>>

<Ink ii (Photocuring Cyan Ink)>

An ink ii was prepared in the same manner as the ink i with the exception of blending the same pigment dispersion B-01 as prepared in Example 3-7 at a ratio of 20 mass % in the total amount of the ink and setting the ratios in the total amount of the ink of SR9003NS as the polyfunctional monomer to 25 mass %, VCAP as the monofunctional monomer to 5 mass %, and ethanol as the volatile solvent to 43 mass %.

The ratio $Rmh_4$ of the high Tg polyfunctional monomer (II) in the total amount of the polyfunctional monomer was 0 mass %, the ratio $RS_4$ of the monofunctional monomer in the total amount of the radical polymerizable components was 16.7 mass %, and the ratio $RV_4$ of the volatile solvent with respect to the total amount of the radical polymerizable components was 196.7 mass % including the ethanol contained in the pigment dispersion.

<Ink iii (Photocuring Magenta Ink)>

An ink iii was prepared in the same manner as the ink ii with the exception of blending, in place of the pigment dispersion B-01, the same amount of the pigment dispersion R-01 that is the same as that prepared in Example 3-29.

The ratio $Rmh_4$ of the high Tg polyfunctional monomer (II) in the total amount of the polyfunctional monomer was 0 mass %, the ratio $RS_4$ of the monofunctional monomer in the total amount of the radical polymerizable components was 16.7 mass,% and the ratio $RV_4$ of the volatile solvent with respect to the total amount of the radical polymerizable components was 196.7 mass % including the ethanol contained in the pigment dispersion.

<Ink iv (Photocuring Yellow Ink)>

An ink iv was prepared in the same manner as the ink ii with the exception of blending, in place of the pigment dispersion B-01, the same amount of a yellow pigment dispersion prepared by the respective components indicated below being blended at the ratios shown in Table 47, stirred, and thereafter dispersed using a beads mill (hereinafter indicated at times as "Y-01" as the type of dispersion).

Pigment: C. I. pigment yellow 139
Dispersant: DISPERBYK (registered trademark)-145 (solids content: 100%) manufactured by BYK-Chemie Japan K. K.
Dispersion medium: Ethanol

TABLE 47

| Component | Mass % |
|---|---|
| Pigment | 15 |
| Dispersant | 5 |
| Dispersion medium | 80 |

The ratio $Rmh_4$ of the high Tg polyfunctional monomer (II) in the total amount of the polyfunctional monomer was 0 mass %, the ratio $RS_4$ of the monofunctional monomer in the total amount of the radical polymerizable components was 16.7 mass,% and the ratio $RV_4$ of the volatile solvent with respect to the total amount of the radical polymerizable components was 196.7 mass % including the ethanol contained in the pigment dispersion.

<Ink v (Photocuring Clear Ink)>

An ink v was prepared in the same manner as the ink i with the exception of blending, in place of SR9003NS, the same amount of tricyclodecane dimethanol diacrylate⟨SARTOMER SR833NS manufactured by ARKEMA Inc.; difunctional; glass transition temperature Tg: 186° C.; refractive index: 1.505⟩, which is a high Tg polyfunctional monomer (II), as the polyfunctional monomer.

The ratio $Rmh_4$ of the high Tg polyfunctional monomer (II) in the total amount of the polyfunctional monomer was 100 mass %, the ratio $RS_4$ of the monofunctional monomer in the total amount of the radical polymerizable components was 50 mass %, and the ratio $RV_4$ of the volatile solvent with respect to the total amount of the radical polymerizable components was 210 mass %.

<Ink vi (Aqueous Clear Ink)>

An ink vi, which is an aqueous clear ink, was prepared by dissolving 12 mass % of polyvinylpyrrolidone ⟨PVP K15 manufactured by Tokyo Chemical Industry Co., Ltd.⟩ as the binder resin in 88 mass % of ion exchanged water.

<<Manufacture and Evaluation of Recorded Products (Part 2)>>

Examples 3-31 to 3-35

<Manufacture of Recorded Products>

Using each of the prepared inks ii to vi in an inkjet printer, an image was recorded on the hiding layer of each of priorly manufactured recording sheets having the hiding layer constituted of the hiding layer coating agent of Example 3-1. The resolution of recording was set to 600×600 dpi.

Then, the inks ii to v having the photocuring property were made to undergo the curing reaction by exposure using an LED curing lamp and also the ink vi not having the photocuring property was dried after printing to manufacture the recorded products.

With each of the manufactured recorded products, the fastness and transparency described above were evaluated in regard to the image recorded on the hiding layer. The results are shown together with the results of Example 3-1 using the ink i in Table 48 and Table 49. Here, in both tables, the symbols in the column of the type of image recording ink are as follows.

UV: photocuring ink
Aqueous: aqueous ink

TABLE 48

| | | | | Example 3-1 | Example 3-31 | Example 3-32 |
|---|---|---|---|---|---|---|
| Image recording ink | Ink No. | | | i | ii | iii |
| | Type | | | UV | UV | UV |
| | Color tone | | | Clear | Cyan | Magenta |
| | Colorant | Type | | — | B-01 | R-01 |
| | | Mass % | | — | 20 | 20 |
| | Radical polymerizable components | Polyfunctional monomer | Tg (° C.) | 32 | 32 | 32 |
| | | | Number of functional groups | 2 | 2 | 2 |
| | | | Mass % | 15 | 25 | 25 |
| | | Monofunctional monomer | VCAP (mass %) | 15 | 5 | 5 |
| | Volatile solvent | Ethanol (mass %) | | 63 | 43 | 43 |
| | Polyvinylpyrrolidone (mass %) | | | — | — | — |
| | Ion exchanged water (mass %) | | | — | — | — |
| | Ratios of respective components (mass %) | $Rmh_3$ | | 0 | 0 | 0 |
| | | $RS_3$ | | 50 | 16.7 | 16.7 |
| | | $RV_3$ | | 210 | 196.7 | 196.7 |
| Evaluation of image | Fastness | | | ○ | ○ | ○ |
| | Transparency | | | ○ | ○ | ○ |

TABLE 49

|  |  |  |  | Example 3-33 | Example 3-34 | Example 3-35 |
|---|---|---|---|---|---|---|
| Image recording ink | Ink No. |  |  | iv | v | vi |
|  | Type |  |  | UV | UV | Aqueous |
|  | Color tone |  |  | Yellow | Clear | Clear |
|  | Colorant | Type |  | Y-01 | — | — |
|  |  | Mass % |  | 20 | — | — |
|  | Radical polymerizable components | Polyfunctional monomer | Tg (° C.) | 32 | 186 | — |
|  |  |  | Number of functional groups | 2 | 2 | — |
|  |  |  | Mass % | 25 | 15 | — |
|  |  | Monofunctional monomer | VCAP (mass %) | 5 | 15 | — |
|  | Volatile solvent | Ethanol (mass %) |  | 43 | 63 | — |
|  | Polyvinylpyrrolidone (mass %) |  |  | — | — | 12 |
|  | Ion exchanged water (mass %) |  |  | — | — | 88 |
|  | Ratios of respective components (mass %) | $Rmh_3$ |  | 0 | 100 | — |
|  |  | $RS_3$ |  | 16.7 | 50 | — |
|  |  | $RV_3$ |  | 196.7 | 210 | — |
| Evaluation of image | Fastness |  |  | ○ | ○ | Δ |
|  | Transparency |  |  | ○ | Δ | ○ |

From the results of Examples 3-1 and 3-31 to 3-35 in Table 48 and Table 49, it was found that when an image is recorded using an image recording ink that is colorless or colored and is transparent or semitransparent on the hiding layer with the hiding property of the recording sheet of the present invention, the hiding property in a region of the hiding layer in which the image is recorded can be decreased selectively to record a transparent or semitransparent image.

However, it was found that it is effective in terms of improving the fastness of the recorded image to use a photocuring ink rather than an aqueous ink as the image recording ink.

Also, it was found that as the photocuring ink, it is especially preferable to use an ink that is a photocuring ink of a solvent system containing the respective components mentioned above and excludes a high Tg polyfunctional monomer (II) as a radical polymerizable component or includes the high Tg polyfunctional monomer (II) at a ratio of less than 30 mass % for the effect of decreasing the hiding property of the region in which an image is recorded.

The present application corresponds to Japanese Patent Application No. 2019-199021 filed on Oct. 31, 2019 in the Japan Patent Office, Japanese Patent Application No. 2019-236039 filed on Dec. 26, 2019 in the Japan Patent Office, and Japanese Patent Application No. 2020-11003 filed on Jan. 27, 2020 in the Japan Patent Office, and the entire disclosures of these applications are individually incorporated herein by reference.

While preferred embodiments of the present invention were described in detail above, these are merely specific examples used to clarify the technical contents of the present invention and the present invention should not be interpreted as being limited to these specific examples and the scope of the present invention is limited only by the appended claims.

What is claimed is:

1. An inkjet ink comprising: radical polymerizable components including a difunctional or higher polyfunctional monomer and a monofunctional monomer; a volatile solvent; and a photo-radical polymerization initiator; and wherein a ratio of the polyfunctional monomer is not less than 35 mass % and not more than 90 mass % in a total amount of the radical polymerizable components, the polyfunctional monomer includes a high Tg polyfunctional monomer with a glass transition temperature Tg of not less than 40° C. at a ratio of not less than 30 mass % in a total amount of the polyfunctional monomer, and a ratio of the monofunctional monomer is not less than 10 mass % and not more than 65 mass % in a total amount of the radical polymerizable components, and a ratio of the volatile solvent is not less than 50 mass % and not more than 400 mass % with respect to the total amount of the radical polymerizable components.

2. The inkjet ink according to claim 1, wherein the high Tg polyfunctional monomer is a trifunctional or higher high Tg polyfunctional monomer.

3. The inkjet ink according to claim 1, wherein the high Tg polyfunctional monomer is a trifunctional or higher high Tg polyfunctional monomer with a glass transition temperature Tg of not less than 90° C.

4. The inkjet ink according to claim 1, wherein the monofunctional monomer includes at least an N-vinyl lactam monomer.

5. The inkjet ink according to claim 1, further comprising: at least one type of binder resin selected from a group consisting of polyamide resin, acrylic resin, and phenol resin.

6. The inkjet ink according to claim 1, being for white color printing and wherein the ratio of the polyfunctional monomer is not less than 35 mass % and not more than 85 mass % in a total amount of the radical polymerizable components, the high Tg polyfunctional monomer is a high Tg polyfunctional monomer with a glass transition temperature Tg of not less than 60° C., the ratio of the high Tg polyfunctional monomer is not less than 50 mass % in the total amount of the polyfunctional monomer, and the ratio of the monofunctional monomer is not less than 15 mass % and not more than 65 mass % in the total amount of the radical polymerizable components.

7. The inkjet ink according to claim 6, wherein a colorant is excluded.

8. The inkjet ink according to claim 6, wherein an L value that represents whiteness is not less than 40.

9. The inkjet ink according to claim 1, being for color printing and comprising a colorant.

10. The inkjet ink according to claim 9, wherein a contrast ratio is not less than 45%.

11. A hiding layer coating agent comprising: radical polymerizable components including a difunctional or higher polyfunctional monomer and a monofunctional monomer; a volatile solvent; and a photo-radical polymerization initiator; and wherein
   a ratio of the polyfunctional monomer is not less than 35 mass % and not more than 90 mass % in a total amount of the radical polymerizable components,
   the polyfunctional monomer includes a high Tg polyfunctional monomer with a glass transition temperature Tg of not less than 40° C. at a ratio of not less than 30 mass % in a total amount of the polyfunctional monomer,
   a ratio of the monofunctional monomer is not less than 10 mass % and not more than 65 mass % in a total amount of the radical polymerizable components, and
   a ratio of the volatile solvent is not less than 50 mass % and not more than 400 mass % with respect to the total amount of the radical polymerizable components.

12. The hiding layer coating agent according to claim 11, wherein the high Tg polyfunctional monomer is a trifunctional or higher high Tg polyfunctional monomer.

13. The hiding layer coating agent according to claim 11, wherein the high Tg polyfunctional monomer is a trifunctional or higher high Tg polyfunctional monomer with a glass transition temperature Tg of not less than 90° C.

14. The hiding layer coating agent according to claim 11, wherein the monofunctional monomer includes at least an N-vinyl lactam monomer.

15. The hiding layer coating agent according to claim 11, further comprising: at least one type of binder resin selected from a group consisting of polyamide resin, acrylic resin, and phenol resin.

16. The hiding layer coating agent according to claim 11, further comprising: a colorant.

17. A recording sheet comprising: a base sheet; and a hiding layer that is constituted of a cured product of the hiding layer coating agent according to claim 11 provided on a surface of the base sheet.

18. The recording sheet according to claim 17, wherein the base sheet is a transparent or semitransparent sheet.

19. A method for manufacturing the recording sheet according to claim 17 comprising: a step of forming the hiding layer by coating the hiding layer coating agent on the surface of the base sheet and thereafter a step of causing a curing reaction by exposure to ultraviolet rays.

20. The method for manufacturing the recording sheet according to claim 19, wherein the step of forming the hiding layer includes a step of printing the hiding layer coating agent on the surface of the base sheet by an inkjet printing method.

21. A recorded product comprising a transparent or semitransparent image recorded on the hiding layer of the recording sheet according to claim 17.

22. A method for manufacturing the recorded product according to claim 21 comprising: a step of recording the image on the hiding layer by an inkjet printing method using an image recording ink that is colorless or colored and is transparent or semitransparent.

23. The method for manufacturing a recorded product according to claim 22, wherein the step of recording the image includes a step of using an ink having a photocuring property as the image recording ink and making the ink undergo a curing reaction by exposure to ultraviolet rays after recording.

24. An image recording ink used in the method for manufacturing a recorded product according to claim 22, is colorless or colored, and is transparent or semitransparent.

25. The image recording ink according to claim 24, having a photocuring property.

* * * * *